United States Patent
Vlahov et al.

(10) Patent No.: US 12,473,265 B2
(45) Date of Patent: Nov. 18, 2025

(54) METHODS FOR PREPARING PSMA CONJUGATES

(71) Applicant: Endocyte, Inc., West Lafayette, IN (US)

(72) Inventors: Iontcho R. Vlahov, West Lafayette, IN (US); Hari Krishna R. Santhapuram, West Lafayette, IN (US); Albert E. Felten, West Lafayette, IN (US); Christopher P. Leamon, West Lafayette, IN (US); Daniel S. Reno, West Lafayette, IN (US); Katheryn M. Stanford, West Lafayette, IN (US)

(73) Assignee: ENDOCYTE, INC., West Lafayette, IN (US)

( * ) Notice: Subject to any disclaimer, the term of this patent is extended or adjusted under 35 U.S.C. 154(b) by 1036 days.

(21) Appl. No.: 17/612,283

(22) PCT Filed: May 19, 2020

(86) PCT No.: PCT/US2020/033584
§ 371 (c)(1),
(2) Date: Nov. 18, 2021

(87) PCT Pub. No.: WO2020/236808
PCT Pub. Date: Nov. 26, 2020

(65) Prior Publication Data
US 2022/0220085 A1   Jul. 14, 2022

Related U.S. Application Data

(60) Provisional application No. 62/912,353, filed on Oct. 8, 2019, provisional application No. 62/910,777, filed on Oct. 4, 2019, provisional application No. 62/850,119, filed on May 20, 2019.

(51) Int. Cl.
C07D 257/02 (2006.01)
(52) U.S. Cl.
CPC ................... C07D 257/02 (2013.01)
(58) Field of Classification Search
CPC ................................................ C07D 257/02
See application file for complete search history.

(56) References Cited

U.S. PATENT DOCUMENTS

| | | | |
|---|---|---|---|
| 4,691,024 A | 9/1987 | Shirahata et al. |
| 4,713,249 A | 12/1987 | Schroder |
| 5,103,018 A | 4/1992 | Motomichi et al. |
| 5,266,333 A | 11/1993 | Cady et al. |
| 5,417,982 A | 5/1995 | Modi |
| 5,418,982 A | 5/1995 | Kishi |
| 5,627,165 A | 5/1997 | Glazier |
| 5,795,877 A | 8/1998 | Jackson et al. |
| 5,863,536 A | 1/1999 | Jackson et al. |
| 5,866,679 A | 2/1999 | Defeo-Jones et al. |
| 5,902,817 A | 5/1999 | Jackson et al. |
| 5,948,750 A | 9/1999 | Garsky et al. |
| 5,962,237 A | 10/1999 | Ts |
| 5,962,521 A | 10/1999 | Jackson et al. |
| 5,968,915 A | 10/1999 | Jackson et al. |
| 5,998,362 A | 12/1999 | Feng et al. |
| 6,054,444 A | 4/2000 | Jackson et al. |
| 6,127,333 A | 10/2000 | Brady et al. |
| 6,174,858 B1 | 1/2001 | Brady et al. |
| 6,177,404 B1 | 1/2001 | Defeo-Jones et al. |
| 6,183,721 B1 | 2/2001 | Albert |
| 6,232,287 B1 | 5/2001 | Ruoslahti et al. |
| 6,368,598 B1 | 4/2002 | D'Amico et al. |
| 6,391,305 B1 | 5/2002 | Feng et al. |
| 6,428,785 B1 | 8/2002 | Gokcen |
| 6,479,470 B1 | 11/2002 | Kozikowski et al. |
| 6,528,499 B1 | 3/2003 | Kozikowski et al. |
| 6,692,724 B1 | 2/2004 | Yang et al. |
| 6,875,886 B2 | 4/2005 | Frangioni |
| 6,946,133 B1 | 9/2005 | Schlom et al. |
| 7,008,765 B1 | 3/2006 | Bussemakers et al. |
| 7,128,893 B2 | 10/2006 | Leamon et al. |
| 7,129,254 B2 | 10/2006 | Berger et al. |
| 7,147,837 B2 | 12/2006 | Lauffer et al. |
| 7,192,586 B2 | 3/2007 | Bander |
| 7,226,577 B2 | 6/2007 | Cappelletti et al. |
| 7,232,805 B2 | 6/2007 | Weinshenker et al. |
| 7,361,338 B2 | 4/2008 | Jakobovits et al. |

(Continued)

FOREIGN PATENT DOCUMENTS

| | | |
|---|---|---|
| CA | 2606138 A1 | 10/2005 |
| CN | 100528241 | 8/2009 |

(Continued)

OTHER PUBLICATIONS

"Graham, et al., "Radiofluorinated Derivatives of 2☐(Phosphonomethyl)pentanedioiAcid as Inhibitors of Prostate Specific Membrane Antigen (PSMA) for the Imaging of Prostate Cancer,"2012, Journal of Medicinal Chemistry, 55(22) pp. 9510-9520."

(Continued)

*Primary Examiner* — Timothy R Rozof
(74) *Attorney, Agent, or Firm* — Barnes & Thornburg LLP

(57) ABSTRACT

This disclosure relates to processes for preparing compounds that are useful in the treatment of disease, such as cancer, in mammals. In particular, the invention described herein pertains to processes for preparing compounds capable of targeting PSMA expressing cells and useful in the treatment of diseases caused by PSMA expressing cells, such as prostate cancer.

51 Claims, No Drawings

(56) References Cited

U.S. PATENT DOCUMENTS

| | | |
|---|---|---|
| 7,381,745 B2 | 6/2008 | Kozikowski et al. |
| 7,399,460 B2 | 7/2008 | Wedeking et al. |
| 7,408,079 B2 | 8/2008 | Pomper et al. |
| 7,485,299 B2 | 2/2009 | Afar et al. |
| 7,514,078 B2 | 4/2009 | Bander et al. |
| 7,517,903 B2 | 4/2009 | Chen et al. |
| 7,534,580 B2 | 5/2009 | Reeves et al. |
| 7,601,332 B2 | 10/2009 | Vlahov et al. |
| 7,635,682 B2 | 12/2009 | Denmeade et al. |
| 7,638,122 B2 | 12/2009 | Yu et al. |
| 7,659,395 B2 | 2/2010 | Pajouhesh et al. |
| 7,662,795 B2 | 2/2010 | Rodriguez et al. |
| 7,696,185 B2 | 4/2010 | Berkman |
| 7,713,944 B2 | 5/2010 | Kinberger et al. |
| 7,740,847 B2 | 6/2010 | Allan et al. |
| 7,767,202 B2 | 8/2010 | Pardoll et al. |
| 7,767,803 B2 | 8/2010 | Diener et al. |
| 7,794,929 B2 | 9/2010 | Baylin et al. |
| 7,862,798 B2 | 1/2011 | Leamon et al. |
| 7,872,235 B2 | 1/2011 | Rousso et al. |
| 7,875,586 B2 | 1/2011 | Kovbasnjuk et al. |
| 7,879,981 B2 | 2/2011 | Obata |
| 7,910,594 B2 | 3/2011 | Vlahov et al. |
| RE42,275 E | 4/2011 | Berkman |
| 7,990,533 B2 | 8/2011 | Maier et al. |
| 8,000,773 B2 | 8/2011 | Rousso et al. |
| 8,101,369 B2 | 1/2012 | Nam et al. |
| 8,101,713 B2 | 1/2012 | Cuello et al. |
| 8,105,568 B2 | 1/2012 | Vlahov et al. |
| 8,153,595 B2 | 4/2012 | Chen |
| 8,211,401 B2 | 7/2012 | Babich et al. |
| 8,211,402 B2 | 7/2012 | Babich et al. |
| 8,211,473 B2 | 7/2012 | Troiano et al. |
| 8,211,635 B2 | 7/2012 | Barton |
| 8,227,634 B2 | 7/2012 | Pomper et al. |
| 8,236,330 B2 | 8/2012 | Zale et al. |
| 8,246,968 B2 | 8/2012 | Zale et al. |
| 8,258,111 B2 | 9/2012 | Shen et al. |
| 8,273,363 B2 | 9/2012 | Zale et al. |
| 8,313,128 B2 | 11/2012 | Belyea et al. |
| 8,313,728 B2 | 11/2012 | Leamon et al. |
| 8,388,977 B2 | 3/2013 | Low et al. |
| 8,404,817 B2 | 3/2013 | Sherman et al. |
| 8,414,898 B2 | 4/2013 | Afar et al. |
| 8,445,851 B2 | 5/2013 | Rousso et al. |
| 8,450,290 B2 | 5/2013 | Worm et al. |
| 8,465,725 B2 | 6/2013 | Babich et al. |
| 8,487,128 B2 | 7/2013 | Weissbach et al. |
| 8,487,129 B2 | 7/2013 | Babich et al. |
| 8,507,434 B2 | 8/2013 | Popel et al. |
| 8,557,772 B2 | 10/2013 | Popel et al. |
| 8,562,945 B2 | 10/2013 | Babich et al. |
| 8,603,499 B2 | 12/2013 | Zale et al. |
| 8,603,500 B2 | 12/2013 | Zale et al. |
| 8,603,501 B2 | 12/2013 | Zale et al. |
| 8,606,349 B2 | 12/2013 | Rousso et al. |
| 8,644,910 B2 | 2/2014 | Rousso et al. |
| 8,685,891 B2 | 4/2014 | Muraca |
| 8,703,918 B2 | 4/2014 | Colombatti et al. |
| 8,709,483 B2 | 4/2014 | Farokhzad et al. |
| 8,772,226 B2 | 7/2014 | Denmeade et al. |
| 8,772,459 B2 | 7/2014 | Ho et al. |
| 8,778,305 B2 | 7/2014 | Pomper et al. |
| 8,802,153 B2 | 8/2014 | Cheng et al. |
| 8,816,095 B2 | 8/2014 | Brown et al. |
| 8,834,842 B2 | 9/2014 | Leamon et al. |
| 8,840,865 B2 | 9/2014 | Babich et al. |
| 8,852,630 B2 | 10/2014 | Spiegel et al. |
| 8,859,509 B2 | 10/2014 | Spiegel et al. |
| 8,865,126 B2 | 10/2014 | Leamon et al. |
| 8,865,875 B2 | 10/2014 | Liu et al. |
| 8,877,970 B2 | 11/2014 | Zimmerman et al. |
| 8,901,294 B2 | 12/2014 | Kim et al. |
| 8,907,058 B2 | 12/2014 | Low et al. |
| 8,916,161 B2 | 12/2014 | Buckley |
| 8,916,167 B2 | 12/2014 | Low et al. |
| 8,926,944 B2 | 1/2015 | Babich et al. |
| 8,926,945 B2 | 1/2015 | Port et al. |
| 8,940,871 B2 | 1/2015 | Wu et al. |
| 8,946,388 B2 | 2/2015 | Sahin et al. |
| 8,962,799 B2 | 2/2015 | Babich et al. |
| 8,986,655 B2 | 3/2015 | Weiss et al. |
| 8,987,319 B2 | 3/2015 | Miller |
| 9,044,468 B2 | 6/2015 | Pomper et al. |
| 9,056,841 B2 | 6/2015 | Pomper et al. |
| 9,193,763 B2 | 11/2015 | Low et al. |
| 9,226,981 B2 | 1/2016 | Pomper et al. |
| 9,242,012 B2 | 1/2016 | Ma et al. |
| 9,278,067 B2 | 3/2016 | Boulikas |
| 9,295,727 B2 | 3/2016 | Zale et al. |
| 9,309,193 B2 | 4/2016 | Babich et al. |
| 9,629,918 B2 | 4/2017 | Low et al. |
| 9,636,413 B2 | 5/2017 | Vlahov et al. |
| 9,687,572 B2 | 6/2017 | Babich et al. |
| 9,782,493 B2 | 10/2017 | Vlahov et al. |
| 9,801,956 B2 | 10/2017 | Kularatne et al. |
| 9,808,538 B2 | 11/2017 | Kularatne et al. |
| 9,951,324 B2 | 4/2018 | Low et al. |
| 9,968,691 B2 | 5/2018 | Kularatne et al. |
| 10,046,054 B2 | 8/2018 | Low et al. |
| 10,188,759 B2 | 1/2019 | Vlahov et al. |
| 10,308,606 B2 | 6/2019 | Kularatne et al. |
| 10,363,388 B2 | 7/2019 | Fonseca et al. |
| 10,398,791 B2 | 9/2019 | Eder et al. |
| 10,406,238 B2 | 9/2019 | Low et al. |
| 10,406,240 B2 | 9/2019 | Low et al. |
| 10,456,482 B2 | 10/2019 | Kularatne et al. |
| 10,471,160 B2 | 11/2019 | Eder et al. |
| 10,485,878 B2 | 11/2019 | Low et al. |
| 10,517,956 B2 | 12/2019 | Low et al. |
| 10,517,957 B2 | 12/2019 | Low et al. |
| 10,557,128 B2 | 2/2020 | Low et al. |
| 10,624,969 B2 | 4/2020 | Low et al. |
| 10,624,970 B2 | 4/2020 | Low et al. |
| 10,624,971 B2 | 4/2020 | Low et al. |
| 10,646,581 B2 | 5/2020 | Low et al. |
| 10,688,200 B2 | 6/2020 | Kung et al. |
| 10,828,282 B2 | 11/2020 | Low et al. |
| 10,842,887 B2 | 11/2020 | Kularatne et al. |
| 10,898,596 B2 | 1/2021 | Vlahov et al. |
| 10,912,840 B2 | 2/2021 | Vlahov et al. |
| 11,045,564 B2 | 6/2021 | Eder et al. |
| 11,083,710 B2 | 8/2021 | Low et al. |
| 11,155,800 B2 | 10/2021 | Low et al. |
| 11,298,341 B2 | 4/2022 | Low et al. |
| 11,318,121 B2 | 5/2022 | Low et al. |
| 11,369,590 B2 | 6/2022 | Low et al. |
| 11,484,607 B2 | 11/2022 | Kularatne |
| 11,504,357 B2 | 11/2022 | Low et al. |
| 11,717,514 B2 | 8/2023 | Low et al. |
| 11,931,430 B2 | 3/2024 | Eder et al. |
| 11,951,190 B2 | 4/2024 | Eder et al. |
| 12,091,693 B2 | 9/2024 | Low et al. |
| 12,133,900 B2 | 11/2024 | Low |
| 12,178,892 B2 | 12/2024 | Vlahov et al. |
| 2001/0031252 A1 | 10/2001 | Low et al. |
| 2002/0001782 A1 | 1/2002 | Watanabe et al. |
| 2002/0055121 A1 | 5/2002 | Vielkind |
| 2002/0103136 A1 | 8/2002 | Feng |
| 2002/0115596 A1 | 8/2002 | Garsky et al. |
| 2002/0132983 A1 | 9/2002 | Junghans |
| 2003/0035804 A1 | 2/2003 | D'Amico et al. |
| 2003/0086900 A1 | 5/2003 | Low et al. |
| 2003/0133927 A1 | 7/2003 | DeFeo-Jones et al. |
| 2003/0138432 A1 | 7/2003 | Glazier |
| 2003/0207808 A1 | 11/2003 | Savitzky et al. |
| 2003/0215456 A1 | 11/2003 | Yao et al. |
| 2003/0220241 A1 | 11/2003 | DeFeo-Jones et al. |
| 2003/0232760 A1 | 12/2003 | Garsky et al. |
| 2004/0001846 A1 | 1/2004 | Israeli et al. |
| 2004/0002478 A1 | 1/2004 | Kozikowski et al. |
| 2004/0018203 A1 | 1/2004 | Pastan et al. |
| 2004/0029778 A1 | 2/2004 | Isaacs |
| 2004/0033195 A1 | 2/2004 | Leamon et al. |

(56) References Cited

U.S. PATENT DOCUMENTS

| | | |
|---|---|---|
| 2004/0052727 A1 | 3/2004 | Dalton et al. |
| 2004/0054190 A1 | 3/2004 | Pomper et al. |
| 2004/0058857 A1 | 3/2004 | Yao |
| 2004/0092890 A1 | 5/2004 | Ash |
| 2004/0110723 A1 | 6/2004 | Frangioni |
| 2004/0146516 A1 | 7/2004 | Roben et al. |
| 2004/0213791 A1 | 10/2004 | Bander et al. |
| 2004/0229845 A1 | 11/2004 | Frangioni |
| 2004/0242582 A1 | 12/2004 | Green et al. |
| 2005/0002942 A1 | 1/2005 | Vlahov et al. |
| 2005/0085417 A1 | 4/2005 | Wickstrom |
| 2005/0107325 A1 | 5/2005 | Manoharan et al. |
| 2005/0119166 A1 | 6/2005 | Brady et al. |
| 2005/0158780 A1 | 7/2005 | Lupold et al. |
| 2005/0234247 A1 | 10/2005 | Klar et al. |
| 2005/0239138 A1 | 10/2005 | Hess et al. |
| 2005/0239739 A1 | 10/2005 | Matulic-Adamic et al. |
| 2005/0245486 A1 | 11/2005 | Frangioni |
| 2005/0255042 A1 | 11/2005 | Lam et al. |
| 2006/0024317 A1 | 2/2006 | Boyd et al. |
| 2006/0052312 A1 | 3/2006 | Erhardt et al. |
| 2006/0062793 A1 | 3/2006 | Webb et al. |
| 2006/0105975 A1 | 5/2006 | Pendergrast et al. |
| 2006/0106047 A1 | 5/2006 | Jiang et al. |
| 2006/0140871 A1 | 6/2006 | Sillerud |
| 2006/0148718 A1 | 7/2006 | Brady et al. |
| 2006/0155021 A1 | 7/2006 | Lenges et al. |
| 2006/0155146 A1 | 7/2006 | Lenges et al. |
| 2007/0010014 A1 | 1/2007 | Wood et al. |
| 2007/0020177 A1 | 1/2007 | McGill et al. |
| 2007/0020327 A1 | 1/2007 | Fikes et al. |
| 2007/0031326 A1 | 2/2007 | Shirvan et al. |
| 2007/0031438 A1 | 2/2007 | Junghans |
| 2007/0041901 A1 | 2/2007 | Diener et al. |
| 2007/0117153 A1 | 5/2007 | Bieniarz et al. |
| 2007/0128670 A1 | 6/2007 | Klatzmann et al. |
| 2007/0134332 A1 | 6/2007 | Turnell et al. |
| 2007/0142296 A1 | 6/2007 | McBride et al. |
| 2007/0148662 A1 | 6/2007 | Israeli et al. |
| 2007/0160617 A1 | 7/2007 | Ma et al. |
| 2007/0172422 A1 | 7/2007 | Glazier |
| 2007/0179100 A1 | 8/2007 | Manoharan |
| 2007/0201277 A1 | 8/2007 | Nam |
| 2007/0219165 A1 | 9/2007 | Berkman |
| 2007/0225213 A1 | 9/2007 | Kosak |
| 2007/0244055 A1 | 10/2007 | Brady et al. |
| 2007/0254316 A1 | 11/2007 | Rodriguez et al. |
| 2007/0254317 A1 | 11/2007 | Busseret-Michel et al. |
| 2007/0280880 A1 | 12/2007 | Moser |
| 2008/0008649 A1 | 1/2008 | Cappelletti et al. |
| 2008/0008719 A1 | 1/2008 | Bowdish et al. |
| 2008/0089842 A1 | 4/2008 | Pagel et al. |
| 2008/0089869 A1 | 4/2008 | Denmeade et al. |
| 2008/0114153 A1 | 5/2008 | Steeves et al. |
| 2008/0175789 A1 | 7/2008 | Frangioni |
| 2008/0176821 A1 | 7/2008 | Kozikowski et al. |
| 2008/0193381 A1 | 8/2008 | Babich et al. |
| 2008/0214436 A1 | 9/2008 | Yu et al. |
| 2008/0248052 A1 | 10/2008 | Vlahov et al. |
| 2008/0269105 A1 | 10/2008 | Taft et al. |
| 2008/0311037 A1 | 12/2008 | Heston et al. |
| 2009/0117042 A1 | 5/2009 | Pomper et al. |
| 2009/0123467 A1 | 5/2009 | Bedi et al. |
| 2009/0180951 A1 | 7/2009 | Zimmerman et al. |
| 2009/0214636 A1 | 8/2009 | Low et al. |
| 2009/0247614 A1 | 10/2009 | Manoharan et al. |
| 2009/0258002 A1 | 10/2009 | Barrett et al. |
| 2009/0274625 A1 | 11/2009 | Denmeade et al. |
| 2010/0032400 A1 | 2/2010 | James |
| 2010/0048490 A1 | 2/2010 | Vlahov et al. |
| 2010/0055735 A1 | 3/2010 | Low et al. |
| 2010/0092496 A1 | 4/2010 | Boyd et al. |
| 2010/0178246 A1 | 7/2010 | Babich et al. |
| 2010/0183509 A1 | 7/2010 | Babich et al. |
| 2010/0183517 A1 | 7/2010 | Berkman |
| 2010/0209343 A1 | 8/2010 | Bander et al. |
| 2010/0234450 A1 | 9/2010 | Schultz et al. |
| 2010/0240701 A1 | 9/2010 | Vlahov et al. |
| 2010/0324008 A1 | 12/2010 | Low et al. |
| 2011/0008253 A1 | 1/2011 | Babich et al. |
| 2011/0027180 A1 | 2/2011 | Magnani |
| 2011/0027274 A1 | 2/2011 | Cheng et al. |
| 2011/0064657 A1 | 3/2011 | Pomper et al. |
| 2011/0142760 A1 | 6/2011 | Pomper et al. |
| 2011/0172254 A1 | 7/2011 | Leamon et al. |
| 2011/0176998 A1 | 7/2011 | Pomper et al. |
| 2011/0200677 A1 | 8/2011 | Chandran et al. |
| 2011/0256157 A1 | 10/2011 | Howard et al. |
| 2011/0288152 A1 | 11/2011 | Low et al. |
| 2012/0009121 A1 | 1/2012 | Pomper et al. |
| 2012/0269726 A1 | 10/2012 | Babich et al. |
| 2012/0276162 A1 | 11/2012 | Zale et al. |
| 2012/0322741 A1 | 12/2012 | Low et al. |
| 2013/0034494 A1 | 2/2013 | Babich et al. |
| 2013/0172406 A1 | 7/2013 | Zale et al. |
| 2013/0315821 A1 | 11/2013 | Christopher |
| 2013/0336888 A1 | 12/2013 | Babich et al. |
| 2014/0073763 A1 | 3/2014 | Low et al. |
| 2014/0107316 A1 | 4/2014 | Vlahov et al. |
| 2014/0140925 A1 | 5/2014 | Leamon et al. |
| 2014/0154702 A1 | 6/2014 | Parker et al. |
| 2014/0187501 A1 | 7/2014 | Bilodeau et al. |
| 2014/0228541 A1 | 8/2014 | Christopher |
| 2014/0314864 A1 | 10/2014 | Cheng et al. |
| 2015/0023875 A1 | 1/2015 | Farokhzad et al. |
| 2015/0079001 A1 | 3/2015 | Pomper et al. |
| 2015/0104387 A1 | 4/2015 | Pomper et al. |
| 2015/0110715 A1 | 4/2015 | Eder et al. |
| 2015/0110814 A1 | 4/2015 | Olson et al. |
| 2015/0246144 A1 | 9/2015 | Pomper et al. |
| 2015/0297735 A1 | 10/2015 | Vlahov et al. |
| 2015/0315196 A1 | 11/2015 | Howard |
| 2015/0366968 A1 | 12/2015 | Basilion |
| 2016/0045626 A1 | 2/2016 | McBride et al. |
| 2016/0208021 A1 | 7/2016 | Chang |
| 2016/0256578 A1 | 9/2016 | Tsukada |
| 2016/0256579 A1 | 9/2016 | Shalom |
| 2017/0226141 A1 | 8/2017 | Slusher |
| 2018/0027190 A1 | 1/2018 | Srinivasan |
| 2018/0207298 A1 | 7/2018 | Berkman |
| 2018/0339071 A1 | 11/2018 | Jeong |
| 2018/0346008 A1 | 12/2018 | Nahum |
| 2019/0177345 A1 | 6/2019 | Larsen |
| 2019/0389951 A1 | 12/2019 | Murphy |
| 2021/0161911 A1 | 6/2021 | Armour |
| 2021/0323985 A1 | 10/2021 | Leamon |
| 2022/0125957 A1 | 4/2022 | Armour |
| 2023/0098279 A1 | 3/2023 | Leamon |
| 2024/0181092 A1 | 6/2024 | Catafau |

FOREIGN PATENT DOCUMENTS

| | | |
|---|---|---|
| CN | 101568352 | 10/2009 |
| CN | 101678118 | 3/2010 |
| CN | 101863924 A | 10/2010 |
| CN | 103951668 A | 7/2014 |
| CN | 109134602 A | 1/2019 |
| CN | 111801121 A | 10/2020 |
| EP | 0116208 | 8/1984 |
| EP | 0116208 B1 | 3/1988 |
| EP | 2567711 | 3/2013 |
| EP | 2993171 A1 | 3/2016 |
| EP | 3116208 | 1/2017 |
| JP | 2002506204 A | 2/2002 |
| JP | 3596479 | 12/2004 |
| JP | 2004536034 A | 12/2004 |
| JP | 3625690 | 3/2005 |
| JP | 2010515732 A | 5/2010 |
| JP | 2010518112 A | 5/2010 |
| JP | 5902237 B2 | 4/2016 |
| JP | 2017530109 A5 | 10/2017 |
| JP | 6596479 B2 | 10/2019 |
| JP | 6625690 B2 | 12/2019 |
| JP | 2020530007 A | 10/2020 |

(56) References Cited

FOREIGN PATENT DOCUMENTS

| | | | |
|---|---|---|---|
| KR | 20030031905 A | 4/2003 | |
| RU | 2004136995 A | 7/2005 | |
| RU | 2404193 C2 | 11/2010 | |
| WO | 1988001622 A1 | 3/1988 | |
| WO | 1991007418 A1 | 5/1991 | |
| WO | 1995033766 A1 | 12/1995 | |
| WO | 1999045374 | 9/1999 | |
| WO | 2000064911 A1 | 11/2000 | |
| WO | 2000066091 A1 | 11/2000 | |
| WO | 2001091807 A2 | 12/2001 | |
| WO | 2002043773 | 6/2002 | |
| WO | 02062398 | 8/2002 | |
| WO | 2002098885 A1 | 12/2002 | |
| WO | 2003060523 A1 | 7/2003 | |
| WO | 2003092742 A1 | 11/2003 | |
| WO | 2003097105 A1 | 11/2003 | |
| WO | 2003097647 A1 | 11/2003 | |
| WO | 2004010957 A2 | 2/2004 | |
| WO | 2005082023 A2 | 9/2005 | |
| WO | 2006012527 A1 | 2/2006 | |
| WO | 2006096754 A2 | 9/2006 | |
| WO | 2006104911 A2 | 10/2006 | |
| WO | 2006136564 A1 | 12/2006 | |
| WO | 2007022493 A2 | 2/2007 | |
| WO | 2008088648 A2 | 7/2008 | |
| WO | 2008098112 A2 | 8/2008 | |
| WO | 2008101231 A2 | 8/2008 | |
| WO | 2009002993 A1 | 12/2008 | |
| WO | 2009079024 A1 | 6/2009 | |
| WO | 2011108125 A2 | 9/2011 | |
| WO | 2012166923 A2 | 12/2012 | |
| WO | 2013028664 A1 | 2/2013 | |
| WO | 2014062697 A2 | 4/2014 | |
| WO | 2014134543 A1 | 9/2014 | |
| WO | 2015027205 A1 | 2/2015 | |
| WO | 2015/055318 A1 | 4/2015 | |
| WO | 2015/171792 A1 | 11/2015 | |
| WO | 2016030329 A1 | 3/2016 | |
| WO | 2016040179 A1 | 3/2016 | |
| WO | 2017117687 | 7/2017 | |
| WO | 2018031507 A1 | 2/2018 | |
| WO | 2018108287 A1 | 6/2018 | |
| WO | 2018187791 A1 | 10/2018 | |
| WO | 2018191376 A2 | 10/2018 | |
| WO | 2019165200 A1 | 8/2019 | |

OTHER PUBLICATIONS

Afshar-Oromieh, et al., "[68Ga]Gallium-labelled PSMA ligand as superior PET tracer for the diagnosis of prostate cancer: comparison with 18F-FECH," 2012, European Journal of Nuclear Medicine and Molecular Imaging, 39 pp. 1085-1086.

Afshar-Oromieh, et al., "Comparison of PET imaging with a 68Ga-labelled PSMA ligand and 18F-choline-based PET/CT for the diagnosis of recurrent prostate cancer," 2014, European Journal of Nuclear Medicine and Molecular Imaging, 41(1) pp. 11-20.

Afshar-Oromieh, et al., "Comparison of PET/CT and PET/MRI hybrid systems using a 68Ga-labelled PSMA ligand for the diagnosis of recurrent prostate cancer: initial experience," 2014, European Journal of Nuclear Medicine and Molecular Imaging, 41(5) pp. 887-897.

Afshar-Oromieh, et al., "PET imaging with a [68Ga]gallium-labelled PSMA ligand for the diagnosis of prostate cancer: biodistribution in humans and first evaluation of tumour lesions," 2013, European Journal of Nuclear Medicine and Molecular Imaging, 40 pp. 486-495.

Afshar-Oromieh, et al., "PET/MRI with a 68Ga-PSMA ligand for the detection of prostate cancer," 2013, European Journal of Nuclear Medicine and Molecular Imaging, 40(10) pp. 1629-1630.

Afshar-Oromieh, et al., "The diagnostic value of PET/CT imaging with the 68Ga-labelled PSMA ligand HBED-CC in the diagnosis of recurrent prostate cancer," 2015, European Journal of Nuclear Medicine and Molecular Imaging, 42 pp. 197-209.

Agarwal, et al., "A Dimeric Peptide That Binds Selectively to Prostate-Specific Membrane Antigen and Inhibits its Enzymatic Activity," 2006, Cancer Research, 66(18) pp. 9171-9177.

Ahmadzadehfar, H. et al. "Early side effects and first results of radioligand therapy with (177)Lu-DKFZ-617 PSMA of castrate-resistant metastatic prostate cancer: a two-centre study." EJNMMI Res. Dec. 2015;5(1):114. doi: 10.1186/s13550-015-0114-2. Epub Jun. 20, 2015.

Ahmadzadehfar, H., et al., "Overall survival and response pattern of castration-resistant metastatic prostate cancer to multiple cycles of radioligand therapy using [177Lu] Lu-PSMA-617," European Journal of Nuclear Medicine and Molecular Imaging, 2017, 44(9) pp. 1448-1454.

Alt, et al., "High-Resolution Animal PET Imaging of Prostate Cancer Xenografts with Three Different 64Cu-Labeled Antibodies against Native Cell-Adherent PSMA," 2010, The Prostate, 70(13) pp. 1413-1421.

Ananias, et al., "Expression of the Gastrin-Releasing Peptide Receptor, the Prostate Stem Cell Antigen and the Prostate-Specific Membrane Antigen in Lymph Node and Bone Metastases of Prostate Cancer," 2009, The Prostate, 69(10) pp. 1101-1108.

Anderson, et al., "Substrate specificity of prostate-specific membrane antigen," 2007, Bioorganic & Medicinal Chemistry, 15(21) pp. 6678-6686.

Antunes, et al., "PGC and PSMA in prostate cancer diagnosis: tissue analysis from biopsy samples," 2013, International Brazilian Jurnal of Urology, 39(5) pp. 649-656.

Armor, et al., "A comparison of 2D and 3D regions within the same patient to derive organ and tissue kinetics," 2012, Journal of Nuclear Medicine, 53(1) pp. 13.

Australian Application Serial No. 2021200067, First Examination Report mailed Feb. 16, 2022, 4 pgs.

Bacich, et al., "Cloning, expression, genomic localization, and enzymatic activities of the mouse homolog of prostate-specific membrane antigen/NAALADase/folate hydrolase," 2001, Mammalian Genome, 12 pp. 117-123.

Baiz, et al., "Synthesis and Characterization of a Novel Prostate Cancer-Targeted Phosphatidylinositol-3-kinase Inhibitor Prodrug," 2012, Journal of Medicinal Chemistry, 55(18 pp. 8038-8046.

Banerjee, et al., "64Cu-Labeled Inhibitors of Prostate-Specific Membrane Antigen for PET Imaging of Prostate Cancer," 2014, Journal of Medicinal Chemistry, 57(6) pp. 2657-2669.

Banerjee, et al., "68Ga-Labeled Inhibitors of Prostate-Specific Membrane Antigen (PSMA) for Imaging Prostate Cancer," 2010, Journal of Medicinal Chemistry, 53(14) pp. 5333-5341.

Banerjee, et al., "A Modular Strategy to Prepare Multivalent Inhibitors of Prostate-Specific Membrane Antigen (PSMA)," 2011, Oncotarget, 2(12) pp. 1244-1253.

Banerjee, et al., "Effect of Chelators on the Pharmacokinetics of 99mTc-Labeled Imaging Agents for the Prostate-Specific Membrane Antigen (PSMA), "2013, Journal of Medicinal Chemistry, 6(15)5 pp. 6108-6121.

Banerjee, S., et al., "Sequential SPECT and Optical Imaging of Experimental Models of Prostate Cancer with a Dual Modality Inhibitor of the Prostate-Specific Membrane Antigen," 2011, Angewandte Chemie International Edition, 50(39) pp. 9167-9170.

Banerjee, S., et al., "Synthesis and Evaluation of Technetium-99m- and Rhenium-Labeled Inhibitors of the Prostate- Specific Membrane Antigen (PSMA)," 2008, Journal of Medicinal Chemistry, 51(15) pp. 4504-4517.

Barinka, et al., "A high-resolution structure of ligand-free human glutamate carboxypeptidase II," 2007, Acta Crystallographica, 63(3) pp. 150-153.

Barinka, et al., "Interactions between Human Glutamate Carboxypeptidase II and Urea-Based Inhibitors: Structural Characterization," 2008, Journal of Medicinal Chemistry, 51 pp. 7737-7743.

Barinka, et al., "Structural Insight into the Pharmacophore Pocket of Human Glutamate Carboxypeptidase II," 2007, Journal of Medicinal Chemistry, 50(14) pp. 3267-3273.

(56) References Cited

OTHER PUBLICATIONS

Barraclough, H. et al. Biostatistics Primer: What a Clinician Ought to Know: Hazard Ratios. J. Thorac. Oneal. 2011, 978-982.
Barrett, et al., "First-in-Man Evaluation of 2 High-Affinity PSMA-Avid Small Molecules for Imaging Prostate Cancer," 2013, Journal of Nuclear Medicine, 54(3) pp. 380-387.
Beheshti, et al., "Prostate Cancer: Role of SPECT and PET in Imaging Bone Metastases," 2009, Seminars in Nuclear Medicine, 39(6) pp. 396-407.
Behr, S.C. et al. Phase I Study of CTT1057, an 18F-Labeled Imaging Agent with Phosphoramidate Core Targeting Prostate-Specific Membrane Antigen in Prostate Cancer. J Nucl Med 2019; 60:910-916.
Bellmunt et al., "Castration-resistant prostate cancer: new science and therapeutic prospects." Therapeutic advances in medical oncology. May 2010; 2(3):189-207.
Belloli, et al., "Characterization of preclinical models of prostate cancer using PET-based molecular imaging," 2009, European Journal of Nuclear Medicine and Molecular Imaging, 36 pp. 1245-1255.
Benesova, M., et al., "Linker Modifications of DOTA-conjugated Inhibitors of the Prostate-Specific Membrane Antigen (PSMA)," abstract, European Journal of Nuclear Medicine and Molecular Imaging, available Oct. 16, 2013,40, Suppl. 2, S193.
Benesova, M., et al., "Linker Modifications of DOTA-conjugated Inhibitors of the Prostate-Specific Membrane Antigen (PSMA)," poster, presented at the European Association of Nuclear Medicine Conference on Oct. 21, 2013.
Bennett, V. and Simmons, M.," Analysis of fluorescently labeled substance P analogs: binding, imaging and receptor activation," 2001, BMC Chemical Biology, 1:1. doi: 10.1186/1472-6769-1-1.
Bostwick, et al., "Prostate Specific Membrane Antigen Expression in Prostatic Intraepithelial Neoplasia and Adenocarcinoma," 1998, Cancer, 82(11) pp. 2256-2261.
Bouchelouche, et al., -Image and treat': an individualized approach to urological tumors, 2010, Current Opinion in Oncology, 22(3) pp. 274-280.
Bouchelouche, et al., "Imaging Prostate Cancer: An Update on Positron Emission Tomography and Magnetic Resonance Imaging," 2010, Current Urology Reports, 11 pp. 180-190.
Bouchelouche, et al., "PET/CT Imaging and Radioimmunotherapy of Prostate Cancer," 2011, Seminar in Nuclear Medicine, 41(1) pp. 29-44.
Bouchelouche, et al., "Prostate Specific Membrane Antigen—A Target for Imaging and Therapy with Radionuclides," 2010, Discovery Medicine, 9(44) pp. 55-61.
Bouchelouche, K., et al., "Positron emission tomography/computed tomography and radioimmunotherapy of prostate cancer," Current Opinion in Oncology, 21(5) pp. 469-474.
Brauer, A et al., "177Lu-PSMA-617 radioligand therapy and outcome in patients with metastasized castration-resistant prostate cancer," European Journal of Nuclear Medicine and Molecular Imaging, 2017, 44(10) pp. 1663-1670.
Bzdega, et al., "The cloning and characterization of a second brain enzyme with NAAG peptidase activity," 2004, Journal of Neurochemistry, 89(3) pp. 627-635.
Calais, J. et al. Prospective phase 2 trial of PSMA-targeted molecular Radiotherapy with 177Lu-PSMA-617 for metastatic castration-reSISTant Prostate Cancer (RESIST-PC): efficacy results of the UCLA cohort. J Nucl Med, 2021, 62:1440-1446.
Ceci, et al., "11C-Choline PET/CT in patients with hormone-resistant prostate cancer showing biochemical relapse after radical prostatectomy," 2013, European Journal of Nuclear Medicine and Molecular Imaging, 40(2) pp. 149-155.
Chandran, et al., "Characterization of a targeted nanoparticle functionalized with a urea-based inhibitor of prostate- specific membrane antigen (PSMA)," 2008, Cancer Biology & Therapy, 7(6) pp. 974-982.
Chang, et al., "Five Different Anti-Prostate-specific Membrane Antigen (PSMA) Antibodies Confirm PSMA Expression in Tumor-associated Neovasculature," 1999, Cancer Research, 59(13) pp. 3192-3198.
Chang, et al., "The clinical role of prostate-specific membrane antigen (PSMA)," 2002, Urologic Oncology, 7(1) pp. 7-12.
Chatalic, K. et al. Towards Personalized Treatment of Prostate Cancer: PSMA I&T, a Promising Prostate-Specific Membrane Antigen-Targeted Theranostic Agent. Theranostics. 2016; 6(6): pp. 849-861.
Minner, et al., "High Level PSMA Expression Is Associated With Early PSA Recurrence in Surgically Treated Prostate Cancer," 2011, The Prostate, 71(3) pp. 281-288.
Mlcochova, et al., "Mapping of the active site of glutamate carboxypeptidase II by site-directed mutagenesis," 2007, FEBS Journal, 274 pp. 4731-4741.
Moltzahn, et al., "Die ossare Metastasierung des Prostatakarzinoms," 2012, Urologe, 51 pp. 20-26.
Moltzhan, et al., "Bone Metastasis in Prostate Cancer," English translation, 2012, Urologe, 51(1) pp. 20-26.
Morris, et al., "11C-acetate PET imaging in prostate cancer," 2007, European Journal of Nuclear Medicine and Molecular Imaging, 34 pp. 181-184.
Muller, C., et al., "Synthesis and in Vitro/in Vivo Evaluation of Novel 99mTc(CO)3-Folates," 2006, Bioconjugate Chemistry, 17(3) pp. 797-806.
Murphy, et al., "Current Evaluation of the Tissue Localization and Diagnostic Utility of Prostate Specific Membrane Antigen," 1998, Cancer, 83(11) pp. 2259-2269.
Nan, F., et al., "Dual Function Glutamate-Related Ligands: Discovery of a Novel, Potent Inhibitor of Glutamate Carboxypeptidase II Possessing mGluR3 Agonist Activity," 2000, Journal of Medicinal Chemistry, 43(5) pp. 772-774.
Nedelcovych, M.T. et al. JHU-2545 selectively shields salivary glands and kidneys during PSMA-targeted radiotherapy. bioRxiv. Oct. 30, 2018:457085.
Nedrow-Byers, et al., "A Phosphoramidate-Based Prostate-Specific Membrane Antigen-Targeted SPECT Agent," 2012,The Prostate, 72(8) pp. 904-912.
Nedrow-Byers, et al., "PSMA-Targeted SPECT Agents: Mode of Binding Effect on In Vitro Performance," 2013, The Prostate, 73(4) pp. 355-362.
New Zealand Application Serial No. 758917, Subsequent Examiners Report mailed Feb. 9, 2022, 1 pg.
O'Keefe, et al., "Comparative Analysis of Prostate-Specific Membrane Antigen (PSMA) Versus a Prostate-Specific Membrane Antigen-Like Gene," 2004, The Prostate, 58(2) pp. 200-210.
Oehr et al., "Imaging of prostate cancer," 2007, Current Opinion in Oncology, 19 pp. 259-264.
Olsnes, S., et al., "Immunotoxins-Entry into Cells and Mechanisms of Action," 1989, Immunology Today, 10(9) pp. 291-295.
Oluwatayo F. Ikotun et al., "Investigation of a Vitamin☐B 12 Conjugate as a PET Imaging Probe", Chemmedchem, DE, (Apr. 17, 2014), vol. 9, No. 6, doi:10.1002/cmdc.201400048, ISSN 1860-7179, pp. 1244-1251, XP055350292.
Omlin, et al., "Androgen- and Ostrogen-biosynthesehemmer beim kastrationsresistenten Prostatakarzinom," 2012, Urologe, 51 pp. 8-14.
Omlin, et al., "Inhibitors of Androgen and Estrogen Biosynthesis in Castration-Resistant Prostate Cancer," English translation, 2012, Urologe, 51(1) pp. 8-14.
Osborne, et al., "A Prospective Pilot Study of 89Zr-J591/Prostate Specific Membrane Antigen Positron Emission Tomography in Men with Localized Prostate Cancer Undergoing Radical Prostatectomy," 2014, The Journal of Urology, 19195) pp. 1439-1445.
Oyama et al., "11C-Acetate PET Imaging of Prostate Cancer: Detection of Recurrent Disease at PSA Relapse," J Nucl Med 2003; 44:549-555.
Oyama, et al., "11C-Acetate PET Imaging of Prostate Cancer," 2002, Journal of Nuclear Medicine, 43(2) pp. 181-186.
Oyama, et al., "PET Imaging in Prostate Cancer," 2006, Hinyokika Kiyo, 52(6) pp. 503-505.

(56) References Cited

OTHER PUBLICATIONS

Paranjpe, P., et al., "Tumor-targeted bioconjugate based delivery of camptothecin: design, synthesis and in vitro evaluation," 2004, ScienceDirect Journal of Controlled Release, 100(2) pp. 275-292.
Parker, et al., "Design, production, and characterization of a single-chain variable fragment (ScFv) derived from the prostate specific membrane antigen (PSMA) monoclonal antibody J591," 2013, Protein Expression and Purification, 89(2) pp. 136-145.
Pathak, T., et al., "Enzymic Protecting Group Techniques in Organic Synthesis," 2000, Stereoselective Biocatalysis pp. 775-797.
Pavlicek, et al., "Glutamate Carboxypeptidase II: An Overview of Structural Studies and Their Importance for Structure-Based Drug Design and Deciphering the Reaction Mechanism of the Enzyme," 2012, Current Medicinal Chemistry, 19(9) pp. 1300-1309.
Pavlicek, et al., "Structural characterization of P1'-diversified urea-based inhibitors of glutamate carboxypeptidase II," 2014, Bioorganic & Medicinal Chemistry Letters, 24(10) pp. 2340-2345.
PCT International Search Report and Written Opinion for PCT/US2011/026238, mailed Apr. 27, 2011.
PCT International Search Report and Written Opinion for PCT/US2013/070007, mailed Mar. 5, 2014.
PCT International Search Report and Written Opinion prepared for PCT/US2019/027720, completed May 30, 2019.
PCT International Search Report for PCT/US2008/073375 dated Oct. 26, 2008.
PCT International Search Report for PCT/US2016/012653, completed Mar. 11, 2016.
PCT International Search Report/Written Opinion for PCT/US2009/061049, completed Mar. 15, 2010.
PCT International Search Report/Written Opinion for PCT/US2009/061067, completed May 28, 2010.
PCT Search Report & Written Opinion issued in App. No. PCT/US2014/065467, mailed Apr. 15, 2015.
PCT Search Report and Written Opinion prepared for PCT/US2019/051903, completed Oct. 25, 2019.
PCT Search Report and Written Opinion prepared for PCT/US2019/052161, completed Dec. 18, 2019.
PCT Search Report and Written Opinion prepared for PCT/US2021/018447, completed May 6, 2021.
Peltier, H., et al., "The Total Synthesis of Tubulysin D,"2006, Journal of the American Chemical Society, 128(50) p. 16018-16019.
Perner, et al., "Prostate-specific membrane antigen expression as a predictor of prostate cancer progression," 2007, Human Pathology, 38(5) pp. 696-701.
Pillarsetty, et al., "2-18F-Fluoropropionic Acid as a PET Imaging Agent for Prostate Cancer," 2009, Journal of Nuclear Medicine, 50(10) pp. 1709-1714.
Pinto, et al., "Imaging in Prostate Cancer Staging: Present Role and Future Perspectives," 2012, Urology International, 88 pp. 125-136.
Pomper, M., et al., "11C-MCG: synthesis, uptake selectivity, and primate PET of a probe for glutamate carboxypeptidase II (NAALADase)," 2002, Molecular Imaging, 1(2) pp. 96-101.
Ponde, et al., "18F-Fluoroacetate: A Potential Acetate Analog for Prostate Tumor Imaging-In Vivo Evaluation of 18F-Fluoroacetate Versus 11C-Acetate," 2007, Journal of Nuclear Medicine, 48(3) pp. 420-428.
Poulsen, et al., "[18F] fluoromethylcholine (FCH) positron emission tomography/computed tomography (PET/CT) for lymph node staging of prostate cancer: a prospective study of 210 patients," 2012, BJU International, 110(11) pp. 1666-1671.
Poulsen, et al., "[18F]-fluorocholine positron-emission/computed tomography for lymph node staging of patients with prostate cancer: preliminary results of a prospective study," 2010, BJU International, 106(5) pp. 639-644.
Preusser, et al., "Castration-Resistant Prostate Cancer," English translation, 2012, Urologe, 51(1) pp. 27-31.
Preusser, et al., "Kastrationsresistentes Prostatakarzinom," 2012, Urologe, 51 pp. 27-31.
Pubchem, Compound summary for: CID 58099954, Aug. 19, 2012.
Radioisotopes in Medicine, from http://www.word-nuclearorg/information-library/non-power-nuclear applications/radioisotopes-research/radioisotopes-in-medicine.aspx, Dec. 28, 2016, pp. 1-20.
Benesova et al., "Preclinical Evaluation of a Tailor-Made DOTA-Conjugated PSMA Inhibitor with Optimized Linker Moiety for Imaging and Endoradiotherapy of Prostate Cancer," J Nucl Med. 56(6):914-20 (2015).
Benesova et al., "Linker Modification Strategies To Control the Prostate-Specific Membrane Antigen (PSMA)-Targeting and Pharmacokinetic Properties of DOTA-Conjugated PSMA Inhibitors," J Med Chem. 59(5):1761-75 (2016).
Lymperis et al., "Radiometal-Dependent Biological Profile of the Radiolabeled Gastrin-Releasing Peptide Receptor Antagonist SB3 in Cancer Theranostics: Metabolic and Biodistribution Patterns Defined by Neprilysin," Bioconjug Chem. 29(5):1774-84 (2018).
Pratesi et al., "Design and solid phase synthesis of new DOTA conjugated (+)-biotin dimers planned to develop molecular weight-tuned avidin oligomers," Accepted Manuscript for Org Biomol Chem, pp. 1-15 (2013).
Rossi et al., "N-Nmoc-L-glutamate, a new caged glutamate with high chemical stability and low pre-photolysis activity," J Biol Chem. 272(52):32933-9 (1997).
International Search Report and Written Opinion for International Patent Application No. PCT/US2020/033584, mailed Aug. 14, 2020 (12 pages).
European Search Report in EP 20180928, completed Dec. 7, 2020.
European Supplemental Search Report, prepared for EP Application No. 21757774, completed Jun. 5, 2024.
Evans, et al., "Noninvasive measurement of androgen receptor signaling with a positron-emitting radiopharmaceutical that targets prostate-specific membrane antigen," 2011, Proceedings of the National Academy of Sciences of the United States of America, 108(23) pp. 9578-9582.
Fair, et al., "Prostate-Specific Membrane Antigen," 1997, The Prostate, 32(2) pp. 140-148.
Fall, et al., "Prostate-Specific Antigen Levels as a Predictor of Lethal Prostate Cancer, "2007, Journal of the National Cancer Institute, 99(7) pp. 526-532.
Fani, M. et al. In vivo imaging of folate receptor positive tumor xenografts using novel 68Ga-NODAGA-folate conjugates. Mol Pharm. May 7, 2012;9(5):1136-45.
Farokhzad, O., et al., "Nanoparticle-Aptamer Bioconjugates: A New Approach for Targeting Prostate Cancer Cells," 2004, Cancer Research, 64(21) pp. 7668-7672.
Fay, A.P. et al. Blocking the PD-1/PD-LI axis in advanced prostate cancer: are we moving in the right direction? Ann Transl Med 2019;7(Suppl I):S7.
Fendler et al.(177Lu-PSMA Radioligand Therapy for Prostate Cancer. Journal of Nuclear Medicine Aug. 2017, 58 (8) 1196-1200) (Year: 2017).
Fortmuller, et al., "Effective Targeting of Prostate Cancer by Lymphocytes Redirected by a PSMAx CD3 Bispecific Single-Chain Diabody," 2011, The Prostate, 71(6) pp. 588-596.
Fortuin, et al., "Value of PET/CT and MR Lymphography in Treatment of Prostate Cancer Patients With Lymph Node Metastases," 2012, International Journal of Radiation Oncology, Biology, Physics, 84(3) pp. 712-718.
Foss, C., et al. "Radiolabeled Small-molecule Ligands for Prostate-specific Membrane Antigen: In vivo Imaging in Experimental Models of Prostate Cancer," 2005, Clinical Cancer Research, 11(11) pp. 4022-4028.
Foss, et al., "GCPII Imaging and Cancer," 2012, Current Medicinal Chemistry, 19(9) pp. 1346-1359.
Foss, et al., "Synthesis and Validation of a Novel Small-Molecule Fluorescent Probe for PSMA Expression in Human Tumor Neovasculature," 2005, Abstract. Abstract ID: 362.
Franc, et al., "Detection and localization of carcinoma within the prostate using high resolution transrectal gamma imaging (TRGI) of monoclonal antibody directed at prostate specific membrane antigen (PSMA)—Proof of concept and initial imaging results," 2013, European Journal of Radiology, 82(11) pp. 1877-1884.

(56) References Cited

OTHER PUBLICATIONS

Frigerio, et al., "A single-chain fragment against prostate specific membrane antigen as a tool to build theranostic reagents for prostate cancer," 2013, European Journal of Cancer, 49(9) pp. 2223-2232.
Ghosh, et al., "Tumor Target Prostate Specific Membrane Antigen (PSMA) and its Regulation in Prostate Cancer," 2004, Journal of Cellular Biochemistry, 91(3) pp. 528-539.
Giovacchini, et al., "Predictive factors of [11C]choline PET/CT in patients with biochemical failure after radical prostatectomy," 2010, European Journal of Nuclear Medicine and Molecular Imaging, 37(2) pp. 301-309.
Gomez-Hens, A. and Aguilar-Caballos, M., "Long Wavelength Fluorophores: New Trends in Their Analytical Use," 2004, Trends in Analytical Chemistry, 23(2), pp. 127-136.
Goodman Jr., et al., "Interaction of prostate specific membrane antigen with clathrin and the adaptor protein complex-2," 2007, International Journal of Oncology, 31(5) pp. 1199-1203.
Grant et al., "Prostate Specific Membrane Antigen (PSMA) Regulates Angiogenesis Independently of VEGF during Ocular Neovascularization," PLoS ONE 7(7): e41285.
Greene, T., and Wuts, P., "Protective Groups ion Organic Synthesis," 2d edition, John Wiley & Sons, Inc. New York (1991).
Gregor, et al., "Induction of autoantibodies to syngeneic prostate-specific membrane antigen by xenogeneic vaccination," 2005, International Journal of Cancer, 116(3) pp. 415-421.
Haberkorn, et al., "Mechanistic and high-throughput approaches for the design of molecular imaging probes and targeted therapeutics," 2014, Clinical and Translational Imaging, 2 pp. 33-41.
Haffner, et al., "Prostate-specific membrane antigen expression in the neovasculature of gastric and colorectal cancers," 2009, Human Pathology, 40(12) pp. 1754-1761.
Hain, et al., "Positron emission tomography for urological tumours," 2003, BJU International, 92(2) pp. 159-164.
Hamilou et al., "Treatment of Castration-naive Metastatic Prostate Cancer" European Urology Focus, 2017, vol. 3, No. 6, pp. 518-521. (Year: 2017).
Hara, et al., "11C-Choline and 2-Deoxy-2-[18F]Fluoro-D-Glucose in Tumor Imaging with Positron Emission Tomography," 2002, Molecular Imaging and Biology, 4(4) pp. 267-273.
Hara, et al., "Development of 18F-Fluoroethylcholine for Cancer Imaging with PET: Synthesis, Biochemistry, and Prostate Cancer Imaging," 2002, Journal of Nuclear Medicine, 43(2) pp. 187-199.
Hara, et al., "PET Imaging of Prostate Cancer Using Carbon-11-Choline," 1998, Journal of Nuclear Medicine, 39(6) pp. 990-995.
Harada, et al., "Preparation of Asymmetric Urea Derivatives that Target Prostate-Specific Membrane Antigen for SPECT Imaging, "2013, Journal of Medicinal Chemistry, 56(20) pp. 7890-7901.
Haseman, M., et al., "Capromab Pendetide Imaging of Prostate Cancer," 2009, Cancer Biotherapy and Radiopharmaceuticals, 15(2) pp. 131-140.
Heidenreich, A., "Immunotherapy For Metastatic Prostate Cancer-Do We Really Need This?," English translation (Abstract Only), 2012, Urologe, 51(1) pp. 32-38.
Heidenreich, A., "Immuntherapie beim metastasierten Prostatakarzinom—brauchen wir diese wirklich?," 2012, Urologe, 51 pp. 32-38.
Henne, W., et al., "Synthesis and activity of a folate peptide camptothecin prodrug," 2006, ScienceDirect, Bioorganic & Medical Chemistry Letters 16(20) pp. 5350-5355.
Henry, et al., "A Prostate-Specific Membrane Antigen-Targeted Monoclonal Antibody—Chemotherapeutic Conjugate Designed for the Treatment of Prostate Cancer," 2004, Cancer Research, 64(21) pp. 7995-8001.
Hillier, et al., "[131I] MIP-1466, a small molecule prostate-specific membrane antigen (PSMA) inhibitor for targeted radiotherapy of prostate cancer (PCa),"2012, Journal of Nuclear Medicine, 53(1) p. 170.
Hillier, et al., "123I-MIP-1072, a Small-Molecule Inhibitor of Prostate-Specific Membrane Antigen, Is Effective at Monitoring Tumor Response to Taxane Therapy," 2011, Journal of Nuclear Medicine, 52(7) pp. 1087-1093.
Hillier, et al., "99mTc-Labeled Small-Molecule Inhibitors of Prostate-Specific Membrane Antigen for Molecular Imaging of Prostate Cancer," 2013, Journal of Nuclear Medicine, 54(8) pp. 1369-1376.
Hillier, S., et al., "Preclinical Evaluation of Novel Glutamate-Urea-Lysine Analogues That Target Prostate-Specific Membrane Antigen as Molecular Imaging Pharmaceuticals for Prostate Cancer," 2009, Cancer Research, 69(17) pp. 6932-6940.
Hlouchova, et al., "Biochemical characterization of human glutamate carboxypeptidase III," 2007, Journal of Neurochemistry, 101(3) pp. 682-696.
Hlouchova, et al., "GCPII Variants, Paralogs and Orthologs," 2012, Current Medicinal Chemistry, 19(9) pp. 1316-1322.
Hlouchova, et al., "Structural insight into the evolutionary and pharmacologic homology of glutamate carboxypeptidases II and III," 2009, FEBS Journal, 276) 16) pp. 4448-4462.
Ho, et al., "Molecular Imaging, Pharmacokinetics, and Dosimetry of 111In-AMBA in Human Prostate Tumor-Bearing Mice," 2011, Journal of Biomedicine and Biotechnology, Article ID 101497,8 pages.
Hofman, M.S., et al., "[177Lu]Lu-PSMA-617 versus cabazitaxel in patients with metastatic castration-resistant prostate cancer (TheraP): a randomised, open-label, phase 2 trial," Published Online at The Lancet, Articles, Feb. 11, 2021, pp. 1-8.
Holland, et al., "89Zr-DFO-J591 for ImmunoPET of Prostate-Specific Membrane Antigen Expression In Vivo," 2010, Journal of Nuclear Medicine, 51(8) pp. 1293-1300.
Hong, et al., "Positron emission tomography imaging of prostate cancer," 2010, Amino Acids, 39(1) pp. 11-27.
Hospers, et al., "PET Imaging of Steroid Receptor Expression in Breast and Prostate Cancer," 2008, Current Pharmaceutical Design, 14(28) pp. 3020-3032.
Huang, et al., "Improving the Biodistribution of PSMA-Targeting Tracers With Highly Negatively Charged Linker," 2014, The Prostate, 74(7) pp. 702-713.
Huang, et al., "PSMA-Targeted Stably Linked Dendrimer-Glutamate Urea-Methotrexate' as a Prostate Cancer Therapeutic," 2014, Biomacromolecules, 15(3) pp. 915-923.
Humblet, et al., "High-affinity Near-infrared Fluorescent Small-molecule Contrast Agents for In Vivo Imaging of Prostate-specific Membrane Antigen," 2005, Molecular Imaging, 4(4) pp. 448-462.
Humblet, et al., "Multivalent Scaffolds for Affinity Maturation of Small Molecule Cell Surface Binders and Their Application to Prostate Tumor Targeting," 2009, Journal of Medicinal Chemistry, 52(2) pp. 544-550.
Humblet, V., et al., "An HPLC/mass spectrometry platform for the development of multimodality contrast agents and targeted therapeutics: prostate-specific membrane antigen small molecule derivatives," 2006, Contrast Media and Molecular Imaging, 1(5) pp. 196-211.
Husarik, et al., "Evaluation of [18F]-choline PET/CT for staging and restaging of prostate cancer," 2008, European Journal of Nuclear Medicine and Molecular Imaging, 35 pp. 253-263.
Hwang, et al., "Imaging Prostate Derived Tumors with PET and N-(3-[18F]Fluoropropyl)putrescine," 1990, Nuclear Medicine and Biology, 17(6) pp. 525-532.
Hwang, et al., "N-3-[18F]Fluoropropylputrescine as Potential PET Imaging Agent for Prostate and Prostate Derived Tumors," 1989, Journal of Nuclear Medicine, 30(7) pp. 1205-1210.
Igerc, et al., "The value of 18F-Choline PET/CT in patients with elevated PSA-level and negative prostate needle biopsy for localisation of prostate cancer," 2008, European Journal of Nuclear Medicine and Molecular Imaging, 35(5) pp. 976-983.
ISTARD Posters, 2012, European Journal of Nuclear Medicine and Molecular Imaging, 39(2) pp. 304-353.
Jackson, et al., "Design, Synthesis, and Biological Activity of a Potent Inhibitor of the Neuropeptidase N-Acetylated a-Linked Acidic Dipeptidase," 1996, Journal of Medicinal Chemistry, 39(2) pp. 619-622.

(56) References Cited

OTHER PUBLICATIONS

Jackson, P. and Slusher, B., "Design of NAALADase Inhibitors: A Novel Neuroprotective Strategy," 2001, Current Medicinal Chemistry, 8(8) pp. 949-957.
Jadvar, et al., "Glucose Metabolism of Human Prostate Cancer Mouse Xenografts," 2005, Molecular Imaging, 4(2) pp. 91-97.
Jadvar, et al., "Imaging evaluation of prostate cancer with 18F-fluorodeoxyglucose PET/CT: utility and limitations," 2013, European Journal of Nuclear Medicine and Molecular Imaging, 40 (Suppl 1) pp. S5-S10.
Jadvar, et al., "Molecular imaging of prostate cancer with 18F-fluorodeoxyglucose PET," 2009, Nature Reviews Urology, 6(6) pp. 317-323.
Jadvar, et al., "Molecular Imaging of Prostate Cancer: PET Radiotracers," 2012, AJR, 199 pp. 278-291.
Jambor, et al., "Functional Imaging of Localized Prostate Cancer Aggressiveness Using 11C-Acetate PET/CT and 1H-MR Spectroscopy," 2010, Journal of Nuclear Medicine, 51(11) pp. 1676-1683.
James, Shelly, "Urea based rhenium tricarbonyl dipeptide compounds as potential radiopharmaceuticals for PSMA imaging." Poster. INOR258.
Jayaprakash, S., et al. "Design and Synthesis of a PSMA inhibitor—doxorubicin Conjugate for Targeted Prostate Cancer Therapy," 2006, ChemMedChem, 1(3) pp. 299-302.
Jemaa, et al., "A Comparison of the Biological Features of Prostate Cancer with (PSA+, PSMA+) Profile according to RKIP," 2013, BioMed Research International, 2013(12) Article ID 409179,7 pages.
Jemaa, et al., "A novel regulation of PSMA and PSA expression by Q640X Ar in 22Rv1 and LNCaP prostate cancer cells," 2013, Cell Biology International, 37(5) pp. 464-470.
Jemaa, et al., "Cellular distribution and heterogeneity of PSA and PSMA expression in normal, hyperplasia and human prostate cancer," 2013, La Tunisie Medicale, 91(7) pp. 458-463.
Jeong, et al., "Preparation of a Promising Angiogenesis PET Imaging Agent: 68Ga-Labeled c(RGDyK)-Isothiocyanatobenzyl-1,4,7-Triazacyclononane-1,4,7-Triacetic Acid and Feasibility Studies in Mice," 2008, The Journal of Nuclear Medicine, 49(5) pp. 830-836.
Jivan, S. et al. P 140: Fully automated preparation of [18FJCTT1057, a new prostate cancer imaging agent, prepared using the ORA Neptis Perform Synthesizer®. 22nd International Symposium on Radiopharmaceutical Sciences, Poster: S297, J Label Compd Radiopharm, 2017: 60 (Suppl. 1): S111-S640.
Kahn, et al., "111Indium-Capromab Pendetide in the Evaluation of Patients with Residual or Recurrent Prostate Cancer After Radical Prostatectomy," 1998, The Journal of Urology, 159(6) pp. 2041-2047.
Kairemo K. et al., Lu-177-PSMA treatment for metastatic prostate cancer-case examples of miracle responses, Urology Herald, Jul. 3, 2018 , v. 6, No. 1, p. 65-75.
Kasperzyk, et al., "Prostate-Specific Membrane Antigen Protein Expression in Tumor Tissue and Risk of Lethal Prostate Cancer," Cancer Epidemiol Biomarkers Prey, 22(12) pp. 2354-2363.
Kasten, et al., "Targeting prostate cancer cells with PSMA inhibitor-guided gold nanoparticles," 2013, Bioorganic & Medicinal Chemistry Letters, 23(2) pp. 565-568.
Kaur, G., et al., "Biological evaluation of tubulysin A: a potential anticancer and antiangiogenic natural product," 2006, Biochemical Journal, 396(2) pp. 235-242.
Khreish, F. et al.225Ac-PSMA-617/1 77Lu-PSMA-617 tandem therapy of metastatic castration-resistant prostate cancer: pilot experience. European Journal of Nuclear Medicine and Molecular Imaging (2020) 47:721-728. https://doi.org/10. 1007/s00259-019-04612-0.
Kim, et al., "Tribody: Robust Self-Assembled Trimeric Targeting Ligands with High Stability and Significantly Improved Target-Binding Strength," 2013, Biochemistry, 52(41) pp. 7283-7294.
Kinoshita, et al., "Expression of Prostate-Specific Membrane Antigen in Normal and Malignant Human Tissues," 2006, World Journal of Surgery, 30(4) pp. 628-636.

Klotz, L. "Cancer overdiagnosis and overtreatment," 2012, Current Opinion in Urology, 22(3) pp. 203-209.
Klusak, et al., "Reaction Mechanism of Glutamate Carboxypeptidase II Revealed by Mutagenesis, X-ray Crystallography, and Computational Methods," 2009, Biochemistry, 48(19) pp. 4126-4138.
Korean Application Serial No. 10-2016-7015740, Notice of Preliminary Rejection mailed Nov. 19, 2020, (w/ English translation), 12 pgs.
Koseki, Y et al., "Drug release is determined by the chain length of fatty acid-conjugated anticancer agent as one component of nano-prodrug." Bulletin of the Chemical Society of Japan. May 2016; 89(5): 540-5.
Kosuri, et al., "Review of Salvage Therapy for Biochemically Recurrent Prostate Cancer: The Role of Imaging and Rationale for Systemic Salvage Targeted Anti-Prostate-SpecificMembrane Antigen Radioimmunotherapy," 2012, Advances in Urology, 2012(6) Article ID 921674,8 pages.
Kothari, et al., "18F-labeled small molecule inhibitors of prostate specific membrane antigen (PSMA) for PET imaging of prostate cancer," 2012, Journal of Nuclear Medicine, 53(1) pp. 1721.
Kotzerke, et al., "PET for Prostate Cancer Imaging: Still a Quandary or the Ultimate Solution?," 2002, The Journal of Nuclear Medicine, 43(2) pp. 200-202.
Kovar, et al., "Pharmacokinetic and Biodistribution Assessment of a Near Infrared-Labeled PSMA-Specific Small Molecule in Tumor-Bearing Mice," 2014, Prostate Cancer, 2014 Article ID 104248,10 pages.
Kozikowski, A., et al., "Design of Remarkably Simple, Yet Potent Urea-Based Inhibitors of Glutamate Carbozypeptidase II (NAALADase)," 2001, Journal of Medicinal Chemistry, 44(3) pp. 298-301.
Kozikowski, A., et al., "Synthesis of Urea-Based Inhibitors as Active Site Probes of Glutamate Carboxypeptidase II: Efficacy as Analgesic Agents," 2004, Journal of Medicinal Chemistry, 47(7) pp. 1729-1738.
Kratochwil, C et al. "Targeted alpha-Therapy of Metastatic Castration-Resistant Prostate Cancer with 225Ac-PSMA-617: Swimmer-Plot Analysis Suggests Efficacy Regarding Duration of Tumor Control"; J Nucl Med. 2018. vol. 59, No. 5, pp. 795-802, DOI: 10.2967/jnumed. 117.203539, Jan. 11, 2018 (Jan. 11, 2018).
Kratochwil, C., et al., "[177Lu]Lutetium-labelled PSMA ligand-induced remission in a patient with metastatic prostate cancer," Eur J Nucl Med Mol Imaging, 2015, 42, 987-88.
Kratochwil, C., et al., "PSMA-Targeted Radionuclide Therapy of Metastatic Castration-Resistant Prostate Cancer with 177 Lu-Labeled PSMA-617," The Journal of Nuclear Medicine, Mar. 16, 2016, 57(8) pp. 1170-1176.
Kratochwil, et al. "225Ac-PSMA-617 for PSMA-Targeted a-Radiation Therapy of Metastatic Castration-Resistant Prostate Cancer." J Nucl Med 2016; 57:1941-1944. DOI: 10.2967/ jnumed.116.178673.
Krohn, et al., "[68Ga]PSMA-HBED uptake mimicking lymph node metastasis in coeliac ganglia: an important pitfall in clinical practice," 2015, European Journal of Nuclear Medicine and Molecular Imaging, 42(2) pp. 210-214.
Kularatne, et al., "Design, Synthesis, and Preclinical Evaluation of Prostate-Specific Membrane Antigen Targeted 99mTc-Radioimaging Agents," 2009, Molecular Pharmaceuticals, 6(3) pp. 790-800.
Kularatne, S., et al., "Comparative Analysis of Folate Derived PET Imaging Agents with [18F]-2-Fluoro-2-deoxy-D-glucose Using Rodent Inflammatory Paw Model," 2013, Molecular Pharmaceutics, 10(8)pp. 3103-3111.
Kularatne, S., et al., "Prostate-specific membrane antigen targeted imaging and therapy of prostate cancer using a PSMA inhibitor as a homing ligand," 2009, Molecular Pharmaceutics, 6(3) pp. 780-789.
Kularatne, S., et al., "Synthesis and Biological Analysis of Prostate-Specific Membrane Antigen-Targeted Anticancer Prodrugs," 2010, Journal of Medicinal Chemistry, 53(21) pp. 7767-7777.
Kuru et al., "MRT-navigierte stereotaktische Prostatabiopsie," Urologe 2012—51:50-56.
Rahbar, K. et al., "Delayed response after repeated 177Lu-PSMA-617 radioligand therapy in patients with metatstatic castration

(56) References Cited

OTHER PUBLICATIONS resistant prostate cancer," European Journal of Nuclear Medicine and Molecular Imaging, 2017, 45(2) pp. 243-246.
Rais, et al., "Bioanalytical method for evaluating the pharmacokinetics of the GCP-II inhibitor 2-phosphonomethylpentanedioicacid (2-PMPA)," 2014, Journal of Pharmaceutical and Biomedical Analysis, 88(25) pp. 162-169.
Rajasekaran, et al., "A Novel Cytoplasmic Tail MXXXL Motif Mediates the Internalization of Prostate-specific Membrane Antigen," 2003, Molecular Biology of the Cell, 14(12) pp. 4835-4845.
Ranasinghe, M., et al., " A Facile Synthesis of Unsymmetrical Thiolsulfonates via Sulfonylation of Mercaptans," 1988, Synthetic Communications, 18(3) pp. 227-232.
Rathke, H et al. Repeated 177Lu-Labeled PSMA-617 Radioligand Therapy Using Treatment Activities of Up to 9.3 GBq. J Nucl Med, 2018, 59, 459-465.
Reddy, J., et al., "PSMA-specific anti-tumor activity of the targeted-tubulysin conjugate, EC1169," American Association for Cancer Research Annual Meeting (Apr. 8, 2013) POSTER.
Reske, "Nuclear Imaging of Prostate Cancer," English translation, 2007, Urologe, 46(11) pp. 1485-1499.
Reske, et al., "[11C]choline PET/CT imaging in occult local relapse of prostate cancer after radical prostatectomy," 2008, European Journal of Nuclear Medicine and Molecular Imaging, 35 pp. 9-17.
Reske, et al., "[11C]Choline uptake with PET/CT for the initial diagnosis of prostate cancer: relation to PSA levels, tumour stage and anti-androgenic therapy," 2008, European Journal of Nuclear Medicine and Molecular Imaging, 35(9) pp. 1740-1741.
Reske, et al., "Advancement of PET and PET/CT in Prostate Carcinoma," English translation, 2006, Urologe, 45(6) pp. 707-714.
Reske, et al., "Nuklearmedizinische Diagnostik beim Prostatakarzinom," 2007, Urologe, 46 pp. 1485-1499.
Reske, et al., "PET and PET/CT in Relapsing Prostate Carcinoma," English translation, 2006, Urologe, 45(10) pp. 1240-1250.
Reske, et al., "PET und PET/CT in der Rezidivdiagnostik des Prostatakarzinoms," 2006, Urologe, 45 pp. 1240-1250.
Reske, et al., "Weiterentwicklung der PET und des PET/CT beim Prostatakarzinom," 2006, Urologe, 45 pp. 707-714.
Reske, S., et al., "Imaging Prostate Cancer with 11C-Choline PET/CT," 2006, Journal of Nuclear Medicine, 47(8) pp. 1249-1254.
Rich, J.N. Cancer stem cells in radiation resistance. Cancer research. Oct. 1, 2007; 67(19):8980-4.
Rinnab, et al., "[11C]Choline PET/CT for Targeted Salvage Lymph Node Dissection in Patients with Biochemical Recurrence after Primary Curative Therapy for Prostate Cancer," 2008, Urology International, 81 pp. 191-197.
Rinnab, et al., "[11C]choline PET/CT in prostate cancer patients with biochemical recurrence after radical prostatectomy," 2009, World Journal of Urology, 27 pp. 619-625.
Rinnab, L., et al., "Evaluation of [11C]-choline positron-emission/computed tomography in patients with increasing prostate-specific antigen levels after primary treatment for prostate cancer," 2007, BJU International, 100(4), pp. 786-793.
Rioja, et al., "Role of positron emission tomography in urological oncology," BJU International, 106(11) pp. 1578-1593.
Ristau, et al., "The prostate-specific membrane antigen: Lessons and current clinical implications from 20 years of research," 2014, Urologic Oncology: Seminars and Original Investigations, 32(3) pp. 272-279.
Roethke, et al., "Hyrbid Positron Emission Tomography-Magnetic Resonance Imaging with Gallium 68 Prostate-specific Membrane Antigen Tracer: A Next Step for Imaging of Recurrent Prostate Cancer-Preliminary Results," 2013, European Urology, 64(5) pp. 862-864.
Rong, et al., "Molecular Modeling of the Interaction of Glutamate Carboxypeptidase II with Its Potent NAAG-Based Inhibitors," 2002, Journal of Medicinal Chemistry, 45(19) pp. 4140-4152.
Rosar, F. et al. Molecular imaging and biochemical response assessment after a single cycle of [225Ac]Ac-PSMA-6 | 7/[1 77Lu]LuPSMA-6 | 7 tandem therapy in mCRPC patients whohave progressed on [1 77Lu]Lu-PSMA-617 monotherapy. Theranostics. 2021; 11(9): 4050-4060. doi: 10.7150/thno.56211.
Rosenthal, S., et al., "Utility of Capromab Pendetide (ProstaScint) Imaging in the Management of Prostate Cancer," 2001, Techniques in Urology, 7(1) pp. 27-37.
Rothke, M., et al. "Potenziale der PET/MRT in der Diagnostik des Prostatakariznoms," 2013, Radiologe, 53(8) pp. 676-681.
Roy, J., et al., "DUPA Conjugation of a Cytotoxic Indenoisoquinoline Topoisomerase I Inhibitor for Selective Prostate Cancer Cell Targeting," 2015, Journal of Medicinal Chemistry, 58(7) pp. 3094-3103.
Rybalov, et al., "Impact of total PSA, PSA doubling time and PSA velocity on detection rates of 11C-Choline positron emission tomography in recurrent prostate cancer," 2013, World Journal of Urology, 31(2) pp. 319-323.
Sacha, et al., "Expression of Glutamate Carboxypeptidase II in Human Brain," 2007, Neuroscience, 144(4) pp. 1361-1372.
Sartor, O. et al., "Lutetium-177-PSMA-617 for Metastatic Castration-Resistant Prostate Cancer," The New England Journal of Medicine, Jun. 23, 2021, pp. 1-13.
Sathekge, M., et al., "225Ac-PSMA-617 in chemotherapy-naïve patients with advanced prostate cancer: a pilot study," European Journal of Nuclear Medicine and Molecular Imaging, Springer Berlin Heidelberg, Sep. 19, 2018, 46(1) pp. 129-138.
Scattoni, et al., "Detection of Lymph-Node Metastases with Integrated [11C]Choline PET/CT in Patients with PSA Failure after Radical Retropubic Prostatectomy: Results Confirmed by Open Pelvic-Retroperitoneal Lymphadenectomy," 2007, European Urology, 52(2) pp. 423-429.
Schafer, et al., "A dimerized urea-based inhibitor of the prostate-specific membrane antigen for 68Ga-PET imaging of prostate cancer," 2012, EJNMMI Research, 2(1) pp. 23.
Scheffel, et al., "PET Imaging of GRP Receptor Expression in Prostate Cancer," 2004, The Journal of Nuclear Medicine, 45(8) pp. 1277-1278.
Scher, B., et al., "Value of 11C-choline PET and PET/CT in patients with suspected prostate cancer," 2007, European Journal of Nuclear Medicine and Molecular Imaging, 34 pp. 45-53.
Scher, et al., "PET/CT imaging of recurrent prostate cancer," 2008, European Journal of Nuclear Medicine and Molecular Imaging, 35 pp. 5-8.
Schulke, N., et al., "The homodimer of prostate-specific membrane antigen is a functional target for cancer therapy," 2003, Proceedings of the National Academy of Sciences of the United States of America, 100(22) pp. 12590-12595.
Schuster, D., et al., "Initial Experience with the Radiotracer Anti-1-Amino-3-18F-Fluorocyclobutane-1-Carboxylic Acid with PET/CT in Prostate Carcinoma," 2007, Journal of Nuclear Medicine, 48(1) pp. 56-63.
Seifert, R. et al. Radioligand therapy using [177Lu]Lu-PSMA-617 in mCRPC: a pre-VISION single-center analysis. European Journal of Nuclear Medicine and Molecular Imaging (2020) 47:2106-2112.
Shvarts, et al., "Positron Emission Tomography in Urologic Oncology," 2002, Cancer Control, 9(4) pp. 335-342.
Silver, et al., "Prostate-specific Membrane Antigen Expression in Normal and Malignant Human Tissues," 1997, Clinical Cancer Research, 3(1) pp. 81-85.
Silverman, "The Organic Chemistry of Drug Design and Drug Action," Elsevier Academic Press (2nd Ed. 2003).
Silvola, J., et al., "A118F-NOTA-Folate Accumulates in Atherosclerotic Plaques and Can be Detected by PET/CT", Poster presented Nov. 7, 2015 in Orlando, FL at the 2015 American Heart Association, Resuscitation Science Symposium (http://newsroom_heart.org/events/scientific-sessions-2015-newsroom- 2942760).
Silvola, J., et al.,"A118F-NOTA-Folate Accumulates in Atherosclerotic Plaques and Can be Detected by PET/CT", Published reference of poster, Nov. 10, 2015, at http://circ.ahajournals.org/content/132/Suppl_3/A18873?cited-by=&legid=circulationaha; 132/Suppl_3/A18873; Circulation, 2015, 132:A18873.
Simone, et al., "What's in a Label? Radioimmunotherapy for Metastatic Prostate Cancer," 2013, Clinical Cancer Research, 19(18) pp. 4908-4910.

(56) References Cited

OTHER PUBLICATIONS

Slusher, et al., "Immunocytochemical Localization of the N-Acetyl-Aspartyl-Glutamate (NAAG) Hydrolyzing Enzyme N-Acetylated a-Linked Acidic Dipeptidase (NAALADase)," 1992, The Journal of Comparative Neuorology, 315(2) pp. 217-229.
Slusher, et al., "Selective inhibition of NAALADase, which converts NAAG to glutamate, reduces ischemic brain injury," 1999, Nature Medicine, 5(12) pp. 1396-1402.
Smith, Richard B., "The Organic Chemistry of Drug Design and Drug Action," Elsevier"s Inc., 2004, Second Edition, } NA Interactive Agents, Chapter 6, 6.3.C.5 p. 386/\03 and Drug Metabolism Chapter 7, pp. 405-485.
Smith, Richard B., "The Organic Chemistry of Drug Design and Drug Action," Elsevier"s Inc., 2004, Second Edition, Chapter 2, Drug Discovery, Design, and Development, Chapter 3, Receptors, and Chapter 4, Enzymes as Catalysts pp. 98-185.
Smith, Richard B., "The Organic Chemistry of Drug Design and Drug Action," Elsevier"s Inc., 2004, Second Edition, Chapter 8, Prodrugs and Drug Delivery Systems and Appendix, pp. 486-592.
Soloviev, et al., "PET imaging with 11C-acetate in prostate cancer: a biochemical, radiochemical and clinical perspective," 2008, European Journal of Nuclear Medicine and Molecular Imaging, 35(5) pp. 942-949.
Spahn, et al., "How Should Hormone Therapy for Castration-Resistant Prostate Cancer be Continued?," English translation, 2012, Urologe, 51(1) pp. 15-19.
Spahn, et al., "We soil die Hormontherapie beim kastrationsresistenten Prostatakarzinom fortgefiihrt werden?," 2012, Urologe, 51 pp. 15-19.
Supplemental European Search Report, prepared for EP Application No. 19789294, mailed Nov. 26, 2021.
Sweat, et al., "Prostate-Specific Membrane Antigen Expression is Greatest in Prostate Adenocarcinomaand Lymph Node Metastases," 1998, Urology, 52(4) pp. 637-640.
Tan, G. et al. The efficacy and safety of abiraterone acetate in patients with high-risk prostate cancer: a meta-analysis based on six randomized control trials. Transl. Androl. Urol. 2020, 9, 1691-1699.
Tang, et al., "Prostate targeting ligands based on N-acetylated a-linked acidic dipeptidase," 2003, Biochemical and Biophysical Research Communications, 307(1) pp. 8-14.
Tang, et al., "Updated Application of Prostate-Specific Membrane Antigen to the Diagnosis and Treatment of Prostate Cancer," 2008, National Journal of Andrology, 14(1) pp. 79-82.
Tasch, J., et al., "A Unique Folate Hydrolase, Prostate-Specific Membrane Antigen (PSMA): A Target for Immunotherapy?" 2001, Critical Reviews in Immunology, 21(1-3) pp. 249-261.
Taylor et al., "Prostate Cancer Targeting Motifs: Expression of anb3, Neurotensin Receptor 1, Prostate Specific Membrane Antigen, and Prostate Stem Cell Antigen in Human Prostate Cancer Cell Lines and Xenografts," The Prostate 72:523-532 (2012).
Tehrani, O., et al., "Tumor Imaging Using 1-(2'-deoxy-2'-18F-Fluoro-(3-D-Arabinofuranosyl) Thymine and PET," 2007, Journal of Nuclear Medicine, 48(9) pp. 1436-1441.
Testa, et al., "Prostate Cancer: Sextant Localization with MR Imaging, MR Spectroscopy, and 11C-Choline PET/CT," 2007, Radiology, 244(3).
Thalmamm, G., "Advanced Prostate Cancer," English translation, 2012, Urologe, 51(1) pp. 7.
Thalmann, G., "Fortgeschrittenes Prostatakarzinom," 2012, Urologe, 51 pp. 7.
The Chemistry of Oxygen and Sulfur, https://web.archive.org/web/20080625021202/http://chemed.chem.purdue.edu/genchem/topicreview/bp/ch10/group6.php#oxygen (date Jun. 25, 2008) accessed online on May 31, 2019, 21 pages (Year: 2008).
Truffert, J., et al., "Synthesis, Purification, and Characterization of Two Peptide-Oligonucleotide Conjugates as Potential Artificial Nucleases," 1996, Tetrahedron, 52(8) pp. 3005-3016.
Tykvart, et al., "Rational design of urea-based glutamate carboxypeptidase II (GCPII) inhibitors as versatile tools for specific drug targeting and delivery," 2014, Bioorganic & Medicinal Chemistry, 22(15) pp. 4099-4108.
Uprimny, et al., "68Ga-PSMA ligand PET versus 18F-NaF PET: evaluation of response to 223Ra therapy in a prostate cancer patient," 2015, European Journal of Nuclear Medicine and Molecular Imaging, 42(2) pp. 362-363.
Vallabhajosula, et al., "Radioimmunotherapy of Prostate Cancer in Human Xenografts Using Monoclonal Antibodies Specific to Prostate Specific Membrane Antigen (PSMA): Studies in Nude Mice," 2004, The Prostate, 58(2) pp. 145-155.
Vavere, et al., "1-11C-Acetate as a PET Radiopharmaceutical for Imaging Fatty Acid Synthase Expression in Prostate Cancer," 2008, Journal of Nuclear Medicine, 49(2) pp. 327-334.
Vees, H., et al., "18F-choline and/or 11C-acetate positron emission tomography: detection of residual or progressive subclinical disease at very low prostate-specific antigen values ( <1 ng/ml) after radical prostatectomy," 2007, BJU International, 99(6) pp. 1415-1420.
Viola-Villegas, N., et al., "Targeting Gallium to Cancer Cells through the Folate Receptor," 2008, Drug Target Insights, 3 pp. 13-25.
Viola-Villegas, N., et al., "Targeting the Folate Receptor (FR): Imaging and Cytotoxicity of Rel Conjugates in FR-Overexpressing Cancer Cells," 2008, ChemMedChem, 3(9) pp. 1387-1394.
Violet, J., et al., "Long-Term Follow-up and Outcomes of Retreatment in an Expanded 50-Patient Single-Center Phase II Prospective Trial of 177Lu-PSMA-617 Theranostics in Metastatic Castration-Resistant Prostate Cancer," Journal of Nuclear Medicine, 2020, 61(6) pp. 857-865.
Vlahov, I., et al., "Design and regioselective synthesis of a new generation of targeted chemotherapeutics. Part 1: EC145, a folic acid conjugate of desacetylvinblastine monohydrazide," 2006, ScienceDirect, Bioorganic & Medical Chemistry Letters, 16(19) pp. 5093-5096.
Wang, et al., "Bioisosterism of urea-based GCPII inhibitors: Synthesis and structure—activity relationship studies," 2010, Bioorganic & Medicinal Chemistry Letters, 20(1) pp. 392-397.
Wang, et al., "Development of Targeted Near-Infrared Imaging Agents for Prostate Cancer," 2014, Molecular Cancer Therapeutics, 13(11) pp. 2595-2606.
Wang, et al., "Prostate-Specific Membrane Antigen Targeted Tubulysin Conjugates for Cancer Therapy," 246th ACS National Meeting and Exposition (Sep. 8, 2013) POSTER.
Wang, Z., Single Low-Dose Injection of Evans Blue Modified PSMA-617 Radioligand Therapy Eliminates Prostate-Specific Membrane Antigen Positive Tumors, Bioconjugate Chemistry, 2018, 29, pp. 3213-3221.
Weineisen, et al., "Synthesis and preclinical evaluation of DOTAGA-conjugated PSMA ligands for functional imaging and endoradiotherapy of prostate cancer," 2014, EJNMMI Research, 4(63).
Weissbach, L. "Which Components Should Living Guidelines' Contain?," English translation, 2012, Urologe, 51(1) pp. 57-59.
Weissbach, L., "Welche Inhalte sollte eine living guideline besetzen? ," 2012, Urologe, 51 pp. 57-59.
Whitaker, et al., "N-acetyl-L-aspartyl-L-glutamate peptidase-like 2 is overexpressed in cancer and promotes a pro-migratory and pro-metastatic phenotype," 2014, Oncogene, 33 pp. 5274-5287.
Wiberg, et al., "A comparison of some properties of C=O and C=S bonds," 2011, ARKIVOC, 5 pp. 45-56.
Wiehr, et al., "Pharmacokinetics and PET Imaging Properties of Two Recombinant Anti-PSMA Antibody Fragments in Comparison to their Parental Antibody," 2014, The Prostate, 74(7) pp. 743-755.
Wright, et al., "Expression of Prostate-Specific Membrane Antigen in Normal, Benign, and Malignant Prostate Tissues," 1995, Urologic Oncology, 1(1) pp. 18-28.
Wu, et al., "A mild deprotection procedure for tert-butyl esters and tert-butyl ethers using ZnBr2 in methylene chloride," 2000, Tetrahedron Letters, 41(16) pp. 2847-2849.
Wu, et al., "The molecular pruning of a phosphoramidate peptidomimetic inhibitor of prostate-specific membrane antigen," 2007, Bioorganic & Medicinal Chemistry, 15(23) pp. 7434-7443.

(56) References Cited

OTHER PUBLICATIONS

Yadav, M.P. et al., "177Lu-DKFZ-PSMA-617 therapy in metastatic castration resistant prostate cancer: safety, efficacy, and quality of life assessment," European Jouranl of Nuclear Medicine and Molecular Imaging, 2016, 44(1) pp. 81-91.

Yamaguchi, et al., "Prostate cancer: a comparative study of 11C-choline PET and MR imaging combined with proton MR spectroscopy," 2005, European Journal of Nuclear Medicine and Molecular Imaging, 32(7) pp. 742-748.

Yang, J., et al., "Characterization of the pH of Folate Receptor-Containing Endosomes and the Rate of Hydrolysis of Internalized Acid-Labile Folate-Drug Conjugates," 2007, Journal of Pharmacology and Experimental Therapeutics, 321(2) pp. 462-468.

Zaheer, et al., "New Agents and Techniques for Imaging Prostate Cancer," 2009, Journal of Nuclear Medicine, 50(9) pp. 1387-1390.

Zechmann, et al., "Radiation dosimetry and first therapy results with a 124I/131 I-labeled small molecule (MIP-1095) targeting PSMA for prostate cancer therapy," 2014, European Journal of Nuclear Medicine and Molecular Imaging, 41(7) pp. 1280-1292.

Zhang, et al., "A Remote Arene-Binding Site on Prostate Specific Membrane Antigen Revealed by Antibody-Recruiting Small Molecules," 2010, Journal of the American Chemical Society, 132(36) pp. 12711-12716.

Zhang, et al., "Prostate Specific Membrane Antigen (Psma): A Novel Modulator of p38 for Proliferation, Migration, and Survival in Prostate Cancer Cells," 2013, The Prostate, 73(8) pp. 835-841.

Zhou J., et al., "Naag Peptidase Inhibitors and Their Potential for Diagnosis and Therapy," 2005, Nature Reviews Drug Discovery, 4(12) pp. 1015-1026.

Zhou, J., "In vivo evaluation of medical device-associated inflammation using macrophage-specific position emission tomography (PET) imaging," 2013, Bioorganic and Medicinal Chemistry Letters, 23(7) pp. 2044-2047.

Zophel, K. and Kotzerke, J., "Is 11C-choline the most appropriate tracer for prostate cancer?" 2004, European Journal of Nuclear Medicine and Molecular Imaging, 31(5) pp. 756-759.

Kuru, et al., "MRI Navigated Stereotactic Prostate Biopsy," English Translation, 2012, Urologe, 51(1) pp. 50-56.

Kwee, et al., "18F-choline PET/CT imaging of RECIST measurable lesions in hormone refractory prostate cancer," 2009, Annals of Nuclear Medicine, 23 pp. 541-548.

Lambert, et al., "Molecular Evolution of the Transferrin Receptor/Glutamate Carboxypeptidase II Family," 2007, Journal of Molecular Evolution, 64(1) pp. 113-128.

Lange, P., "ProstaScint scan for staging prostate cancer," 2001, Urology, 57(3) pp. 402-406.

Lapi, et al., "Assessment of an 18F-Labeled Phosphoramidate Peptidomimetic as a New Prostate-Specific Membrane Antigen-Targeted Imaging Agent for Prostate Cancer," 2009, Journal of Nuclear Medicine, 50(12) pp. 2042-2048.

Larock, R., "Comprehensive Organic Transformations: A Guide to Functional Group Preparations," VCH Publishers, Inc. New York (1989).

Larson, S., et al., "Tumor Localization of 1613-18F-Fluoro-5a-Dihydrotestosterone Versus 18F—FDG in Patients with Progressive, Metastatic Prostate Cancer," 2004, Journal of Nuclear Medicine, 45(3) pp. 366-373.

Lau, J., "Bench to Bedside: Albumin Binders for Improved Cancer Radioligand Therapies," 2019, Bioconjugate Chemistry, 30, pp. 487-502.

Leek, et al., "Prostate-specific membrane antigen: evidence for the existence of a second related human gene," 1995, British Journal of Cancer, 72 pp. 583-588.

Lees, et al., "Active surveillance in prostate cancer: patient selection and triggers for intervention," 2012, Current Opinion in Urology, 22(3) pp. 210-215.

Lesche, et al., "Preclinical evaluation of BAY 1075553, a novel 18F-labelled inhibitor of prostate-specific membrane antigen for PET imaging of prostate cancer," 2014, European Journal of Nuclear Medicine and Molecular Imaging, 41 pp. 89-101.

Liu, et al., "A targeted low molecular weight near-infrared fluorescent probe for prostate cancer," 2010, Bioorganic & Medicinal Chemistry Letters, 20(23) pp. 7124-7126.

Liu, et al., "C-11 Choline PET/CT Imaging for Differentiating Malignant From Benign Prostate Lesions," 2008, Clinical Nuclear Medicine, 33(10) pp. 671-676.

Liu, et al., "Constitutive and Antibody-induced Internalization of Prostate-specific Membrane Antigen," 1998, Cancer Research, 58(18) pp. 4055-4060.

Liu, et al., "Functional prostate-specific membrane antigen is enriched in exosomes from prostate cancer cells," 2014, International Journal of Oncology, 44(3) pp. 918-922.

Liu, et al., "Prolonged androgen deprivation leads to downregulation of androgen receptor and prostate-specific membrane antigen in prostate cancer cells," 2012, International Journal of Oncology, 41(6) pp. 2087-2092.

Liu, et al., "Pseudoirreversible Inhibition of Prostate-Specific Membrane Antigen by Phosphoramidate Peptidomimetics," 2008, Biochemistry, 47(48) pp. 12658-12660.

Liu, et al., "Targeting prostate cancer cells with a multivalent PSMA inhibitor-guided streptavidin conjugate," 2012, Bioorganic & Medicinal Chemistry Letters, 22(12) pp. 3931-3934.

Liu, M., et al., "Synthesis and Biological Evaluation of Diethylenetriamine Pentaacetic acid-Polyethylene Glycol Folate: A new Folate-Derived, 99mTc-Based Radiopharmaceutical," 2005, Bioconjugate Chemistry, 16(5) pp. 1126-1132.

Lord, et al., "18F-Fluorocholine integrated PET/MRI for the initial staging of prostate cancer," 2011, European Journal of Nuclear Medicine and Molecular Imaging, 38 pp. 2288.

Lu, G., et al., "Synthesis and SAR of 99mTc/Re-labeled small molecule prostate specific membrane antigen inhibitors with novel polar chelates," 2013, Bioorganic and Medicinal Chemistry Letters, 23(5) pp. 1557-1563.

Luboldt, et al., "Prostate Carcinoma: Diffusion-weighted Imaging as Potential Alternative to Conventional MR and 11C-Choline PET/CT for Detection of Bone Metastases," 2008, Radiology, 249(3) pp. 1017-1025.

Lupoid, et al., "Identification and characterization of nuclease-stabilized RNA molecules that bind human prostate cancer cells via the prostate-specific membrane antigen." Cancer Res. 2002; 62:4029-4033.

Lupold, S., et al., "Identification and Characterization of Nuclease-stabilized RNA Molecules that Bind Human Prostate Cancer Cells via the Prostate-specific Membrane Antigen," 2002, Cancer Research, 62(14) pp. 4029-4033.

Lutje, et al., "Dual-Modality Image-Guided Surgery of Prostate Cancer with a Radiolabeled Fluorescent Anti-PSMA Monoclonal Antibody," 2014, Journal of Nuclear Medicine, 55(6) pp. 995-1001.

Lutje, et al., "Prospects in Radionuclide Imaging of Prostate Cancer," 2012, The Prostate, 72(11) pp. 1262-1272.

Majer, P. et al. Discovery of Orally Available Prodrugs of the Glutamate Carboxypeptidase II (GCPII) Inhibitor 2-Phosphonomethylpentanedioic Acid (2-PMPA). Journal of Medicinal Chemistry, 2016. 59 (6), pp. 2810-2819. DOI: 10.1021/acs.jmedchem.6b00062.

Majer, P., et al., "Synthesis and Biological Evaluation of Thiol-Based Inhibitors of Glutamate Carboxypeptodase II: Discovery of an Orally Active GCP II Inhibitor," 2003, Journal of Medicinal Chemistry, 46(10) pp. 1989-1996.

Malik, et al., "One pot radiofluorination of a new potential PSMA ligand [All 8F]NOTA-DUPA-Pep," 2012, Journal of Labelled Compounds and Radiopharmaceuticals, 55(9) pp. 320-325.

Malik, et al., "Radiosynthesis of a new PSMA targeting ligand ([18F]FPy-DUPA-Pep)," 2011, Applied Radiation and Isotopes, 69(7) pp. 1014-1018.

Mannweiler, et al., "Heterogeneity of Prostate-Specific Membrane Antigen (PSMA) Expression in Prostate Carcinoma with Distant Metastasis," 2009, Pathology and Oncology Research, 15(2) pp. 167-172.

Maresca, et al., "Influence of functionalized chelators on affinity and pharmacokinetics of 99mTc(CO)3-labeled small molecules targeting prostate specific membrane antigen (PSMA)," 2010, Journal of Nuclear Medicine, 51(2) pp. 250.

(56) References Cited

OTHER PUBLICATIONS

Maresca, K., et al., "A Series of Halogenated Heterodimeric Inhibitors of Prostate Specific Membrane Antigen (PSMA) as Radiolabeled Probes for Targeting Prostate Cancer," 2009, Journal of Medicinal Chemistry, 52(2) pp. 347-357.

Maresca, K., et al., "Molecular targeting of prostate cancer with small molecule inhibitors of prostate specific membrane antigen (PSMA)," 2007, Journal of Nuclear Medicine, 48 (Supplement 2 ).

Martin, P., et al., "A New Access to 2'-O-Alkylated Ribonucleosides and Properties of 2'-O-Alkylated Oligoribonucleotides," 1995, Helvetica Chimica Acta, 78(2) pp. 486-504 and Abstract.

Matthies, et al., "Imaging of prostate cancer metastases with 18F-fluoroacetate using PET/CT," 2004, European Journal of Nuclear Medicine and Molecular Imaging, 31 pp. 797.

McBride, et al., "Radiofluorination using aluminum-fluoride (Al18F)", 2013, EJNMMI Research, 3(36) pp. 1-11.

McNamara, J., et al., "Cell Type Specific Delivery of siRNAs with Aptamer-siRNA Chimeras," 2006, Nature Biotechnolgy, 24(8) pp. 1005-1015.

Mease, et al., "PET Imaging in Prostate Cancer: Focus on Prostate-Specific Membrane Antigen," 2013, Current Topics in Medicinal Chemistry, 13(8) pp. 951-962.

Mease, R., "General Approach for the Preparation of Fluorescent PSMA GCPII Inhibitors", Abstract ID: 470 Poster board space: 29, Molecular Imaging, vol. 5, No. 3, (Jul. 2006), 322-323.

Mease, R., et al., "N-[N-[(S)-1,3-Dicarboxypropyl]Carbamoyl]-4-[18F]Fluorobenzyl-LCysteine, [18F]DCFBC: A New Imaging Probe for Prostate Cancer," 2008, Clinical Cancer Research, 14(10) pp. 3036-3043.

Meighan, et al., "Recombinant Glutamate Carboxypeptidase II (Prostate Specific Membrane Antigen—PSMA)—Cellular Localization and Bioactivity Analyses," 2003, Journal of Protein Chemistry, 22(4) pp. 317-326.

Meinenhofer, et al., "Solid-Phase Synthesis with Attachment of Peptide to Resin through an Amino Acid Side Chain: [8-Lysine]-Vasopressin," 1971, Proceedings of the National Academy of Sciences of the United States of America, 68(5) pp. 1006-1009.

Meinhardt et al., "Laparoscopic Sentinel Lymph Node Biopsy for Prostate Cancer: The Relevance of Locations Outside the Extended Dissection Area," Prostate Cancer vol. 2012, Article ID 751753, 4 pages.

Melby, E., et at., "Entry of Protein Toxins in Polarized Epithelial Cells," Cancer Research, 1993, 53(8) pp. 1755-1760.

Mertens, et al., "PET with 18F-labelled choline-based tracers for tumour imaging: a review of the literature," 2010, European Journal of Nuclear Medicine and Molecular Imaging, 37 pp. 2188-2193.

Mesters, J., et al., "Structure of Glutamate Carboxypeptidase II, a Drug Target in Neuronal Damage and Prostate Cancer," 2006, The EMBO Journal, 25(6) pp. 1375-1384.

Mhawech-Fauceglia, et al., "Prostate-specific membrane antigen (PSMA) protein expression in normal and neoplastic tissues and its sensitivity and specificity in prostate adenocarcinoma: an immunohistochemical study using mutiple tumour tissue microarray technique," 2007, Histopathology, 50(4) pp. 472-483.

Mier, W., et al., "Conjugation of DOTA Using Isolated Phenolic Active Esters: The Labeling and Biodistribution of Albumin as Blood Pool Marker," 2005, Bioconjugate Chemistry, 16(1) pp. 237-240.

Milowsky, et al., "Phase I Trial of Yttrium-90—Labeled Anti—Prostate-Specific Membrane Antigen Monoclonal Antibody J591 for Androgen-Independent Prostate Cancer," 2004, Journal of Clinical Oncology, 22(13) pp. 2522-2531.

Chen, et al., "2-(3-{1-Carboxy-5-[(6-[18F]Fluoro-Pyridine-3-Carbonyl)-Amino]-Pentyl}-Ureido)-Pentanedioic Acid, [18F]DCFPyL, a PSMA-Based PET Imaging Agent for Prostate Cancer," 2011, Clinical Cancer Research, 17(24) pp. 7645-7653.

Chen, et al., "A low molecular weight PSMA-based fluorescent imaging agent for cancer," 2009, Biochemical and Biophysical Research Communications, 390(3) pp. 624-629.

Chen, et al., "PSMA-Targeted Theranostic Nanoplex for Prostate Cancer Therapy," 2012, ACS Nano, 6(9) pp. 7752-7762.

Chen, et al., "Synthesis and Biological Evaluation of Low Molecular Weight Fluorescent Imaging Agents for the Prostate-Specific Membrane Antigen,"2012, Bioconjugate Chemisty, 23(12) pp. 2377-2385.

Chen, Y., et al., "Radiohalogenated Prostate-Specific Membrane Antigen (PSMA)-Based Ureas as Imaging Agents for Prostate Cancer," 2008, Journal of Medicinal Chemistry, 51(24), pp. 7933-7943.

Chopra, A., "68Ga-Labeled 2-{3-[5-(7-{1-benzyloxycarbonyl-5-[2-(4,7, 10-triscarboxymethyl-1,4,7,10-tetraazacyclododec-1-1)acetylamino]pentylcarbamoyl}-heptanoylamino)-1-carboxypentyl]ureido}pentanedioic acid," 2010, Molecular Imaging and Contrast Agent Database (MICAD), pp. 2004-2013.

Chuu, et al., "Androgen suppresses proliferation of castrationresistant LNCaP 104-R2 prostate cancer cells through androgen receptor, Skp2, and c-Myc," 2011, Cancer Science, 102(11) pp. 2022-2028.

Cimitan, et al., "[18F]fluorocholine PET/CT imaging for the detection of recurrent prostate cancer at PSA relapse: experience in 100 consecutive patients," 2006, European Journal of Nuclear Medicine and Molecular Imaging, 33 pp. 1387-1398.

ClinicalTrials.gov, "A Phase 1 Pilot Study of 99mTc-MIP-1404 SPECT/CT Imaging to Histology in Men With Prostate Cancer," Identifier: NCT01615406, available online at: https://clinicaltrials.gov/ct2/ show/NCT01615406.

ClinicalTrials.gov, "PSMA-directed endoRadiotherapy of castration reSISTant Prostate Cancer (RESIST-PC). A Phase II clinical trial. "Clinical Trial Results Website, Study Start Date Jul. 2017, Study Competition Date Jan. 2020, 24 pages.

ClinicalTrials.gov, "99mTc-MIP-1404 for Imaging Prostate Cancer: Phase I Clinical Study to Assess the Image Quality of a Simplified Kit Formulation Compared to a Multi-step Preparation of 99mTc-MIP-1404," ClinicalTrials.gov Identifier: NCT01654874, available online at: https://clinicaltrials.gov/ct2/show/NCT01654874.

ClinicalTrials.gov, "A Phase 2 Study With MIP-1404 in Men With High-Risk PC Scheduled for RP and EPLND Compared to Histopathology," ClinicalTrials.gov Identifier: NCT01667536, available online at: https://clinicaltrials.gov/ct2/show/NCT01667536?id= NCT01667536.

ClinicalTrials.gov, "Pilot Study of 99mTc-MIP-1404 SPECT/CT Imaging in Men With Prostate Cancer Undergoing Prostatectomy and/or Pelvic Lymph Node Dissection," ClinicalTrials.gov Identifier: NCT01572701, available online at: https://clinicaltrials.gov/ct2/show/NCT01572701.

Colabufo, et al., "PB183, a sigma receptor ligand, as a potential PET probe for the imaging of prostate adenocarcinoma," 2008, Bioorganic & Medicinal Chemistry Letters, 18(6) pp. 1990-1993.

Cole, A., et al., "Cancer theranostics: the rise of targeted magnetic nanoparticles," 2011, Trends in Biotechnology, 29(7) pp. 323-332.

Cunha, et al., "Tissue-specificity of prostate specific antigens: Comparative analysis of transcript levels in prostate and non-prostatic tissues," 2006, Cancer Letters, 236(2) pp. 229-238.

Dahl, et al., "Sarcosine induces increase in HER2/neu expression in androgen-dependent prostate cancer cells," 2011, Molecular Biology Reports, 38 pp. 4237-4243.

Davis, M., et al., "Crystal Structure of Prostate-Specific Membrane Antigen, a Tumor Marker and Peptidase," 2005, Proceedings of the National Academy of Sciences of the United States of America, 102(17) pp. 5981-5986.

De Santis, et al., "Role of Chemotherapy in Castration Resistant Prostate Cancer," 2012, English translation, Urologe, 51(1) pp. 39-43.

De Santis, et al., "Rolle der Chemotherapie beim kastrationsresistenten Prostatakarzinom," 2012, Urologe, 51 pp. 39-43.

Definition of ligand, Random House Kernerman Webster's College Dictionary, downloaded on Jan. 25, 2014 from http://www.thefreedictionary.com/ligand, 1 page.

Degrado, et al., "Synthesis and Evaluation of 18F-Labeled Choline Analogs as Oncologic PET Tracers," 2001, Journal of Nuclear Medicine, 42(12) pp. 1805-1814.

(56) References Cited

OTHER PUBLICATIONS

Degrado, et al., "Synthesis and Evaluation of 18F-labeled Choline as an Oncologic Tracer for Positron Emission Tomography: Initial Findings in Prostate Cancer," 2000, Cancer Research, 61(1) pp. 110-117.
Dimitrakopoulou-Strauss, et al., "PET Imaging of Prostate Cancer with 11C-Acetate," 2003, Nuclear Medicine, 44(4) pp. 556-558.
Divyya, et al., "GCPII modulates oxidative stress and prostate cancer susceptibility through changes in methylation of RASSF1, BNIP3, GSTP1 and Ec-SOD," 2013, Mol Biol Rep, 40 pp. 5541-5550.
DNA Interactive Agents, Chapter 6, pp. 386-485.
Drake, C.G. et al. Blocking the regulatory T cell molecule LAG-3 augments in vivo anti-tumor immunity in an autochthonous mode I of prostate cancer. Journal of Clinical Oncology, 2006 ASCO Annual Meeting Proceedings (Post-Meeting Edition). vol. 24, No. 1SS (Jun. 20 Supplement), 2006: 2573.
Drug Discovery General References pp. 98-184.
Drug Metabolism Chapters 7-8, pp. 486-592.
Dumas, et al., "Molecular Expression of PSMA mRNA and Protein in Primary Renal Tumors," 1999, International Journal of Cancer, 80(6) pp. 799-803.
Dusich, et al., "General Approach for the Preparation of Fluorescent PSMA/GCPII Inhibitors," 2006, Abstract. Abstract ID: 470, Poster board space: 29.
Eder, et al., "Novel Preclinical and Radiopharmaceutical Aspects of [68Ga]Ga-PSMA-HBED-CC: A New PET Tracer for Imaging of Prostate Cancer," 2014, Pharmaceuticals, 7(7) pp. 779-796.
Eder, et al., "Pharmacokinetic Properties of Peptidic Radiopharmaceuticals: Reduced Uptake of (EH)3-Conjugates in Important Organs," 2013, Nuclear Medicine, 54(8) pp. 1-4.
Eder, et al., "Preclinical Evaluation of a Bispecific Low-Molecular HeterodimerTargeting Both PSMA and GRPR for Improved PET Imaging and Therapy of Prostate Cancer," 2014, The Prostate, 74(6) pp. 659-668.
Eder, et al., "PSMA as a target for radiolabelled small molecules," 2013, European Journal of Nuclear Medicine and Molecular Imaging, 40 pp. 819-823.
Eder, M., et al., "68Ga-complex Lipophilicity and the Targeting Property of a Urea-based PSMA Inhibitor for PET Imaging," 2012, Bioconjugate Chemistry, 23(4) pp. 688-697.
Eiber, et al., "68Ga-PSMA PET/MR with multimodality image analysis for primary prostate cancer," 2015, Abdom Imaging, 40(6) pp. 1769-1771.
El-Zaria, et al., "Preparation and evaluation of carborane-derived inhibitors of prostate specific membrane antigen (PSMA)," 2014, Dalton Transactions, 43 pp. 4950-4961.
Elsasser-Beile, et al., "A New Generation of Monoclonal and Recombinant Antibodies Against Cell-Adherent Prostate Specific Membrane Antigen for Diagnostic and Therapeutic Targeting of Prostate Cancer," 2006, The Prostate, 66(13) pp. 1359-1370.
Elsasser-Beile, et al., "PET Imaging of Prostate Cancer Xenografts with a Highly Specific Antibody against the Prostate-Specific Membrane Antigen," 2009, Journal of Nuclear Medicine, 50(4) pp. 606-611.
Elsasser-Beile, et al., "Targeted Therapies for Prostate Cancer Against the Prostate Specific Membrane Antigen," 2009, Current Drug Targets, 10(2) pp. 118-125.
Emmett, L. et al. ENZA-p: A randomized phase II trial using PSMA as a therapeutic agent and prognostic indicator in men with metastatic castration-resistant prostate cancer treated with enzalutamide. Poster. J. Clin. Oneal. 2021, 39, TPS177.
Emmett, L. et al. Lutetium 177 PSMA radionuclide therapy for men with prostate cancer: a review of the current literature and discussion of practical aspects of therapy. J Med Radiat Sci. Mar. 2017;64(1):52-60. doi: 10.1002/jmrs.227.
Emonds, et al., "Do androgens control the uptake of 18F-FDG, 11C-choline and 11C-acetate in human prostate cancer cell lines?," 2011, European Journal of Nuclear Medicine and Molecular Imaging, 38(10) pp. 1842-1853.
Enzyme Inhibition, Chapter 5, pp. 286-385.
Enzymes, Chapter 4, pp. 186-285.
European Patent Application No. EP 14861854, by Endocyte, Inc. et al.: Partial Supplementary Search Report with Opinion; Dated May 19, 2017 (15 pages).
European Search Report in EP 18175078.7 dated Sep. 14, 2018.
European Search Report in EP 18184296 mailed Feb. 12, 2019.
European Search Report in EP 18203547 mailed Apr. 4, 2019.
Debnath et al., "PSMA-targeting imaging and theranostic agents—Current status and future perspective." International journal of molecular sciences. Jan. 21, 2022;23(3):1158. (Year: 2022).
Easton (An unexpected success for cancer immunotherapy treating prostate cancer. U Chicago Medicine. 2018.) (Year: 2018).
Extended European Search Report for application No. EP21150716.5, mailed Jul. 23, 2021.
Harsanyi et al. "Synthesis of 2-phosphinoxidomethyl- and 2-phosphonomethyl glutaric acid derivatives", Heteroatom Chemistry, vol. 16, No. 7, Jan. 1, 2005 (Jan. 1, 2005), pp. 562-565.
Kahkoska, "Vitamin B12-Based Bioconjugate Probes for in Vitro and in Vivo Imaging" (2013). Renee Crown University Honors Thesis Projects—All. 64. https://surface.syr.edu/honors_capstone/64.
Muller, Folate-based radiotracers for PET imaging—update and perspectives. Molecules. Apr. 29, 2013;18(5):5005-31. doi: 10.3390/molecules18055005. PMID: 23629756; PMCID: PMC6269920.
Nedelcovych, M. et al. "Enhanced Brain Delivery of 2-(Phosphonomethyl)pentanedioic Acid Following Intranasal Administration of Its γ-Substituted Ester Prodrugs", Molecular Pharmaceutics, vol. 14, No. 10, Oct. 2, 2017 (Oct. 2, 2017), pp. 3248-3257.
Opposition Correspondence dated Jan. 6, 2025 in reference to the Request for Re-Examination of Australian Patent 2020201329 dated Dec. 13, 2024.
Priftakis (Neuroendocrine differentiation in castration resistant prostate cancer: A case report. Molecular and Clinical Oncology. 2015) (Year: 2015).
Rojas et al., "Kinetics and inhibition of glutamate carboxypeptidase II using a microplate assay." Analytical biochemistry. Nov. 1, 2002;310(1):50-4. (Year: 2002).

METHODS FOR PREPARING PSMA CONJUGATES

CROSS-REFERENCE TO RELATED APPLICATIONS

This application is a national stage of International Application No. PCT/US2020/033584, filed May 19, 2020, which claims the benefit of, and priority to, U.S. Provisional Patent Application No. 62/850,119, filed May 20, 2019, U.S. Provisional Patent Application No. 62/910,777, filed Oct. 4, 2019, and U.S. Provisional Patent Application No. 62/912,353, filed Oct. 8, 2019, the entire disclosures of which are incorporated herein by reference.

TECHNICAL FIELD

This disclosure relates to processes for preparing compounds that are useful in the treatment of disease, such as cancer, in mammals. In particular, the invention described herein pertains to processes for preparing compounds capable of targeting PSMA expressing cells and useful in the treatment of diseases caused by PSMA expressing cells, such as prostate cancer.

BACKGROUND

The prostate is a male reproductive organ and functions to produce and store seminal fluid that provides nutrients and fluids for the survival of sperm introduced into the vagina during reproduction. Like other tissues, the prostate gland may develop either malignant (cancerous) or benign (non-cancerous) tumors. In fact, prostate cancer is one of the most common male cancers in western societies, and is the second leading form of malignancy among American men. Current treatment methods for prostate cancer include hormonal therapy, radiation therapy, surgery, chemotherapy, photodynamic therapy, and combination therapy. However, many of these treatments affect the quality of life of the patient, especially for those men who are diagnosed with prostate cancer over age 50. For example, the use of hormonal drugs is often accompanied by side effects such as osteoporosis and liver damage. Such side effects might be mitigated by the use of treatments that are more selective or specific to the tissue being responsible for the disease state, and avoid non-target tissues like the bones or the liver.

Prostate-specific membrane antigen (PSMA) is a biomarker that is overexpressed on prostate cancer. PSMA is over-expressed in the malignant prostate tissues when compared to other organs in the human body such as kidney, proximal small intestine, and salivary glands. PSMA is also expressed on the neovasculature within many non-prostate solid tumors, including lung, colon, breast, renal, liver and pancreatic carcinomas, but not on normal vasculature. PSMA is also expressed minimally in brain. PSMA is a type II cell surface membrane-bound glycoprotein with ~110 kD molecular weight, including an intracellular segment (amino acids 1-18), a transmembrane domain (amino acids 19-43), and an extensive extracellular domain (amino acids 44-750). While the functions of the intracellular segment and the transmembrane domains are currently believed to be insignificant, the extracellular domain is involved in several distinct activities. For example, PSMA plays a role in the central nervous system, where it metabolizes N-acetyl-aspartyl glutamate (NAAG) into glutamic and N-acetyl aspartic acid. PSMA also plays a role in the proximal small intestine where it removes γ-linked glutamate from poly-γ-glutamated folate and α-linked glutamate from peptides and small molecules. However, PSMA's particular function on prostate cancer cells remains unresolved.

Unlike many other membrane-bound proteins, PSMA undergoes rapid internalization into the cell in a similar fashion to cell surface bound receptors like vitamin receptors. PSMA is internalized through clathrin-coated pits and subsequently can either recycle to the cell surface or go to lysosomes. Accordingly, diagnostic, imaging, and therapeutic agents can be targeted to PSMA for delivery into PSMA expressing cells, such as prostate cancer cells.

Described herein are processes for preparing compounds capable of binding to PSMA. Also described herein are processes for preparing compounds capable of targeting PSMA for delivery of diagnostic, imaging, and therapeutic agents.

It has been unexpectedly discovered that the conjugates prepared by the processes described herein exhibit high affinity for PSMA. It has also been discovered that the compounds prepared by the processes described herein are efficacious in treating diseases caused by pathogenic cells that express PSMA, such a prostate cancer cells.

It has been disclosed that certain conjugates exhibit high affinity for PSMA. It has also been disclosed that the conjugates are efficacious in treating diseases caused by pathogenic cells that express PSMA, such a prostate cancer cells. One such conjugate is

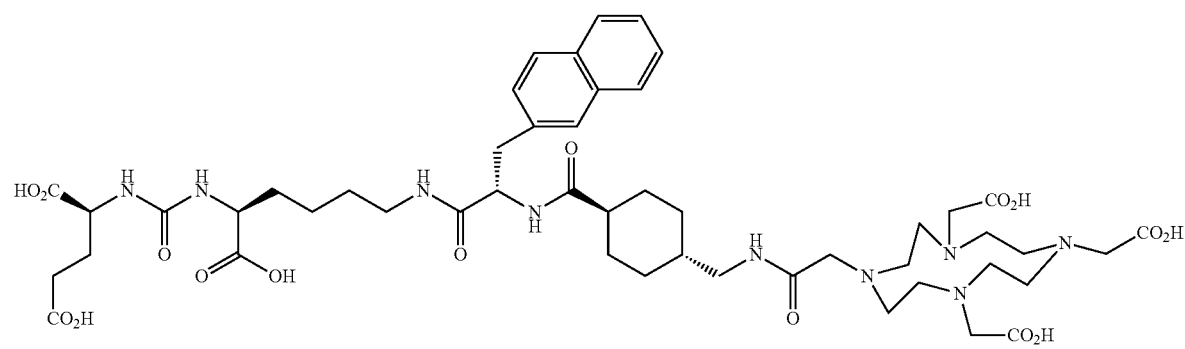

I (a.k.a PSMA-617) described in WO2015/055318 A1.

Because of the demand for pharmaceutical products, such as PSMA-617, there exists a need to provide synthetic methods capable of delivering large quantities of such products at a lower cost and in high purity. Described herein are processes for preparing compounds capable of binding to PSMA, such as PSMA-617.

SUMMARY

In one aspect, the present disclosure provides a process for preparing a compound that is useful for the treatment of disease, especially cancer, in a mammal, including a human.

In one embodiment, the present disclosure provides a process for preparing a compound for treating abnormal cell growth in a mammal, including a human, in need of such treatment.

In another embodiment, the abnormal cell growth is cancer. In another embodiment, the cancer is prostate cancer, metastatic prostate cancer, and metastatic castration resistant prostate cancer.

In another aspect, the disclosure provides processes for preparing a compound of the formula I

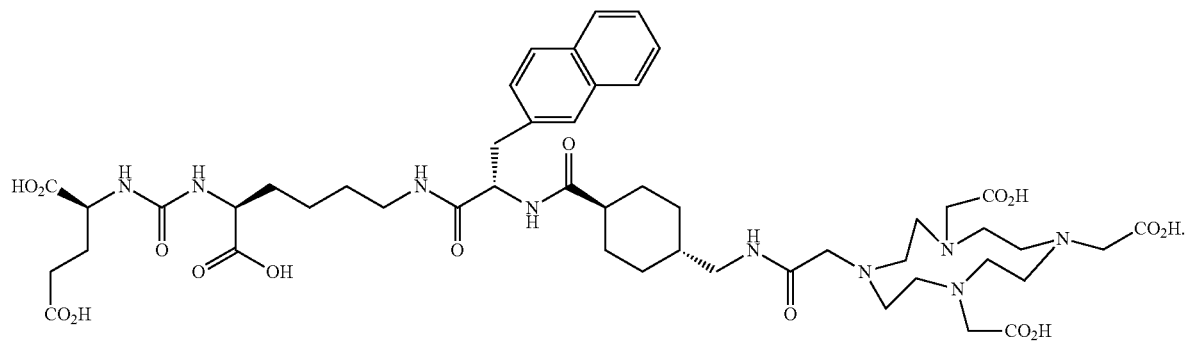

comprising a. contacting a resin-based compound of the formula A

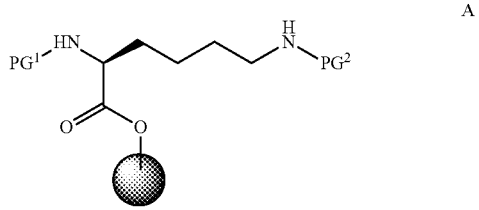

with a first deprotecting agent in a polar aprotic solvent to provide a resin-based compound of the formula A'

Additional embodiments, features, and advantages of the disclosure will be apparent from the following detailed description and through practice of the disclosure. The compounds of the present disclosure can be described as embodiments in any of the following enumerated clauses. It will be understood that any of the embodiments described herein can be used in connection with any other embodiments described herein to the extent that the embodiments do not contradict one another.

1. A process for preparing a compound of the formula I

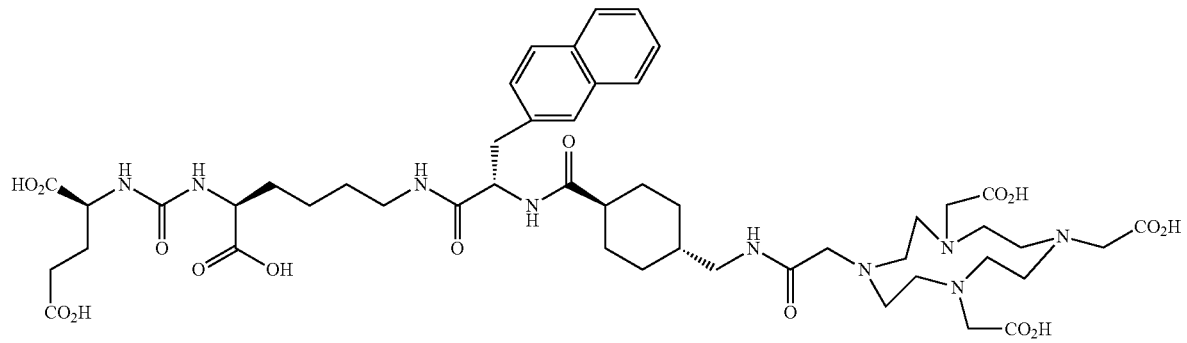

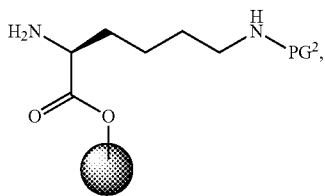

A' or b. contacting the resin-based compound of the formula A' with a compound of the formula B

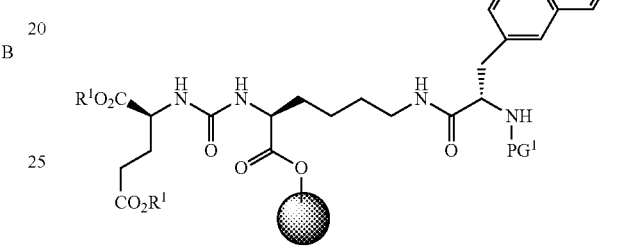

in the presence of an organic solvent and a base to provide a resin-based compound of the formula C

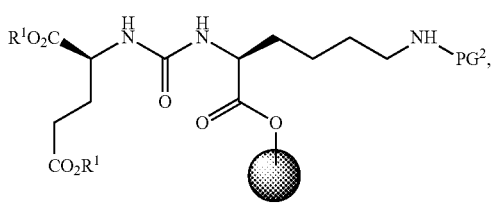

C or c. contacting the resin-based compound of the formula C with a second deprotecting agent in the presence of an organic solvent to provide a resin-based compound of the formula C'

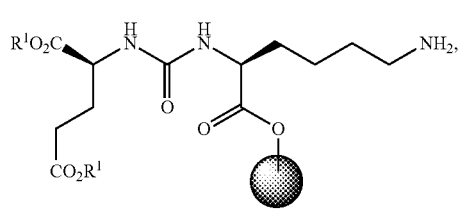

C' or d. contacting the resin-based compound of the formula C' with PG$^1$-3-(2-napthyl)-L-alanine in the presence of a polar aprotic solvent, a coupling agent, and a base to provide a resin-based compound of the formula D

D or e. contacting the resin-based compound of the formula D with the first deprotecting agent in a polar aprotic solvent to provide a resin-based compound of the formula D'

D' or f. contacting the resin-based compound of the formula D' with PG$^1$-tranexamic acid in the presence of a polar aprotic solvent, a coupling agent, and a base to provide a resin-based compound of the formula E

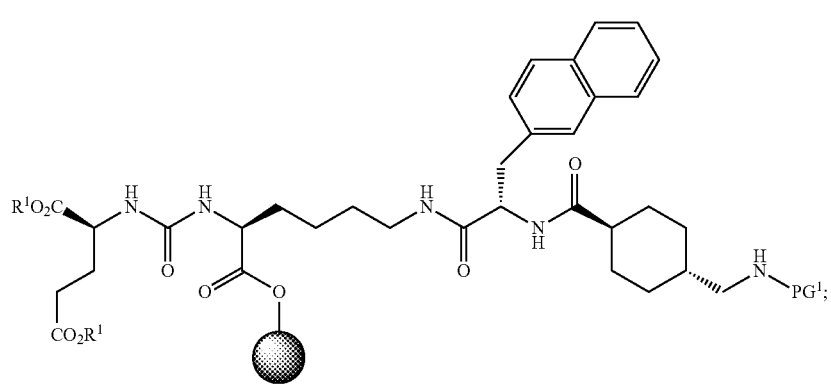

E or
   g. contacting the resin-based compound of the formula E with the first deprotecting agent in a polar aprotic solvent to provide a resin-based compound of the formula E'

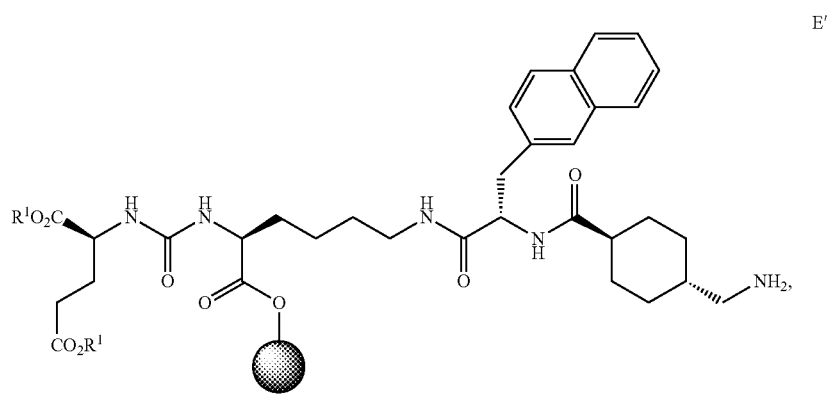

E' or
   h. contacting the resin-based compound of the formula E' with a compound of the formula $E^{2'}$

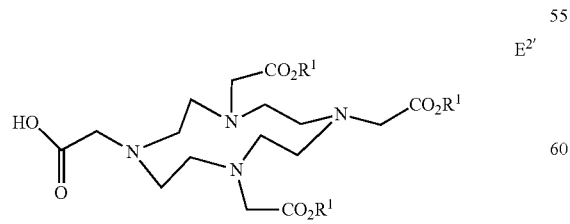

$E^{2'}$ in the presence of a polar aprotic solvent, a coupling agent, and a base to provide a resin-based compound of the formula F

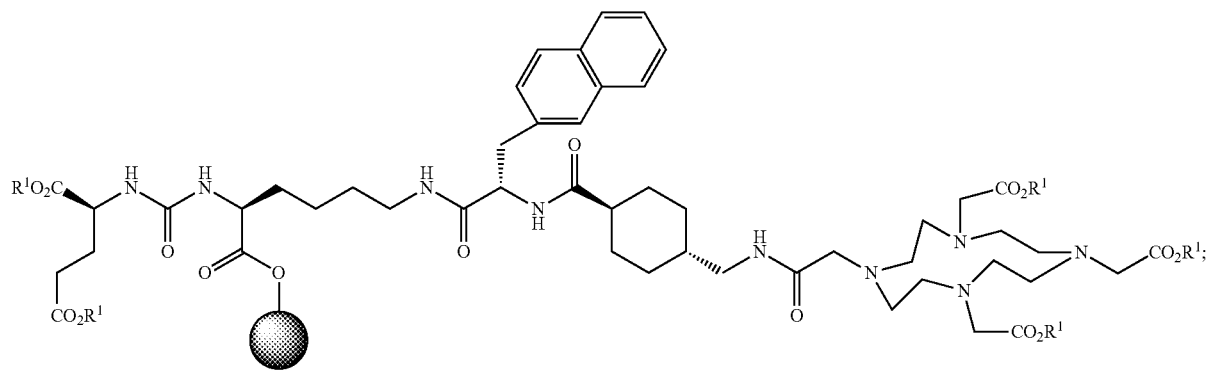

or
i. contacting the resin-based compound of the formula F with a third deprotecting agent and/or a cleavage reagent in an organic solvent,
wherein PG[1] and PG[2] are amine protecting groups, LG is a leaving group, and IV is a $C_1$-$C_4$ alkyl or a cyclohexyl.

2. The process of clause 1, wherein the first deprotecting agent of step (a) is selected from the group consisting of piperidine, morpholine, 1,8-Diazabicyclo[5.4.0]undec-7-ene (DBU), diethylamine (DEA), dicyclohexamine, 4-methylpiperidine (4MP), Tris(2-aminoethyl)amine, pyridine and collidine.

3. The process of any one of the preceding clauses, wherein the first deprotecting agent of step (e) is selected from the group consisting of piperidine, morpholine, 1,8-Diazabicyclo[5.4.0]undec-7-ene (DBU), diethylamine (DEA), dicyclohexamine, 4-methylpiperidine (4MP), Tris(2-aminoethyl)amine, pyridine and collidine.

4. The process of any one of the preceding clauses, wherein the first deprotecting agent of step (g) is selected from the group consisting of piperidine, morpholine, 1,8-Diazabicyclo[5.4.0]undec-7-ene (DBU), diethylamine (DEA), dicyclohexamine, 4-methylpiperidine (4MP), Tris(2-aminoethyl)amine, pyridine and collidine.

5. The process of any one of the preceding clauses, wherein the first deprotecting agent of step (a) is piperidine.

6. The process of any one of the preceding clauses, wherein the first deprotecting agent of step (e) is piperidine.

7. The process of any one of the preceding clauses, wherein the first deprotecting agent of step (g) is piperidine.

8. The process of any one of the preceding clauses, wherein the polar aprotic solvent of step (a) is selected from the group consisting of dimethylformamide (DMF), N-methyl-2-pyrrolidone (NMP), dichloromethane (DCM), a dichloromethane/dimethylformamide mixture, acetonitrile (ACN), an acetonitrile/dimethylformamide mixture, and dimethylsulfoxide (DMSO).

9. The process of any one of the preceding clauses, wherein the polar aprotic solvent of step (d) is selected from the group consisting of dimethylformamide (DMF), N-methyl-2-pyrrolidone (NMP), dichloromethane (DCM), a dichloromethane/dimethylformamide mixture, acetonitrile (ACN), an acetonitrile/dimethylformamide mixture, and dimethylsulfoxide (DMSO).

10. The process of any one of the preceding clauses, wherein the polar aprotic solvent of step (e) is selected from the group consisting of dimethylformamide (DMF), N-methyl-2-pyrrolidone (NMP), dichloromethane (DCM), a dichloromethane/dimethylformamide mixture, acetonitrile (ACN), an acetonitrile/dimethylformamide mixture, and dimethylsulfoxide (DMSO).

11. The process of any one of the preceding clauses, wherein the polar aprotic solvent of step (f) is selected from the group consisting of dimethylformamide (DMF), N-methyl-2-pyrrolidone (NMP), dichloromethane (DCM), a dichloromethane/dimethylformamide mixture, acetonitrile (ACN), an acetonitrile/dimethylformamide mixture, and dimethylsulfoxide (DMSO).

12. The process of any one of the preceding clauses, wherein the polar aprotic solvent of step (g) is selected from the group consisting of dimethylformamide (DMF), N-methyl-2-pyrrolidone (NMP), dichloromethane (DCM), a dichloromethane/dimethylformamide mixture, acetonitrile (ACN), an acetonitrile/dimethylformamide mixture, and dimethylsulfoxide (DMSO).

13. The process of any one of the preceding clauses, wherein the polar aprotic solvent of step (h) is selected from the group consisting of dimethylformamide (DMF), N-methyl-2-pyrrolidone (NMP), dichloromethane (DCM), a dichloromethane/dimethylformamide mixture, acetonitrile (ACN), an acetonitrile/dimethylformamide mixture, and dimethylsulfoxide (DMSO).

14. The process of any one of the preceding clauses, wherein the polar aprotic solvent of step (a) is dimethylformamide (DMF).

15. The process of any one of the preceding clauses, wherein the polar aprotic solvent of step (d) is dimethylformamide (DMF).

16. The process of any one of the preceding clauses, wherein the polar aprotic solvent of step (e) is dimethylformamide (DMF).

17. The process of any one of the preceding clauses, wherein the polar aprotic solvent of step (f) is dimethylformamide (DMF).

18. The process of any one of the preceding clauses, wherein the polar aprotic solvent of step (g) is dimethylformamide (DMF).

19. The process of any one of the preceding clauses, wherein the polar aprotic solvent of step (h) is dimethylformamide (DMF).

20. The process of any one of the preceding clauses, wherein the base of step (b) is selected from the group consisting of N,N-Diisopropylethylamine ($^i$Pr$_2$NEt), triethylamine (TEA), 4-methylmorpholine (NMM), imidazole, pyridine, and collidine.

21. The process of any one of the preceding clauses, wherein the base of step (d) is selected from the group consisting of N,N-Diisopropylethylamine ($^i$Pr$_2$NEt), triethylamine (TEA), 4-methylmorpholine (NMM), imidazole, pyridine, and collidine.

22. The process of any one of the preceding clauses, wherein the base of step (f) is selected from the group consisting of N,N-Diisopropylethylamine ($^i$Pr$_2$NEt), triethylamine (TEA), 4-methylmorpholine (NMM), imidazole, pyridine, and collidine.

23. The process of any one of the preceding clauses, wherein the base of step (h) is selected from the group consisting of N,N-Diisopropylethylamine ($^i$Pr$_2$NEt), triethylamine (TEA), 4-methylmorpholine (NMM), imidazole, pyridine, and collidine.

24. The process of any one of the preceding clauses, wherein the base of step (b) is N,N-Diisopropylethylamine ($^i$Pr$_2$NEt).

25. The process of any one of the preceding clauses, wherein the base of step (d) is N,N-Diisopropylethylamine ($^i$Pr$_2$NEt).

26. The process of any one of the preceding clauses, wherein the base of step (f) is N,N-Diisopropylethylamine ($^i$Pr$_2$NEt).

27. The process of any one of the preceding clauses, wherein the base of step (h) is N,N-Diisopropylethylamine ($^i$Pr$_2$NEt).

28. The process of any one of the preceding clauses, wherein the second deprotecting agent of step (c) is selected from the group consisting of trifluoroacetic acid (TFA), acetic acid, trifluoroethanol, hexafluoroisopropanol, dichloromethane, and combinations thereof.

29. The process of any one of the preceding clauses, wherein the second deprotecting agent of step (c) is trifluoroacetic acid (TFA) or a mixture of acetic acid and trifluoroethanol.

30. The process of any one of the preceding clauses, wherein the coupling agent of step (d) is selected from the group consisting of benzotriazol-1-yl-oxytripyrrolidinophosphonium hexafluorophosphate (PyBOP), 1-[Bis(dimethylamino)methylene]-1H-1,2,3-triazolo[4,5-b]pyridinium 3-oxid hexafluorophosphate (HATU), 2-(1H-Benzotriazole-1-yl)-1,1,3,3-tetramethyluronium tetrafluoroborate (TBTU), 2-(1H-benzotriazol-1-yl)-1,1,3,3-tetramethyluronium hexafluorophosphate (HBTU), 2-chloro-4,6-dimethoxy-1,3,5-triazine (CDMT), N-[5-Chloro-3-oxido-1H-benzotriazol-1-yl)-4-morpholinylmethylene]-N-methylmethanaminium hexafluorophosphate (HDMC), 1-Cyano-2-ethoxy-2-oxo-ethylidenaminooxy)dimethylamino-morpholino-carbenium hexafluorophosphate (COMU), dimethylamino(triazolo[4,5-b]pyridin-3-yloxy)methylidene]-dimethylazanium; tetrafluoroborate (TATU), N,N,N',N'-tetramethyl-S-(1-oxido-2-pyridyl)thiouronium tetrafluoroborate (TOTT), N-Ethoxycarbonyl-2-ethoxy-1,2-dihydroquinoline (EEDQ), 1-Propanephosphonic anhydride (T3P), and 4-(4,6-dimethoxy-1,3,5-triazin-2-yl)-4-methyl-morpholinium chloride (DMTMM).

31. The process of any one of the preceding clauses, wherein the coupling agent of step (f) is selected from the group consisting of benzotriazol-1-yl-oxytripyrrolidinophosphonium hexafluorophosphate (PyBOP), 1-[Bis(dimethylamino)methylene]-1H-1,2,3-triazolo[4,5-b]pyridinium 3-oxid hexafluorophosphate (HATU), 2-(1H-Benzotriazole-1-yl)-1,1,3,3-tetramethyluronium tetrafluoroborate (TBTU), 2-(1H-benzotriazol-1-yl)-1,1,3,3-tetramethyluronium hexafluorophosphate (HBTU), 2-chloro-4,6-dimethoxy-1,3,5-triazine (CDMT), N-[5-Chloro-3-oxido-1H-benzotriazol-1-yl)-4-morpholinylmethylene]-N-methylmethanaminium hexafluorophosphate (HDMC), 1-Cyano-2-ethoxy-2-oxo-ethylidenaminooxy)dimethylamino-morpholino-carbenium hexafluorophosphate (COMU), dimethylamino(triazolo[4,5-b]pyridin-3-yloxy)methylidene]-dimethylazanium; tetrafluoroborate (TATU), N,N,N',N'-tetramethyl-S-(1-oxido-2-pyridyl)thiouronium tetrafluoroborate (TOTT), N-Ethoxycarbonyl-2-ethoxy-1,2-dihydroquinoline (EEDQ), 1-Propanephosphonic anhydride (T3P), and 4-(4,6-dimethoxy-1,3,5-triazin-2-yl)-4-methyl-morpholinium chloride (DMTMM).

32. The process of any one of the preceding clauses, wherein the coupling agent of step (h) is selected from the group consisting of benzotriazol-1-yl-oxytripyrrolidinophosphonium hexafluorophosphate (PyBOP), 1-[Bis(dimethylamino)methylene]-1H-1,2,3-triazolo[4,5-b]pyridinium 3-oxid hexafluorophosphate (HATU), 2-(1H-Benzotriazole-1-yl)-1,1,3,3-tetramethyluronium tetrafluoroborate (TBTU), 2-(1H-benzotriazol-1-yl)-1,1,3,3-tetramethyluronium hexafluorophosphate (HBTU), 2-chloro-4,6-dimethoxy-1,3,5-triazine (CDMT), N-[5-Chloro-3-oxido-1H-benzotriazol-1-yl)-4-morpholinylmethylene]-N-methylmethanaminium hexafluorophosphate (HDMC), 1-Cyano-2-ethoxy-2-oxo-ethylidenaminooxy)dimethylamino-morpholino-carbenium hexafluorophosphate (COMU), dimethylamino(triazolo[4,5-b]pyridin-3-yloxy)methylidene]-dimethylazanium; tetrafluoroborate (TATU), N,N,N',N'-tetramethyl-S-(1-oxido-2-pyridyl)thiouronium tetrafluoroborate (TOTT), N-Ethoxycarbonyl-2-ethoxy-1,2-dihydroquinoline (EEDQ), 1-Propanephosphonic anhydride (T3P), and 4-(4,6-dimethoxy-1,3,5-triazin-2-yl)-4-methyl-morpholinium chloride (DMTMM).

33. The process of any one of the preceding clauses, wherein the coupling agent of step (d) is benzotriazol-1-yl-oxytripyrrolidinophosphonium hexafluorophosphate (PyBOP).

34. The process of any one of the preceding clauses, wherein the coupling agent of step (f) is benzotriazol-1-yl-oxytripyrrolidinophosphonium hexafluorophosphate (PyBOP).

35. The process of any one of the preceding clauses, wherein the coupling agent of step (h) is benzotriazol-1-yl-oxytripyrrolidinophosphonium hexafluorophosphate (PyBOP).

36. The process of any one of the preceding clauses, wherein the third deprotecting agent of step (i) is selected from the group consisting of trifluoroacetic acid (TFA), hydrofluoric acid (HF), triflic acid (TfOH), a trifluoroacetic acid (TFA)/water/triisopropylsilane mixture, a trifluoroacetic acid (TFA)/dichloromethane (DCM) mixture, triethylsaline (TES), indole, a phenol/anisole mixture, and thioanisole.

37. The process of any one of the preceding clauses, wherein the third deprotecting agent of step (i) is a trifluoroacetic acid (TFA)/water/triisopropylsilane mixture.

38. The process of any one of the preceding clauses, wherein the cleavage reagent of step (i) is trifluoroacetic acid (TFA) or a trifluoroacetic acid (TFA)/water/triisopropylsilane mixture.

39. The process of any one of the preceding clauses, wherein the cleavage reagent of step (i) is a trifluoroacetic acid (TFA)/water/triisopropylsilane mixture.

40. The process of any one of the preceding clauses, where in the organic solvent of step (b) is selected from the group consisting of CH$_2$Cl$_2$, THF, diethyl ether, MeOH, EtOH, acetone, acetonitrile.

41. The process of any one of the preceding clauses, where in the organic solvent of step (c) is selected from the group consisting of $CH_2Cl_2$, THF, diethyl ether, MeOH, EtOH, acetone, acetonitrile.

42. The process of any one of the preceding clauses, where in the organic solvent of step (i) is selected from the group consisting of $CH_2Cl_2$, THF, diethyl ether, MeOH, EtOH, acetone, acetonitrile.

43. The process of any one of the preceding clauses, where in the organic solvent of step (b) is $CH_2Cl_2$.

44. The process of any one of the preceding clauses, where in the organic solvent of step (c) is $CH_2Cl_2$.

45. The process of any one of the preceding clauses, where in the organic solvent of step (i) is $CH_2Cl_2$.

46. The process of any one of the preceding clauses, wherein $PG^1$ is 9-Fluorenylmethyl-carbonyl (Fmoc) or t-butylcarbonyl (Boc).

47. The process of any one of the preceding clauses, wherein $PG^1$ is 9-Fluorenylmethyl-carbonyl (Fmoc).

48. The process of any one of the preceding clauses, wherein $PG^2$ is monomethoxytrityl (MMt) or 4-methyltrityl (Mtt).

49. The process of any one of the preceding clauses, wherein $PG^2$ is 4-methyltrityl (Mtt).

50. The process of any one of the preceding clauses, wherein LG is

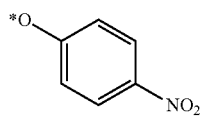

wherein, * represents a point of attachment to the rest of the compound.

51. The process of any one of the preceding clauses, wherein $R^1$ is t-butyl.

52. A process for preparing a compound of the formula 1 comprising one or more of a. contacting a resin-based compound of the formula 1

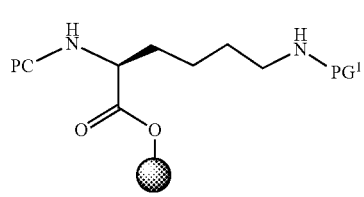

with a first deprotecting agent in the presence of a solvent to provide a resin-based compound of the formula 2

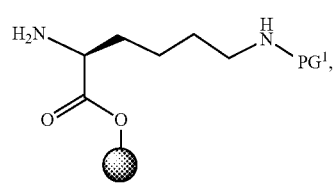

or b. contacting the resin-based compound of the formula 2 with a compound of the formula 3

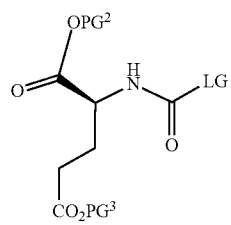

in the presence of an organic solvent and a base to provide a resin-based compound of the formula 4

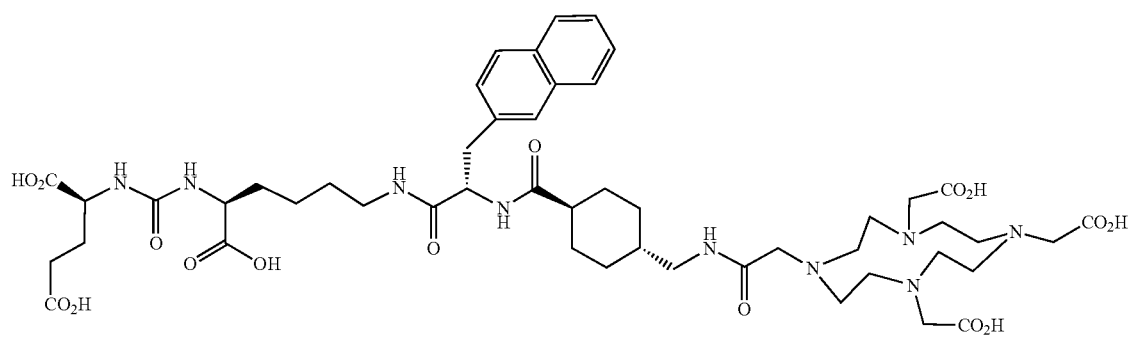

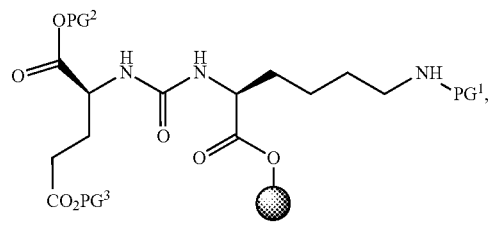

or c. contacting the resin-based compound of the formula 4 with a second deprotecting agent in the presence of an organic solvent to provide a resin-based compound of the formula 5

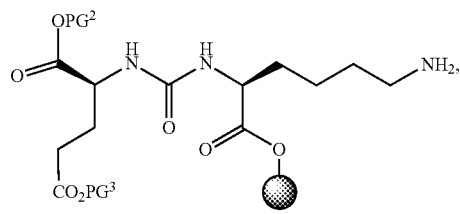

or d. contacting the resin-based compound of the formula 5 with a compound of the formula 6

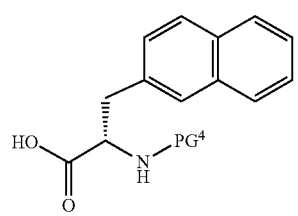

in the presence of a solvent, a coupling agent, and optionally a base and/or an additive to provide a resin-based compound of the formula 7

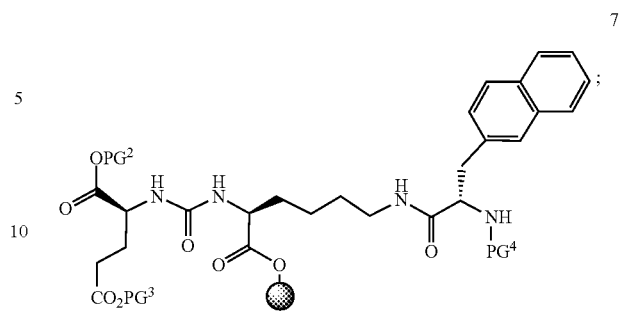

or e. contacting the resin-based compound of the formula 7 with a third deprotecting agent in the presence of a solvent to provide a resin-based compound of the formula 8

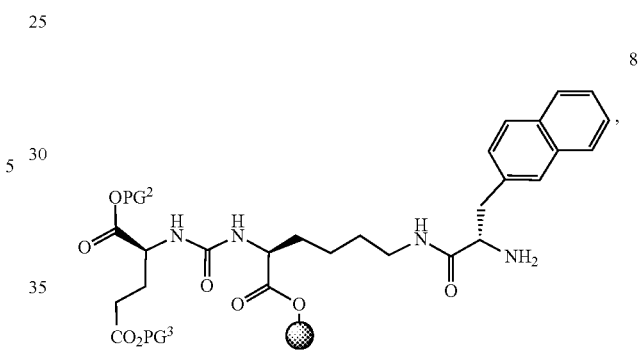

or f. contacting the resin-based compound of the formula 8 with a compound of the formula 9

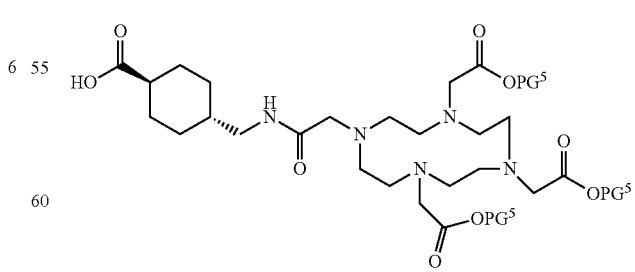

in the presence of a solvent, a coupling agent, and optionally a base and/or an additive to provide a resin-based compound of the formula 10

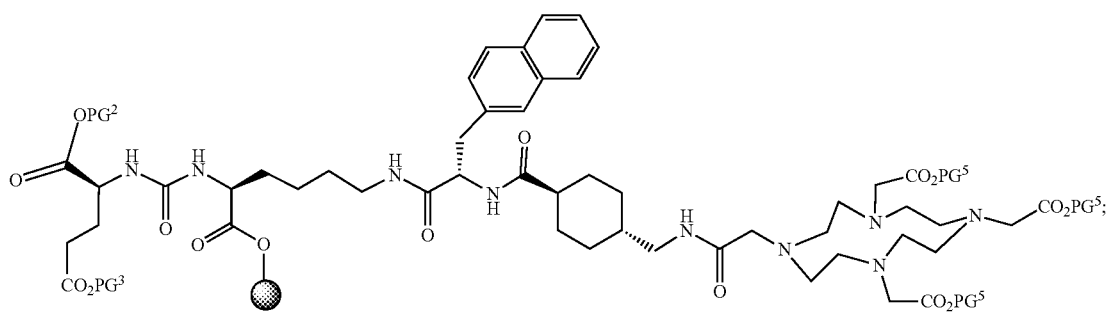

or
g. contacting the resin-based compound of the formula 10 with at least one third deprotecting agent and/or a cleavage reagent in the presence of an organic solvent to provide the compound of the formula I,
wherein PG, PG$^1$ and PG$^4$ are amine protecting groups, PG$^2$, PG$^3$, and PG$^5$ are carboxyl protecting groups, and LG in compound C is a leaving group.

53. The process of clause 52, wherein PG, PG$^1$ and PG$^4$ are selected from the group consisting of 9-fluorenylmethyl-carbonyl (Fmoc), benzyl carbamate (Cbz), t-butyloxy carbonyl (Boc), acetamide, trifluoroacetamide, p-toluenesulfonamide, triphemylmethyl, monomethoxytrityl (MMt), and 4-methyltrityl (Mtt).

54. The process of clause 52 or 53, wherein PG is 9-fluorenylmethyl-carbonyl.

55. The process of any one of clauses 52 to 54, wherein PG$^1$ is monomethoxytrityl (MMt) or 4-methyltrityl (Mtt).

56. The process of any one of clauses 52 to 55, wherein PG$^1$ is 4-methyltrityl (Mtt).

57. The process of any one of clauses 52 to 56, wherein PG$^4$ is 9-fluorenylmethyl-carbonyl.

58. The process of any one of clauses 52 to 57, wherein PG$^2$, PG$^3$, and PG$^5$ are each t-butyl.

59. The process of any one of clauses 52 to 58, wherein LG in compound C is s selected from imidazolyl, 4-nitrophenoxy, and phenoxy.

60. The process of any one of clauses 52 to 59, wherein the first deprotecting agent of step (a) comprises a reagent or mixture of reagents capable of removing a protecting group selected from the group consisting of 9-fluorenylmethyl-carbonyl (Fmoc), benzyl carbamate (Cbz), t-butyloxy carbonyl (Boc), acetamide, trifluoroacetamide, p-toluenesulfonamide, triphemylmethyl, monomethoxytrityl (MMt), and 4-methyltrityl (Mtt).

61. The process of any one of clauses 52 to 60, wherein the first deprotecting agent of step (a) comprises a reagent or mixture of reagents capable of removing a 9-fluorenylmethyl-carbonyl.

62. The process of any one of clauses 52 to 61, wherein the first deprotecting agent of step (a) is selected from the group consisting of piperidine, morpholine, 1,8-diazabicyclo[5.4.0]undec-7-ene (DBU), diethylamine (DEA), dicyclohexamine, 4-methylpiperidine (4MP), tris(2-aminoethyl)amine, pyridine, and collidine.

63. The process of any one of clauses 52 to 62, wherein the first deprotecting agent of step (a) is piperidine.

64. The process of any one of clauses 52 to 63, wherein the solvent of step (a) is a polar aprotic solvent.

65. The process of any one of clauses 52 to 64, wherein the solvent of step (a) is selected from the group consisting of dimethylformamide (DMF), N-methyl-2-pyrrolidone (NMP), dichloromethane (DCM), a dichloromethane/dimethylformamide mixture, acetonitrile (ACN), an acetonitrile/dimethylformamide mixture, and dimethylsulfoxide (DMSO).

66. The process of any one of clauses 52 to 65, wherein the base of step (b) is selected from the group consisting of N,N-diisopropylethylamine ($^i$Pr$_2$NEt), triethylamine (TEA), 4-methylmorpholine (NMM), imidazole, pyridine, and collidine.

67. The process of any one of clauses 52 to 66, wherein the organic solvent of step (b) is selected from the group consisting of CH$_2$Cl$_2$, THF, diethyl ether, MeOH, EtOH, acetone, and acetonitrile.

68. The process of any one of clauses 52 to 67, wherein the second deprotecting agent of step (c) comprises a reagent or mixture of reagents capable of removing a protecting group selected from the group consisting of 9-fluorenylmethyl-carbonyl (Fmoc), benzyl carbamate (Cbz), t-butyloxy carbonyl (Boc), acetamide, trifluoroacetamide, p-toluenesulfonamide, triphemylmethyl, monomethoxytrityl (MMt), and 4-methyltrityl (Mtt).

69. The process of any one of clauses 52 to 68, wherein the second deprotecting agent of step (c) comprises a reagent or mixture of reagents capable of removing a 4-methyltrityl (Mtt).

70. The process of any one of clauses 52 to 69, wherein the second deprotecting agent of step (c) is selected from the group consisting of trifluoroacetic acid (TFA), acetic acid, 2,2,2-trifluoroethanol, hexafluoroisopropanol, and combinations thereof.

71. The process of any one of clauses 52 to 70, wherein the second deprotecting agent of step (c) is a mixture of acetic acid and 2,2,2-trifluoroethanol.

72. The process of any one of clauses 52 to 71, wherein the organic solvent of step (c) is selected from the group consisting of CH$_2$Cl$_2$, THF, diethyl ether, MeOH, EtOH, acetone, and acetonitrile.

73. The process of any one of clauses 52 to 72, wherein the coupling agent of step (d) is selected from the group consisting of benzotriazol-1-yloxy-tris(dimethylamino)-phosphonium hexafluorophosphate (BOP), benzotriazol-1-yl-oxytripyrrolidinophosphonium hexafluorophosphate (PyBOP), 7-aza-benzotriazol-1-yloxy-tripyrrolidinophosphonium hexafluorophosphate (PyAOP), ethyl cyano (hydroxyimino)acetato-O$_2$)-tri-(1-pyrrolidinyl)-phosphonium hexafluorophosphate (PyOxim), bromotripyrrolidino-phosphonium hexafluorophosphate (PyBrOP), 3-(diethoxy-phosphoryloxy)-1,2,3-benzo[d]triazin-4(3H)-one (DEPBT), 1-[bis(dimethylamino)methylene]-1H-1,2,3-triazolo[4,5-b]pyridinium 3-oxid hexafluorophosphate (HATU), 2-(1H-benzotriazole-1-yl)-1,1,3,3-tetramethyluronium tetrafluoroborate (TBTU), 2-(1H-benzotriazol-1-yl)-1,1,3,3-tetramethyluronium hexafluorophosphate (HBTU), 2-(6-chloro-1H-benzotriazol-1-yl)-N,N,N',N'-tetramethylaminium hexafluorophosphate (HCTU), 2-chloro-4,6-dimethoxy-1,3,5-triazine (CDMT), N-[5-chloro-3-oxido-1H-benzotriazol-1-yl)-4-morpholinylmethylene]-N-methylmethanaminium hexafluorophosphate (HDMC), 1-cyano-2-ethoxy-2-oxoethylidenaminooxy)dimethylamino-morpholino-carbenium hexafluorophosphate (COMU), dimethylamino(triazolo[4,5-b]pyridin-3-yloxy)methylidene]-dimethylazanium tetrafluoroborate (TATU), N,N,N',N'-tetramethyl-S-(1-oxido-2-pyridyl)thiouronium tetrafluoroborate (TOTT), tetramethylfluoroformamidinium hexafluorophosphate (TFFH), N-ethoxycarbonyl-2-ethoxy-1,2-dihydroquinoline (EEDQ), 1-propanephosphonic anhydride (T3P), 4-(4,6-dimethoxy-1,3,5-triazin-2-yl)-4-methyl-morpholinium chloride (DMTMM), dicyclohexylcarbodiimide (DCC), diisopropylcarbodiimide (DIC), (N-(3-dimethylaminopropyl)-N'-ethylcarbodiimide (EDAC), and 1,1'-carbonyldimidizole (CDI).

74. The process of any one of clauses 52 to 73, wherein the base of step (d) is selected from the group consisting of N,N-diisopropylethylamine ($^i$Pr$_2$NEt), triethylamine (TEA), 4-methylmorpholine (NMM), imidazole, pyridine, and collidine.

75. The process of any one of clauses 52 to 74, wherein the additive in step (d), when present, is selected from the group consisting of 1-hydroxybenzotriazole (HOBt), 1-hydroxybenzotriazole-6-sulfonamidomethyl resin HCl (HOBt-6-sulfonamidomethyl resin HCl), hydroxy-3,4-dihydro-4-oxo-1,2,3-benzotriazine (HOOBt), N-hydroxysuccinimide (NHS), 1-hydroxy-7-aza-1H-benzotriazole (HOAt), ethyl 2-cyano-2-(hydroximino)acetate, and 4-(N,N-dimethylamino)pyridine (DMAP).

76. The process of any one of clauses 52 to 75, wherein the solvent of step (d) is a polar aprotic solvent.

77. The process of any one of clauses 52 to 76, wherein the solvent of step (d) is selected from the group consisting of dimethylformamide (DMF), N-methyl-2-pyrrolidone (NMP), dichloromethane (DCM), a dichloromethane/dimethylformamide mixture, acetonitrile (ACN), an acetonitrile/dimethylformamide mixture, and dimethylsulfoxide (DMSO).

78. The process of any one of clauses 52 to 77, wherein the third deprotecting agent of step (e) comprises a reagent or mixture of reagents capable of removing a protecting group selected from the group consisting of 9-fluorenylmethyl-carbonyl (Fmoc), benzyl carbamate (Cbz), t-butyloxy carbonyl (Boc), acetamide, trifluoroacetamide, p-toluenesulfonamide, triphemylmethyl, monomethoxytrityl (MMt), and 4-methyltrityl (Mtt).

79. The process of any one of clauses 52 to 78, wherein the third deprotecting agent of step (e) comprises a reagent or mixture of reagents capable of removing a 9-fluorenylmethyl-carbonyl.

80. The process of any one of clauses 52 to 79, wherein the first deprotecting agent of step (e) is selected from the group consisting of piperidine, morpholine, 1,8-diazabicyclo[5.4.0]undec-7-ene (DBU), diethylamine (DEA), dicyclohexamine, 4-methylpiperidine (4MP), tris(2-aminoethyl)amine, pyridine, and collidine.

81. The process of any one of clauses 52 to 80, wherein the first deprotecting agent of step (e) is piperidine.

82. The process of any one of clauses 52 to 81, wherein the solvent of step (e) is a polar aprotic solvent.

83. The process of any one of clauses 52 to 82, wherein the solvent of step (e) is selected from the group consisting of dimethylformamide (DMF), N-methyl-2-pyrrolidone (NMP), dichloromethane (DCM), a dichloromethane/dimethylformamide mixture, acetonitrile (ACN), an acetonitrile/dimethylformamide mixture, and dimethylsulfoxide (DMSO).

84. The process of any one of clauses 52 to 83, wherein the coupling agent of step (f) is selected from the group consisting of benzotriazol-1-yloxy-tris(dimethylamino)-phosphonium hexafluorophosphate (BOP), benzotriazol-1-yl-oxytripyrrolidinophosphonium hexafluorophosphate (PyBOP), 7-aza-benzotriazol-1-yloxy-tripyrrolidino-phosphonium hexafluorophosphate (PyAOP), ethyl cyano (hydroxyimino)acetato-O$_2$)-tri-(1-pyrrolidinyl)-phosphonium hexafluorophosphate (PyOxim), bromo-tripyrrolidino-phosphonium hexafluorophosphate (PyBrOP), 3-(diethoxy-phosphoryloxy)-1,2,3-benzo[d]triazin-4(3H)-one (DEPBT), 1-[bis(dimethylamino)methylene]-1H-1,2,3-triazolo[4,5-b]pyridinium 3-oxid hexafluorophosphate (HATU), 2-(1H-benzotriazole-1-yl)-1,1,3,3-tetramethyluronium tetrafluoroborate (TBTU), 2-(1H-benzotriazol-1-yl)-1,1,3,3-tetramethyluronium hexafluorophosphate (HBTU), 2-(6-chloro-1H-benzotriazol-1-yl)-N,N,N',N'-tetramethylaminium hexafluorophosphate (HCTU), 2-chloro-4,6-dimethoxy-1,3,5-triazine (CDMT), N-[5-chloro-3-oxido-1H-benzotriazol-1-yl)-4-morpholinylmethylene]-N-methylmethanaminium hexafluorophosphate (HDMC), 1-cyano-2-ethoxy-2-oxoethylidenaminooxy)dimethylamino-morpholino-carbenium hexafluorophosphate (COMU), dimethylamino(triazolo[4,5-b]pyridin-3-yloxy)methylidene]-dimethylazanium tetrafluoroborate (TATU), N,N,N',N'-tetramethyl-S-(1-oxido-2-pyridyl)thiouronium tetrafluoroborate (TOTT), tetramethylfluoroformamidinium hexafluorophosphate (TFFH), N-ethoxycarbonyl-2-ethoxy-1,2-dihydroquinoline (EEDQ), 1-propanephosphonic anhydride (T3P), 4-(4,6-dimethoxy-1,3,5-triazin-2-yl)-4-methyl-morpholinium chloride (DMTMM), dicyclohexylcarbodiimide (DCC), diisopropylcarbodiimide (DIC), (N-(3-dimethylaminopropyl)-N'-ethylcarbodiimide (EDAC), and 1,1'-carbonyldimidizole (CDI).

85. The process of any one of clauses 52 to 84, wherein the base in step (f), when present, is selected from the group consisting of N,N-diisopropylethylamine ($^i$Pr$_2$NEt), triethylamine (TEA), 4-methylmorpholine (NMM), imidazole, pyridine, and collidine.

86. The process of any one of clauses 52 to 85, wherein the additive in step (f), when present, is selected from the group consisting of 1-hydroxybenzotriazole (HOBt), 1-hydroxybenzotriazole-6-sulfonamidomethyl resin HCl (HOBt-6-sulfonamidomethyl resin HCl), hydroxy-3,4-dihydro-4-oxo-1,2,3-benzotriazine (HOOBt), N-hydroxysuccinimide (NHS), 1-hydroxy-7-aza-1H-benzotriazole (HOAt), ethyl 2-cyano-2-(hydroximino)acetate, and 4-(N,N-dimethylamino)pyridine (DMAP).

87. The process of any one of clauses 52 to 86, wherein the solvent in step (f) is a polar aprotic solvent.

88. The process of any one of clauses 52 to 87, wherein the solvent in step (f) is a polar aprotic solvent selected from the group consisting of dimethylformamide (DMF), N-methyl-2-pyrrolidone (NMP), dichloromethane (DCM), a dichloromethane/dimethylformamide mixture, acetonitrile (ACN), an acetonitrile/dimethylformamide mixture, and dimethylsulfoxide (DMSO).

89. The process of any one of clauses 52 to 88, wherein the third deprotecting agent of step (g) is a reagent or mixture of reagents capable of removing a protecting group selected from the group consisting of t-butyl, benzyl, 2-chlorotrityl (2-Cl-Trt), 2,4-dimethoxybenzyl (Dmb), allyl, 1,1-dimethylallyl (Dma), and p-nitrobenzyl (pNB).

90. The process of any one of clauses 52 to 89, wherein the third deprotecting agent of step (g) is selected from the group consisting of trifluoroacetic acid (TFA), hydrofluoric acid (HF), triflic acid (TfOH), a trifluoroacetic acid (TFA)/water/triisopropylsilane mixture, a trifluoroacetic acid (TFA)/dichloromethane (DCM) mixture, triethylsaline (TES), indole, a phenol/anisole mixture, and thioanisole.

91. The process of any one of clauses 52 to 90, wherein the third deprotecting agent of step (g) is a trifluoroacetic acid (TFA)/water/triisopropylsilane mixture.

92. The process of any one of clauses 52 to 91, wherein the cleavage reagent of step (g) is trifluoroacetic acid (TFA) or a trifluoroacetic acid (TFA)/water/triisopropylsilane mixture.

93. The process of any one of clauses 52 to 92, wherein the cleavage reagent of step (g) is a trifluoroacetic acid (TFA)/water/triisopropylsilane mixture.

94. The process of any one of clauses 52 to 93, wherein the organic solvent of step (g) is selected from the group consisting of $CH_2Cl_2$, THF, diethyl ether, MeOH, EtOH, acetone, and acetonitrile.

95. The process of any one of clauses 52 to 94, wherein the compound of the formula 6, a solvent, a coupling agent, and optionally a base and/or an additive are combined to form a mixture comprising an activated compound of the formula 6'

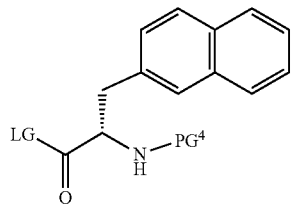

wherein LG in compound 6' is a leaving group, prior to contacting with the resin-based compound of the formula 5.

96. The process of any one of clauses 52 to 94, wherein the compound of the resin-based compound of the formula 5, the compound of the formula 6, a solvent, a coupling agent, and optionally a base and/or an additive are contacted together prior to or simultaneously with the in situ formation of an activated compound of the formula 6'

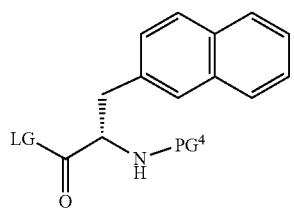

wherein LG in compound 6' is a leaving group.

97. The process of clause 95 or 96, wherein LG in compound 6' is selected from the group consisting of 1-($\lambda^1$-oxidaneyl)-1H-benzo[d][1,2,3]triazole, 3-($\lambda^1$-oxidaneyl)-3H-[1,2,3]triazolo[4,5-b]pyridine, ethyl cyano(hydroxyimino)acetate (Oxyma), bromide, 3-($\lambda^1$-oxidaneyl)benzo[d][1,2,3]triazin-4(3H)-one, 6-chloro-1-($\lambda^1$-oxidaneyl)-1H-benzo[d][1,2,3]triazole, 2,4-dimethoxy-6-($\lambda^1$-oxidaneyl)-1,3,5-triazine, etabonic acid, propylphosphonic acid, dicyclohexylurea, 1-(3-(dimethyl-$\lambda^4$-azaneyl)propyl)-3-ethylurea, and imidazolyl.

98. The process of any one of the clauses 95 to 97, wherein LG in compound 6' is imidazolyl.

99. The process of any one of the preceding clauses, wherein the compound of the formula 9, a solvent, a coupling agent, and optionally a base and/or an additive are combined to form a mixture comprising an activated compound of the formula 9'

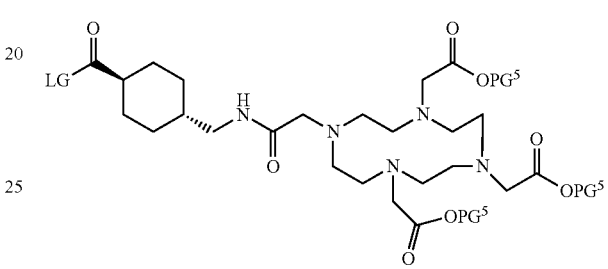

wherein LG in compound 9' is a leaving group, prior to contacting with the resin-based compound of the formula H.

100. The process of any one of clauses 52 to 98, wherein the resin-based compound of the formula 8, the compound of the formula 9, a solvent, a coupling agent, and optionally a base and/or an additive are contacted together prior to or simultaneous with the in situ formation of an activated compound of the formula 9'

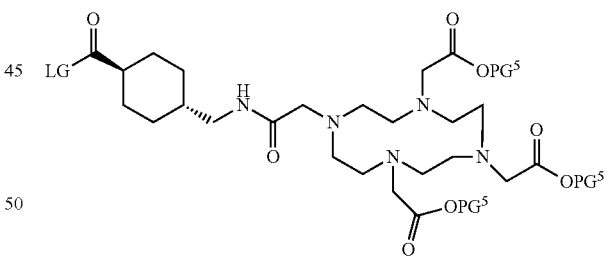

wherein LG in compound 9' is a leaving group.

101. The process of clause 99 or 100, wherein LG in compound 9' is selected from the group consisting of 1-($\lambda^1$-oxidaneyl)-1H-benzo[d][1,2,3]triazole, 3-($\lambda^1$-oxidaneyl)-3H-[1,2,3]triazolo[4,5-b]pyridine, ethyl cyano(hydroxyimino)acetate (Oxyma), bromide, 3-$\lambda^1$-oxidaneyl)benzo[d][1,2,3]triazin-4(3H)-one, 6-chloro-1-($\lambda^1$-oxidaneyl)-1H-benzo[d][1,2,3]triazole, 2,4-dimethoxy-6-($\lambda^1$-oxidaneyl)-1,3,5-triazine, etabonic acid, propylphosphonic acid, dicyclohexylurea, 1-(3-(dimethyl-$\lambda^4$-azaneyl)propyl)-3-ethylurea, and imidazolyl.

102. The process of any one of the clauses 99 to 101, wherein LG in compound 9' is imidazolyl.

103. A resin-based compound of the formula 4

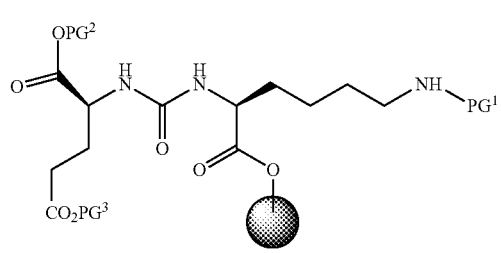

wherein PG$^1$ is an amine protecting group, and PG$^2$ and PG$^3$ are each independently a carboxyl protecting group.

104. A resin-based compound of the formula 5

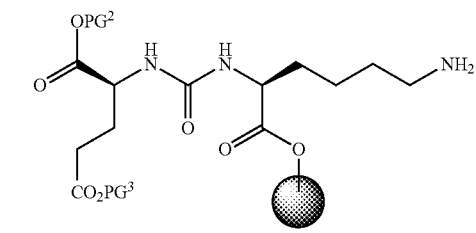

wherein PG$^2$ and PG$^3$ are each independently a carboxyl protecting group.

105. A resin-based compound of the formula 7

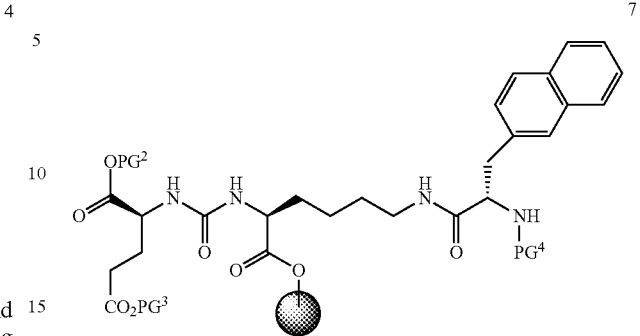

wherein PG$^2$ and PG$^3$ are each independently a carboxyl protecting group, and PG$^4$ is an amine protecting group.

106. A resin-based compound of the formula 8

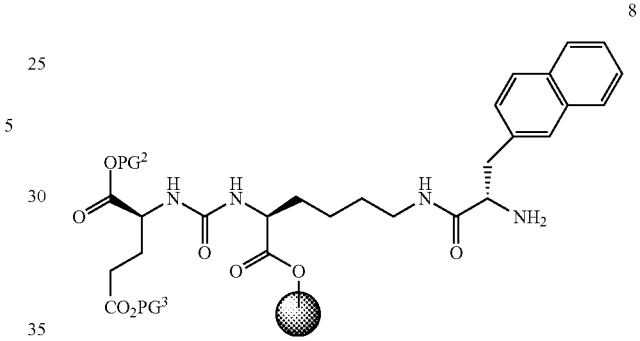

wherein PG$^2$ and PG$^3$ are each independently a carboxyl protecting group.

107. A resin-based compound of the formula 10

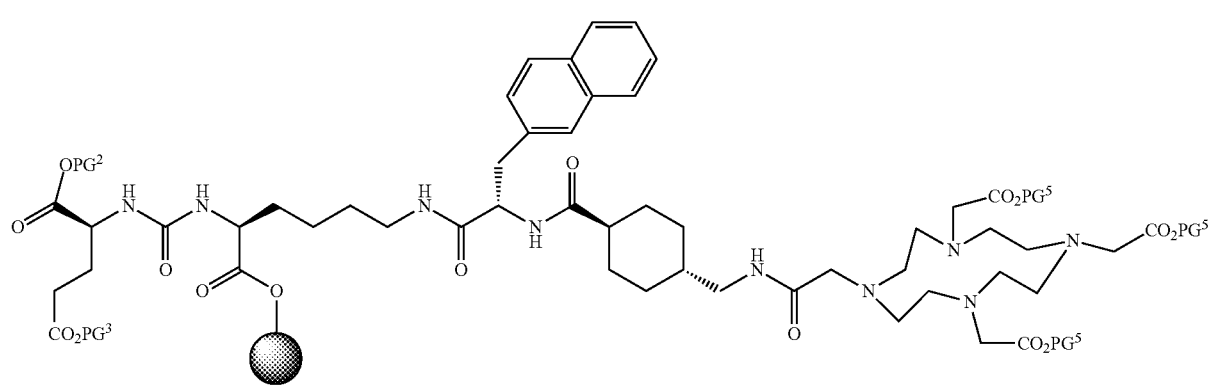

wherein each PG$^2$, PG$^3$, and PG$^5$ is independently a carboxyl protecting group.

108. The resin-based compound of any one of clauses 103 to 107, wherein $PG^1$ and $PG^4$, when present, are independently selected from the group consisting of 9-fluorenylmethyl-carbonyl (Fmoc), benzyl carbamate (Cbz), t-butyloxy carbonyl (Boc), acetamide, trifluoroacetamide, p-toluenesulfonamide, triphemylmethyl, monomethoxytrityl (MMt), and 4-methyltrityl (Mtt).

109. The resin-based compound of any one of clauses 103 to 108, wherein $PG^1$, when present, is monomethoxytrityl (MMt) or 4-methyltrityl (Mtt).

110. The resin-based compound of any one of clauses 103 to 109, wherein $PG^1$, when present, is 4-methyltrityl (Mtt).

111. The resin-based compound of any one of clauses 103 to 110, wherein $PG^4$, when present, is 9-fluorenylmethylcarbonyl.

112. The resin-based compound of any one of clauses 103 to 111, wherein $PG^2$, $PG^3$, and $PG^5$, when present, are each t-butyl.

113. A resin-based compound of the formula C

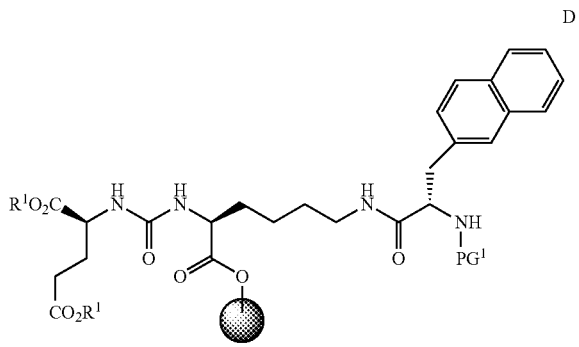

wherein $PG^2$ is an amine protecting group, and each $R^1$ is a $C_1$-$C_4$ alkyl or a cyclohexyl.

114. A resin-based compound of the formula C' wherein each $R^1$ is a $C_1$-$C_4$ alkyl or a cyclohexyl.

115. A resin-based compound of the formula D wherein $PG^1$ is an amine protecting groups, and each $R^1$ is a $C_1$-$C_4$ alkyl or a cyclohexyl.

116. A resin-based compound of the formula D' wherein each $R^1$ is a $C_1$-$C_4$ alkyl or a cyclohexyl.

117. A resin-based compound of the formula E wherein $PG^1$ is an amine protecting groups, and each $R^1$ is a $C_1$-$C_4$ alkyl or a cyclohexyl.

118. A resin-based compound of the formula E'

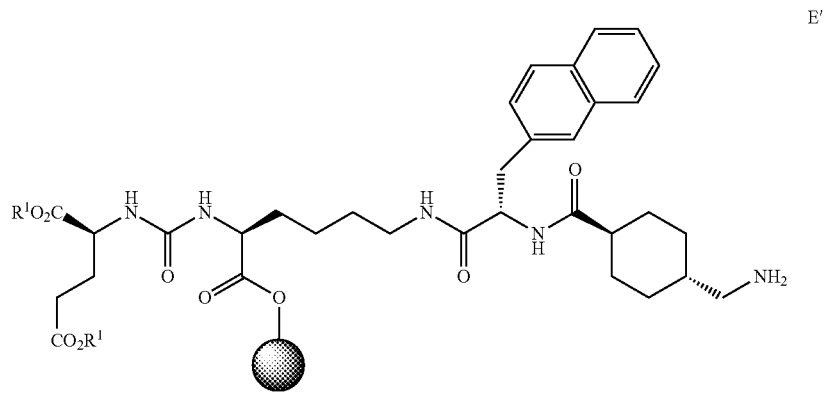

wherein each $R^1$ is a $C_1$-$C_4$ alkyl or a cyclohexyl.

119. A resin-based compound of the formula F

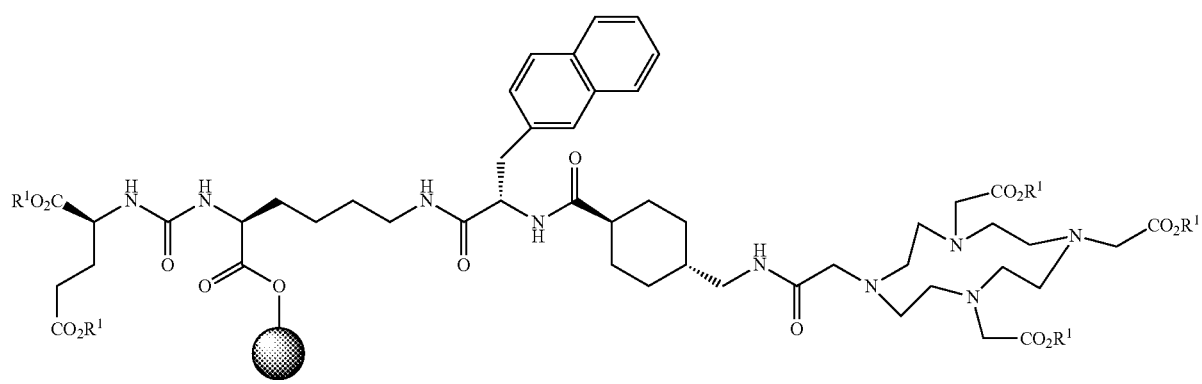

each $R^1$ is a $C_1$-$C_4$ alkyl or a cyclohexyl.

120. The resin-based compound of clause 115 or 117, wherein $PG^1$ is 9-Fluorenylmethyl-carbonyl (Fmoc) or t-butylcarbonyl (Boc).

121. The resin-based compound of any one of clauses 115, 117, or 120, wherein $PG^1$ is 9-Fluorenylmethyl-carbonyl (Fmoc).

122. The resin-based compound of clause 113, wherein $PG^2$ is monomethoxytrityl (MMt) or 4-methyltrityl (Mtt).

123. The resin-based compound of clause 113 or 122, wherein $PG^2$ is 4-methyltrityl (Mtt).

124. The resin-based compound of any one of clauses 113 to 119, wherein $R^1$ is t-butyl.

Definitions

As used herein, the term "alkyl" includes a chain of carbon atoms, which is optionally branched and contains from 1 to 4 carbon atoms, and the like may be referred to as "lower alkyl." Illustrative alkyl groups include, but are not limited to, methyl, ethyl, n-propyl, isopropyl, n-butyl, isobutyl, sec-butyl, and tert-butyl.

As used herein, unless otherwise indicated, the term "abnormal cell growth" refers to cell growth that is independent of normal regulatory mechanisms (e.g., loss of contact inhibition).

The term "subject" refers to a mammalian patient in need of such treatment, such as a human.

As used herein, the term "protecting group" or "PG" refers to any group as commonly known to one of ordinary skill in the art that can be introduced into a molecule by chemical modification of a functional group, such as an amine or hydroxyl, to obtain chemoselectivity in a subsequent chemical reaction. It will be appreciated that such protecting groups can be subsequently removed from the functional group at a later point in a synthesis to provide further opportunity for reaction at such functional groups or, in the case of a final product, to unmask such functional group. Protecting groups have been described in, for example, Wuts, P. G. M., Greene, T. W., Greene, T. W., & John Wiley & Sons. (2006). Greene's protective groups in organic synthesis. Hoboken, N.J: Wiley-Interscience. One of skill in the art will readily appreciate the chemical process conditions under which such protecting groups can be installed on a functional group. Suitable amine protecting groups useful in connection with the present disclosure include, but are not limited to, 9-Fluorenylmethyl-carbonyl (Fmoc) and t-butylcarbonyl (Boc).

As used herein, the term "leaving group" of "LG" refers to any group commonly known to one of ordinary skill in the art that departs with a pair of electrons in heterolytic bond cleavage. Leaving groups can be anions or neutral molecules, but in either case it is crucial that the leaving group be able to stabilize the additional electron density that results from bond heterolysis.

DETAILED DESCRIPTION

Before the present disclosure is further described, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as is commonly understood by one of ordinary skill in the art to which this disclosure belongs. All patents, applications, published applications and other publications referred to herein are incorporated by reference in their entireties. If a definition set forth in this section is contrary to or otherwise inconsistent with a definition set forth in a patent, application, or other publication that is herein incorporated by reference, the definition set forth in this section prevails over the definition incorporated herein by reference.

As used herein and in the appended claims, the singular forms "a," "an," and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Synthesis Methods

Method 1

In some embodiments, the disclosure provides a process for preparing a compound of the formula I comprising
a. contacting a resin-based compound of the formula A

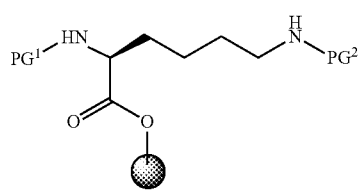

A with a first deprotecting agent in a polar aprotic solvent to provide a resin-based compound of the formula A'

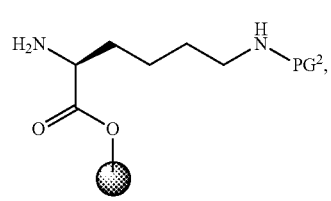

A' or b. contacting the resin-based compound of the formula A' with a compound of the formula B

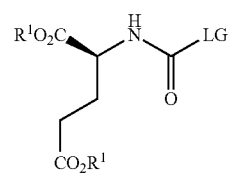

B in the presence of an organic solvent and a base to provide a resin-based compound of the formula C

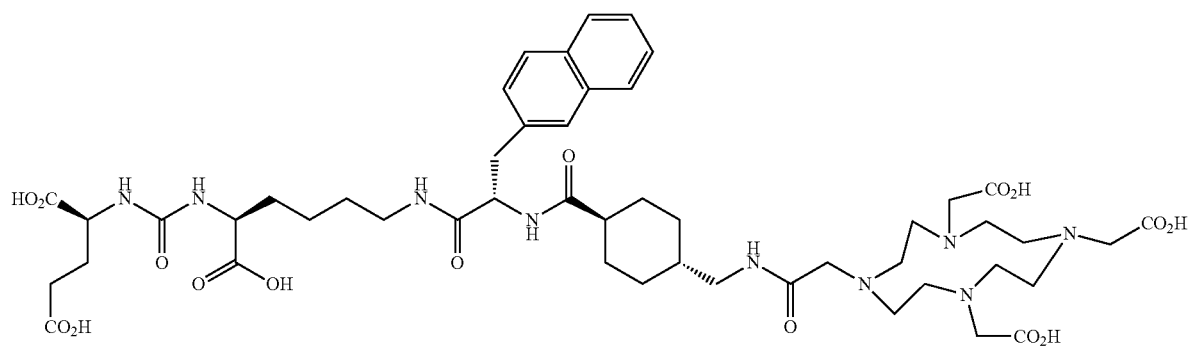

I

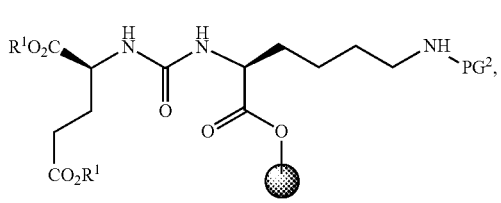

C or c. contacting the resin-based compound of the formula C with a second deprotecting agent in the presence of an organic solvent to provide a resin-based compound of the formula C'

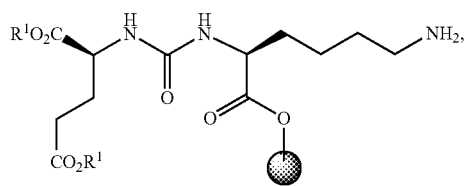

C' or d. contacting the resin-based compound of the formula C' with PG¹-3-(2-napthyl)-L-alanine in the presence of a polar aprotic solvent, a coupling agent, and a base to provide a resin-based compound of the formula D

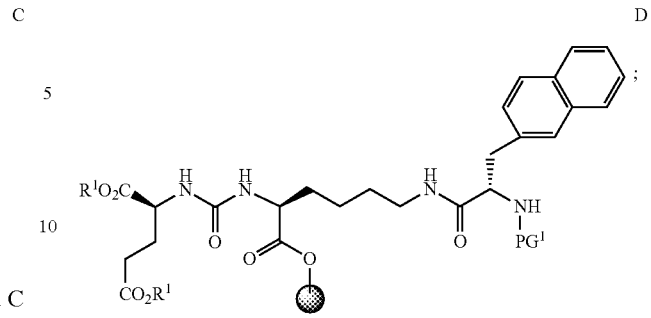

D or e. contacting the resin-based compound of the formula D with the first deprotecting agent in a polar aprotic solvent to provide a resin-based compound of the formula D'

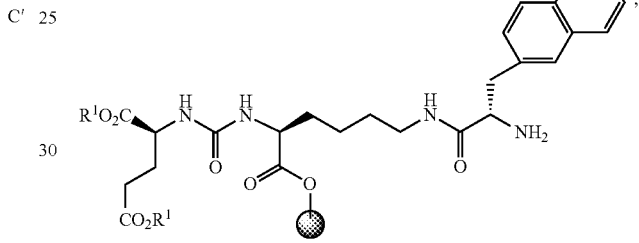

D' or f. contacting the resin-based compound of the formula D' with PG¹-tranexamic acid in the presence of a polar aprotic solvent, a coupling agent, and a base to provide a resin-based compound of the formula E

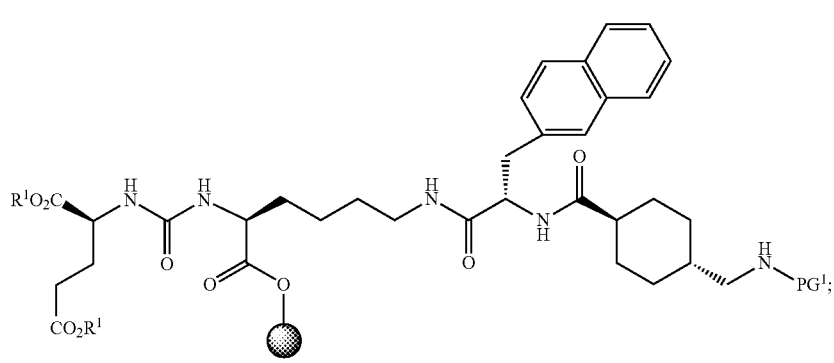

E or
  g. contacting the resin-based compound of the formula E with the first deprotecting agent in a polar aprotic solvent to provide a resin-based compound of the formula E'

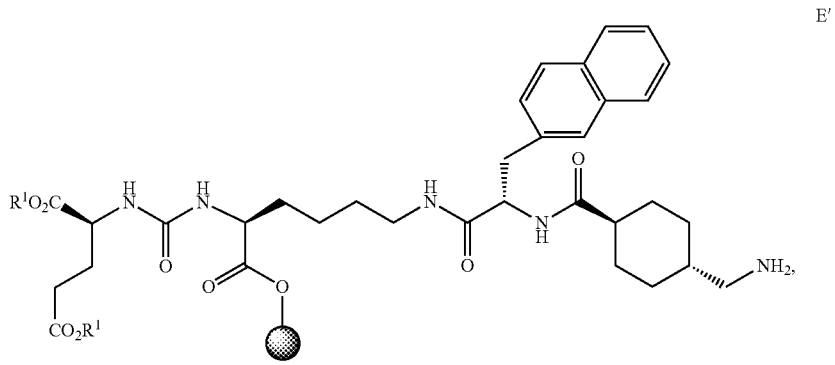

E' or
  h. contacting the resin-based compound of the formula E' with a compound of the formula E²'

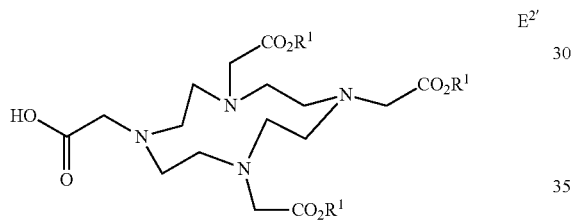

E²' in the presence of a polar aprotic solvent, a coupling agent, and a base to provide a resin-based compound of the formula F

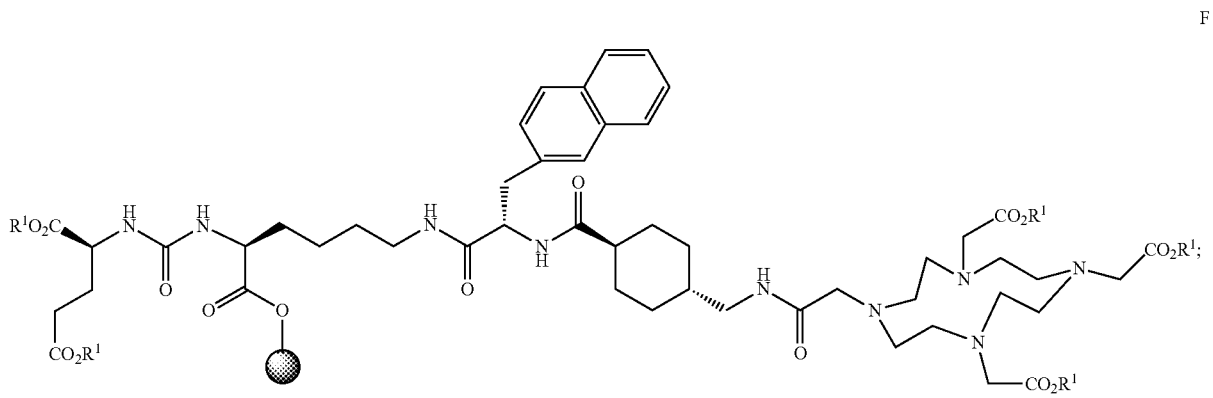

F or
  i. contacting the resin-based compound of the formula F with a third deprotecting agent and/or a cleavage reagent in an organic solvent,
    wherein $PG^1$ and $PG^2$ are amine protecting groups, LG is a leaving group, and $R^1$ is a $C_1$-$C_4$ alkyl or a cyclohexyl.

Method 2

Alternatively, in some embodiments, the disclosure provides a process for preparing a compound of the formula 1

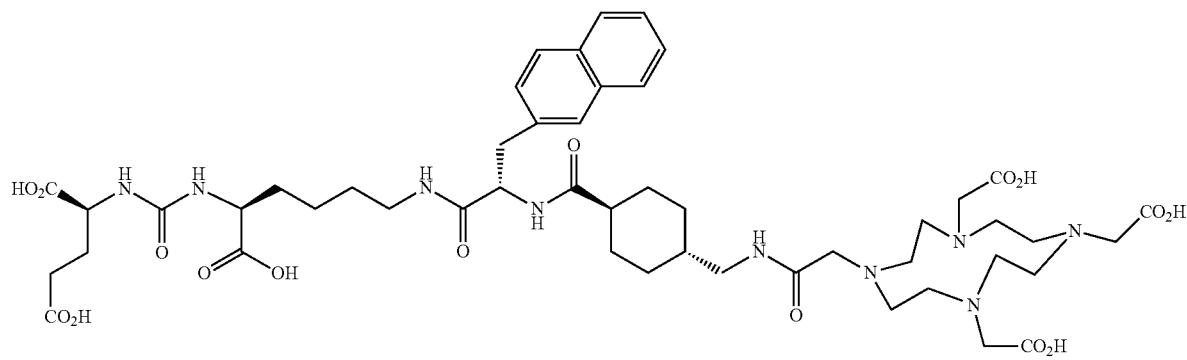

comprising one or more of a. contacting a resin-based compound of the formula 1 with a first deprotecting agent in the presence of a solvent to provide a resin-based compound of the formula 2 or b. contacting the resin-based compound of the formula 2 with a compound of the formula 3

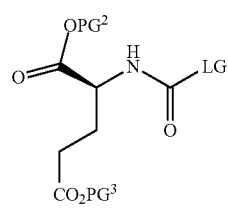

in the presence of an organic solvent and a base to provide a resin-based compound of the formula 4 or c. contacting the resin-based compound of the formula 4 with a second deprotecting agent in the presence of an organic solvent to provide a resin-based compound of the formula 5 or d. contacting the resin-based compound of the formula 5 with a compound of the formula 6 in the presence of a solvent, a coupling agent, and optionally a base and/or an additive to provide a resin-based compound of the formula 7

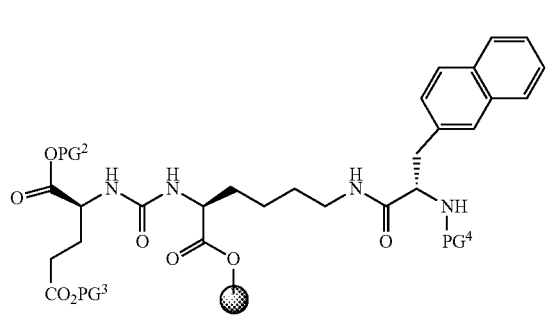

or f. contacting the resin-based compound of the formula 8 with a compound of the formula 9

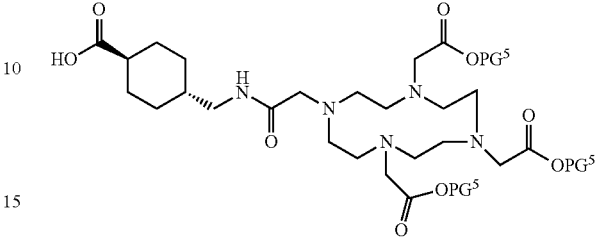

in the presence of a solvent, a coupling agent, and optionally a base and/or an additive to provide a resin-based compound of the formula 10

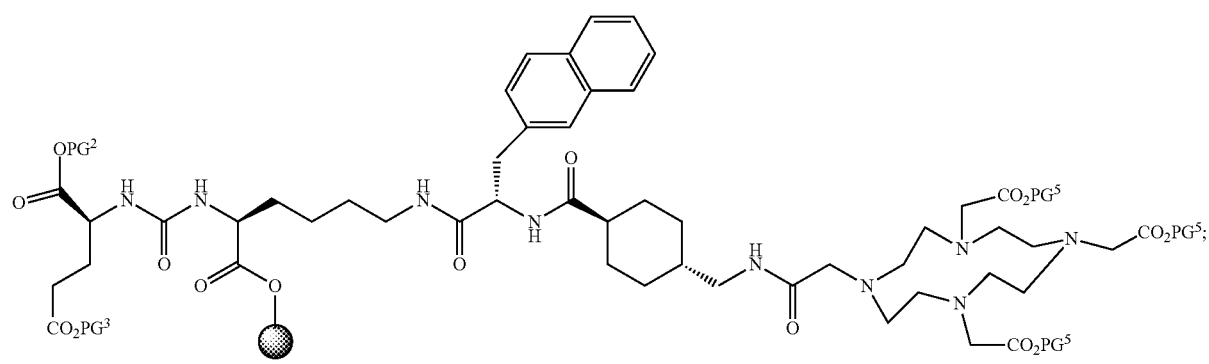

or e. contacting the resin-based compound of the formula 7 with a third deprotecting agent in the presence of a solvent to provide a resin-based compound of the formula 8

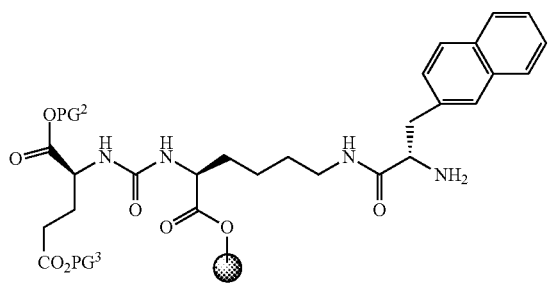

or g. contacting the resin-based compound of the formula 10 with at least one third deprotecting agent and/or a cleavage reagent in the presence of an organic solvent to provide the compound of the formula I, wherein PG, $PG^1$ and $PG^4$ are amine protecting groups, $PG^2$, $PG^3$, and $PG^5$ are carboxyl protecting groups, and LG in compound C is a leaving group.

It will be appreciated that the present disclosure provides processes for preparing a compound of the formula I described in the paragraphs above (by Method 1 or Method 2), comprising more than one of the step listed in the alternative. Accordingly, the present disclosure provides a process for preparing a compound of the formula I, comprising steps (a) and (b). Alternatively, the present disclosure provides a process for preparing a compound of the formula I, comprising steps (b) and (c). Alternatively, the present disclosure provides a process for preparing a compound of the formula I, comprising steps (c) and (d). Alternatively, the present disclosure provides a process for preparing a compound of the formula I, comprising steps (d) and (e). Alternatively, the present disclosure provides a process for preparing a compound of the formula I, comprising steps (e) and (f). Alternatively, the present disclosure provides a process for preparing a compound of the formula I, comprising steps (f) and (g). Alternatively, the present disclosure provides a process for preparing a compound of the formula I, comprising steps (g) and (h). Alternatively, the present disclosure provides a process for preparing a compound of the formula I, comprising steps (h) and (i). Alternatively, the present disclosure provides a process for preparing a compound of the formula I, comprising steps (a), (b) and (c). Alternatively, the present disclosure provides a process for preparing a compound of the formula I, comprising steps (b), (c) and (d). Alternatively, the present disclosure provides a process for preparing a compound of the formula I, comprising steps (c), (d) and (e). Alternatively, the present disclosure provides a process for preparing a compound of the formula I, comprising steps (d), (e) and (f). Alternatively, the present disclosure provides a process for preparing a compound of the formula I, comprising steps (e), (f) and (g). Alternatively, the present disclosure provides a process for preparing a compound of the formula I, comprising steps (d), (e) and (f). Alternatively, the present disclosure provides a process for preparing a compound of the formula I, comprising steps (f), (g) and (h). Alternatively, the present disclosure provides a process for preparing a compound of the formula I, comprising steps (d), (e) and (f). Alternatively, the present disclosure provides a process for preparing a compound of the formula I, comprising steps (g), (h) and (i). Alternatively, the present disclosure provides a process for preparing a compound of the formula I, comprising steps (a), (b), (c), (d), (e), (f), (g), and (h).

In the various embodiments described herein, it will be appreciated by a person having ordinary skill in the art that the choice of protecting groups used in the preparation of compound (I) can be chosen from various alternatives known in the art. It will further be appreciated that any protecting group scheme will be chosen such that the protecting groups used are an orthogonal protection strategy. As used herein, "orthogonal protection" is a strategy allowing for the deprotection of one or more protective groups among multiple protecting groups, where the protecting groups are removed one at a time each using a dedicated set of reaction conditions without affecting the others, or together as a subset of all protecting groups used in the synthesis using a dedicated set of reaction conditions without affecting the others.

In step (a) of Method 1, $PG^1$ on the resin-based compound of the formula A can be a protecting group, such as 9-Fluorenylmethyl-carbonyl (Fmoc) or t-butylcarbonyl (Boc), and $PG^2$ can be an orthogonal protecting group, such as 4-methyltrityl (Mtt) or monomethoxytrityl (MMt). The first deprotecting agent in step (a) of Method 1 can be an acidic or basic deprotecting agent, depending on the identity of $PG^1$ and/or $PG^2$. In particular, the first deprotecting agent can be a basic deprotecting agent, such as piperidine. morpholine, 1,8-diazabicyclo[5.4.0]undec-7-ene (DBU), diethylamine (DEA), dicyclohexamine, 4-methylpiperidine (4MP), Tris (2-aminoethyl)amine, pyridine, or a collidine. In particular, the first deprotecting agent can be an acidic deprotecting agent, such as TFA, HCl, or $H_3PO_4$. Suitable deprotecting agents and conditions for step (a) of Method 1 can be found in for example, Wuts, P. G. M., Greene, T. W., Greene, T. W., & John Wiley & Sons. (2006). *Greene's protective groups in organic synthesis*. Hoboken, N.J: Wiley-Interscience. In step (a) of Method 1, the base used to remove the Fmoc group is piperidine. The polar-aprotic solvent of step (a) of Method 1 can be any polar-aprotic solvent known in the art. Suitable polar-aprotic solvents include, but are not limited to, dimethylformamide (DMF), N-methyl-2-pyrrolidone (NMP), dichloromethane (DCM), a dichloromethane/dimethylformamide mixture, acetonitrile (ACN), an acetonitrile/dimethylformamide mixture, and dimethylsulfoxide (DMSO), and the like. It will be appreciated that step (a) of Method 1 can be conducted at any temperature commonly used in solid-phase synthesis, such as room temperature, under cooling, or under warming conditions. The deprotection step (a) of Method 1 can be carried out for a period of time, such as from about 5 minutes to about 200 minutes, or about 10 minutes to about 100 minutes, or about 40 to about 60 minutes to about 15 minutes, or about 30 minutes, or about 90 minutes. Following the deprotection step (a) of Method 1, the resin-based compound of the formula A' produced in step (a) can be washed with reagents commonly known in the art, such as DMF, IPA, $CH_2Cl_2$, and the like.

In step (b) of Method 1, $R^1$ on the compound of the formula B can $C_1$-$C_4$ alkyl, preferably tert-butyl, or a cyclohexyl, and LG is a leaving group, such as an active ester. Suitable active esters known in the art include, but are not limited to 4-nitrophenyl, 2,4,5-trichlorophenyl, NHS ester, benzotriazyl, and the like. In some embodiments, the LG is a 4-nitrophenyl ester. It will be appreciated that the choice of $R^1$ will be orthogonal to the choice for $PG^1$, $PG^2$, and/or the resin bead connection. In step (b) of Method 1, the base can be any base commonly known in the art for urea formation reactions. Suitable bases include, but are not limited to, N,N-Diisopropylethylamine ($^iPr_2NEt$), triethylamine (TEA), 4-methylmorpholine (NMM), imidazole, pyridine, and a collidine. Step (b) of Method 1 can be carried out in a solvent, such as an organic solvent, The organic solvent can be any solvent commonly known in the art for resin-based synthesis. Suitable organic solvents include, but are not limited to, $CH_2Cl_2$, THF, diethyl ether, MeOH, EtOH, acetone, acetonitrile, and the like. In some embodiments, the solvent is $CH_2Cl_2$. It will be appreciated that step (b) of Method 1 can be conducted at any temperature commonly used in solid-phase synthesis, such as room temperature, under cooling, or under warming conditions. The deprotection step (b) of Method 1 can be carried out for a period of time, such as from about 5 minutes to about 200 minutes, or about 10 minutes to about 100 minutes, or about 40 to about 60 minutes to about 15 minutes, or about 30 minutes, or about 90 minutes. Following the deprotection step (a) of Method 1, the resin-based compound of the formula C produced in step (b) can be washed with reagents commonly known in the art, such as DMF, IPA, $CH_2Cl_2$, and the like.

In step (c) of Method 1, the second deprotecting agent can be an acidic deprotecting agent, basic deprotecting agent, or other deprotecting agent depending on the identity of $PG^1$ and/or $PG^2$. Some embodiments, the second deprotecting agent can be an acidic deprotecting agent. Suitable acidic deprotecting agents include, but are not limited to, TFA, HCl, or $H_3PO_4$. In some embodiments, the second deprotecting agent in step (c) of Method 1 is selected from the group consisting of trifluoroacetic acid (TFA), acetic acid, trifluoroethanol, hexafluoroisopropanol, dichloromethane, and combinations thereof. In some embodiments, the second deprotecting is TFA, such as when $PG^2$ is Mtt. In some embodiments, the second deprotecting is a mixture of acetic acid and trifluoroethanol, such as when $PG^2$ is Mtt. In some embodiments, the second deprotecting agent can be a palladium deprotecting agent, such as when $PG^2$ is alloc. Suitable deprotecting agents and conditions for step (c) of Method 1 can be found in for example, Wuts, P. G. M., Greene, T. W., Greene, T. W., & John Wiley & Sons. (2006). *Greene's protective groups in organic synthesis*. Hoboken, N.J: Wiley-Interscience. an acidic deprotecting agent (TFA) is used to cleave Mtt. Other suitable acidic deprotecting agents include, but are not limited to, acetic acid, trifluoroethanol, dichloromethane, hexafluoroisopropanol, dichloromethane, and combinations thereof. Step (c) of Method 1 can be carried out in a solvent, such as an organic solvent. The organic solvent can be any solvent commonly known in the art for resin-based synthesis. Suitable organic solvents include, but are not limited to, CH$_2$Cl$_2$, THF, diethyl ether, MeOH, EtOH, acetone, acetonitrile, and the like. In some embodiments, the solvent is CH$_2$Cl$_2$.

In step (d), PG$^1$ on the PG$^1$-3-(2-napthyl)-L-alanine

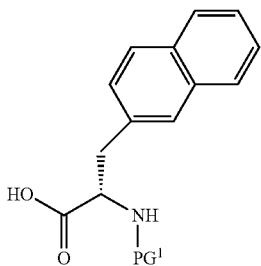

can be a protecting group, such as 9-Fluorenylmethyl-carbonyl (Fmoc) or t-butylcarbonyl (Boc). See step (a) of Method 1 above regarding the choice of PG$^1$. In step (d) of Method 1, the polar aprotic solvent can be any polar aprotic solvent commonly known in the art. Suitable polar aprotic solvents include, but are not limited to, N-methyl-2-pyrrolidone (NMP), dichloromethane (DCM), a dichloromethane/dimethylformamide mixture, acetonitrile (ACN), an acetonitrile/dimethylformamide mixture, and dimethylsulfoxide (DMSO). In some embodiments, the polar aprotic solvent is DMF. Suitable bases include, but are not limited to, triethylamine (TEA), 4-methylmorpholine (NMM), imidazole, pyridine, and collidine. In some embodiments, the base in step (d) of Method 1 is N,N-Diisopropylethylamine ($^i$Pr$_2$NEt). The coupling agent can be any coupling agent commonly known in the art for resin-based synthesis. Suitable coupling agents include, but are not limited to, HATU, TBTU, HBTU, CDMT, HDMC, COMU, TATU, TOTT, T3P, DMTMM. In some embodiments, the coupling agent in step (d) of Method 1 is (PyBOP). It will be appreciated that step (d) of Method 1 can be conducted at any temperature commonly used in solid-phase synthesis, such as room temperature, under cooling, or under warming conditions. The coupling step (d) of Method 1 can be carried out for a period of time, such as from about 5 minutes to about 200 minutes, or about 10 minutes to about 100 minutes, or about 40 to about 60 minutes to about 15 minutes, or about 30 minutes, or about 90 minutes. Following the coupling step (d) of Method 1, the resin-based compound of the formula D produced in step (d) of Method 1 can be washed with reagents commonly known in the art, such as DMF, IPA, CH$_2$Cl$_2$, and the like.

In step (e) of Method 1, PG$^1$ on the resin-based compound of the formula D can be a protecting group, such as 9-Fluorenylmethyl-carbonyl (Fmoc) or t-butylcarbonyl (Boc), and PG$^2$ can be an orthogonal protecting group, such as 4-methyltrityl (Mtt) or monomethoxytrityl (MMt). The first deprotecting agent in step (e) of Method 1 can be an acidic or basic protecting agent, depending on the identity of PG$^1$ and/or PG$^2$. In particular, the first deprotecting agent can be a basic deprotecting agent, such as piperidine, morpholine, 1,8-diazabicyclo[5.4.0]undec-7-ene (DBU), diethylamine (DEA), dicyclohexamine, 4-methylpiperidine (4MP), Tris(2-aminoethyl)amine, pyridine, or a collidine. In particular, the first deprotecting agent can be an acidic deprotecting agent, such as TFA, HCl, or H$_3$PO$_4$. Suitable deprotecting agents and conditions for step (e) of Method 1 can be found in for example, Wuts, P. G. M., Greene, T. W., Greene, T. W., & John Wiley & Sons. (2006). *Greene's protective groups in organic synthesis*. Hoboken, N.J: Wiley-Interscience. The polar-aprotic solvent of step (e) of Method 1 can be any polar-aprotic solvent known in the art. Suitable polar-aprotic solvents include, but are not limited to, dimethylformamide (DMF), N-methyl-2-pyrrolidone (NMP), dichloromethane (DCM), a dichloromethane/dimethylformamide mixture, acetonitrile (ACN), an acetonitrile/dimethylformamide mixture, and dimethylsulfoxide (DMSO), and the like. It will be appreciated that step (e) of Method 1 can be conducted at any temperature commonly used in solid-phase synthesis, such as room temperature, under cooling, or under warming conditions. The deprotection step (e) of Method 1 can be carried out for a period of time, such as from about 5 minutes to about 200 minutes, or about 10 minutes to about 100 minutes, or about 40 to about 60 minutes to about 45 minutes, or about 60 minutes, or about 90 minutes. Following the deprotection step (e) of Method 1, the resin-based compound of the formula D' produced in step (e) of Method 1 can be washed with reagents commonly known in the art, such as DMF, IPA, CH$_2$Cl$_2$, and the like.

In step (f) of Method 1, PG$^1$ on the PG$^1$-tranexamic acid reagent

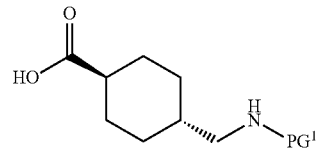

can be a protecting group, such as 9-Fluorenylmethyl-carbonyl (Fmoc) or t-butylcarbonyl (Boc). See step (a) of Method 1 above regarding the choice of PG$^1$. In step (f) of Method 1, the polar aprotic solvent can be any polar aprotic solvent commonly known in the art. Suitable polar aprotic solvents include, but are not limited to, N-methyl-2-pyrrolidone (NMP), dichloromethane (DCM), a dichloromethane/dimethylformamide mixture, acetonitrile (ACN), an acetonitrile/dimethylformamide mixture, and dimethylsulfoxide (DMSO). In some embodiments, the polar aprotic solvent is DMF. Suitable bases include, but are not limited to, triethylamine (TEA), 4-methylmorpholine (NMM), imidazole, pyridine, and collidine. In some embodiments, the base in step (f) of Method 1 is N,N-Diisopropylethylamine ($^i$Pr$_2$NEt). The coupling agent can be any coupling agent commonly known in the art for resin-based synthesis. Suitable coupling agents include, but are not limited to, HATU, TBTU, HBTU, CDMT, HDMC, COMU, TATU, TOTT, T3P, DMTMM. In some embodiments, the coupling agent in step (f) of Method 1 is (PyBOP). It will be appreciated that step (f) of Method 1 can be conducted at any temperature commonly used in solid-phase synthesis, such as room temperature, under cooling, or under warming conditions. The coupling step (f) of Method 1 can be carried out for a period of time, such as from about 5 minutes to about 200 minutes, or about 10 minutes to about 100 minutes, or about 40 to about 60 minutes to about 15 minutes, or about 30 minutes, or about 90 minutes. Following the coupling step (f) of Method 1, the resin-based compound of the formula E produced in step (f) of Method 1 can be washed with reagents commonly known in the art, such as DMF, IPA, $CH_2Cl_2$, and the like.

In step (g) of Method 1, $PG^1$ on the resin-based compound of the formula E can be a protecting group, such as 9-Fluorenylmethyl-carbonyl (Fmoc) or t-butylcarbonyl (Boc), and $PG^2$ can be an orthogonal protecting group, such as 4-methyltrityl (Mtt) or monomethoxytrityl (MMt). The first deprotecting agent in step (g) of Method 1 can be an acidic or basic protecting agent, depending on the identity of $PG^1$ and/or $PG^2$. In particular, the first deprotecting agent can be a basic deprotecting agent, such as piperidine. morpholine, 1,8-diazabicyclo[5.4.0]undec-7-ene (DBU), diethylamine (DEA), dicyclohexamine, 4-methylpiperidine (4MP), Tris (2-aminoethyl)amine, pyridine, or a collidine. In particular, the first deprotecting agent can be an acidic deprotecting agent, such as TFA, HCl, or $H_3PO_4$. Suitable deprotecting agents and conditions for step (g) of Method 1 can be found in for example, Wuts, P. G. M., Greene, T. W., Greene, T. W., & John Wiley & Sons. (2006). *Greene's protective groups in organic synthesis*. Hoboken, N.J: Wiley-Interscience. The polar-aprotic solvent of step (g) of Method 1 can be any polar-aprotic solvent known in the art. Suitable polar-aprotic solvents include, but are not limited to, dimethylformamide (DMF), N-methyl-2-pyrrolidone (NMP), dichloromethane (DCM), a dichloromethane/dimethylformamide mixture, acetonitrile (ACN), an acetonitrile/dimethylformamide mixture, and dimethylsulfoxide (DMSO), and the like. It will be appreciated that step (g) of Method 1 can be conducted at any temperature commonly used in solid-phase synthesis, such as room temperature, under cooling, or under warming conditions. The deprotection step (g) of Method 1 can be carried out for a period of time, such as from about 5 minutes to about 200 minutes, or about 10 minutes to about 100 minutes, or about 40 to about 60 minutes to about 45 minutes, or about 60 minutes, or about 90 minutes. Following the deprotection step (g) of Method 1, the resin-based compound of the formula E' produced in step (g) of Method 1 can be washed with reagents commonly known in the art, such as DMF, IPA, $CH_2Cl_2$, and the like.

In step (h) of Method 1, the polar aprotic solvent can be any polar aprotic solvent commonly known in the art. Suitable polar aprotic solvents include, but are not limited to, N-methyl-2-pyrrolidone (NMP), dichloromethane (DCM), a dichloromethane/dimethylformamide mixture, acetonitrile (ACN), an acetonitrile/dimethylformamide mixture, and dimethylsulfoxide (DMSO). In some embodiments, the polar aprotic solvent is DMF. Suitable bases include, but are not limited to, triethylamine (TEA), 4-methylmorpholine (NMM), imidazole, pyridine, and collidine. In some embodiments, the base in step (h) of Method 1 is N,N-Diisopropylethylamine ($^iPr_2NEt$). The coupling agent can be any coupling agent commonly known in the art for resin-based synthesis. Suitable coupling agents include, but are not limited to, HATU, TBTU, HBTU, CDMT, HDMC, COMU, TATU, TOTT, T3P, DMTMM. In some embodiments, the coupling agent in step (h) of Method 1 is (PyBOP). It will be appreciated that step (h) of Method 1 can be conducted at any temperature commonly used in solid-phase synthesis, such as room temperature, under cooling, or under warming conditions. The coupling step (h) of Method 1 can be carried out for a period of time, such as from about 5 minutes to about 200 minutes, or about 10 minutes to about 100 minutes, or about 40 to about 60 minutes to about 15 minutes, or about 30 minutes, or about 90 minutes. Following the coupling step (h) of Method 1, the resin-based compound of the formula F produced in step (h) of Method 1 can be washed with reagents commonly known in the art, such as DMF, IPA, $CH_2Cl_2$, and the like.

In step (i) of Method 1, the third deprotecting agent can be the same or different from the cleavage reagent. In some embodiments, the third deprotecting agent can be, for example, HF or TfOH, such as when IV is cyclohexyl and the cleavage reagent can be TFA. In some embodiments, such as when IV is tert-butyl, the third deprotecting agent and the cleavage reagent can both be TFA. In some embodiments, the third deprotecting agent and the cleavage reagent can both be a mixture of TFA, water, and triisopropylsilane. Other suitable deprotecting agents include, but are not limited to, a trifluoroacetic acid (TFA)/dichloromethane (DCM) mixture, triethylsaline (TES), indole, a phenol/anisole mixture, and thioanisole. Step (i) of Method 1 can be carried out in a solvent, such as an organic solvent. The organic solvent can be any solvent commonly known in the art for resin-based synthesis. Suitable organic solvents include, but are not limited to, $CH_2Cl_2$, THF, diethyl ether, MeOH, EtOH, acetone, acetonitrile, and the like. In some embodiments, the solvent is $CH_2Cl_2$.

In step (a) of Method 2, PG on the resin-based compound of the formula 1 can be a protecting group, and in particular can be an amine protecting group, such as 9-fluorenylmethyl-carbonyl (Fmoc), benzyl carbamate (Cbz), t-butyloxy carbonyl (Boc), acetamide, trifluoroacetamide, p-toluenesulfonamide, triphemylmethyl, monomethoxytrityl (MMt), or 4-methyltrityl (Mtt). Also in step (a) of Method 2, $PG^1$ can be a protecting group, in particular an amine protecting group, such as 9-fluorenylmethyl-carbonyl (Fmoc), benzyl carbamate (Cbz), t-butyloxy carbonyl (Boc), acetamide, trifluoroacetamide, p-toluenesulfonamide, triphemylmethyl, monomethoxytrityl (MMt), or 4-methyltrityl (Mtt) that is orthogonal to PG. In some embodiments, PG can be 9-fluorenylmethyl-carbonyl (Fmoc) or t-butylcarbonyl (Boc), and $PG^1$ can be an orthogonal protecting group, such as 4-methyltrityl (Mtt) or monomethoxytrityl (MMt).

The first deprotecting agent in step (a) of Method 2 can be a reagent or mixture of reagents capable of removing an amine protecting group, such as 9-fluorenylmethyl-carbonyl (Fmoc), benzyl carbamate (Cbz), t-butyloxy carbonyl (Boc), acetamide, trifluoroacetamide, p-toluenesulfonamide, triphemylmethyl, monomethoxytrityl (MMt), or 4-methyltrityl (Mtt). In some embodiments, the first deprotecting agent of step (a) of Method 2 comprises a reagent or mixture of reagents capable of removing a 9-fluorenylmethyl-carbonyl. In some embodiments, the first deprotecting agent of step (a) of Method 2 can be an acidic or basic deprotecting agent, depending on the identity of PG and/or $PG^1$. In particular, the first deprotecting agent can be a basic deprotecting agent, such as piperidine. morpholine, 1,8-diazabicyclo[5.4.0]undec-7-ene (DBU), diethylamine (DEA), dicyclohexamine, 4-methylpiperidine (4MP), tris(2-aminoethyl)amine, pyridine, or a collidine. In particular, the first deprotecting agent can be an acidic deprotecting agent, such as TFA, HCl, or $H_3PO_4$. Suitable deprotecting agents and conditions for step (a) of Method 2 can be found in for example, Wuts, P. G. M., Greene, T. W., Greene, T. W., & John Wiley & Sons. (2006). *Greene's protective groups in organic synthesis*. Hoboken, N.J: Wiley-Interscience.

In some embodiments of step (a) of Method 2, the base used to remove the Fmoc group can be an amine base, such as piperidine. In some embodiments, the polar-aprotic solvent of step (a) of Method 2 can be any polar-aprotic solvent known in the art. Suitable polar-aprotic solvents include, but are not limited to, dimethylformamide (DMF), N-methyl-2-pyrrolidone (NMP), dichloromethane (DCM), a dichloromethane/dimethylformamide mixture, acetonitrile (ACN), an acetonitrile/dimethylformamide mixture, and dimethylsulfoxide (DMSO), and the like. It will be appreciated that step (a) can be conducted at any temperature commonly used in solid-phase synthesis, such as room temperature, under cooling, or under warming conditions. The deprotection step (a) of Method 2 can be carried out for a period of time, such as from about 5 minutes to about 200 minutes, or about 10 minutes to about 100 minutes, or about 40 to about 60 minutes to about 15 minutes, or about 30 minutes, or about 90 minutes. Following the deprotection step (a) of Method 2, the resin-based compound of the formula B produced in step (a) of Method 2 can be washed with reagents commonly known in the art, such as DMF, IPA, $CH_2Cl_2$, and the like.

In step (b) of Method 2, $PG^2$ and/or $PG^3$ on the compound of the formula 3 can each independently be carboxyl protecting groups, and LG is a leaving group, such as an active ester. Suitable active esters known in the art include, but are not limited to imidazolyl, 4-nitrophenoxy, phenoxy, 2,4,5-trichlorophenyl, NHS ester, benzotriazyl, and the like. In some embodiments, the LG in compound 3 is s selected from imidazolyl, 4-nitrophenoxy, and phenoxy. In some embodiments, the LG in compound 3 is a 4-nitrophenyl ester. It will be appreciated that the choice of $PG^2$ and/or $PG^3$ will be orthogonal to the choice for PG and $PG^1$. In some embodiments, $PG^2$ and/or $PG^3$ can be t-butyl. In step (b) of Method 2, the base can be any base commonly known in the art for urea formation reactions. Suitable bases include, but are not limited to, N,N-diisopropylethylamine ($^iPr_2NEt$), triethylamine (TEA), 4-methylmorpholine (NMM), imidazole, pyridine, and a collidine.

Step (b) of Method 2 can be carried out in a solvent, such as an organic solvent. The organic solvent can be any solvent commonly known in the art for resin-based synthesis. Suitable organic solvents include, but are not limited to, $CH_2Cl_2$, THF, diethyl ether, MeOH, EtOH, acetone, acetonitrile, and the like. In some embodiments, the solvent is $CH_2Cl_2$. It will be appreciated that step (b) of Method 2 can be conducted at any temperature commonly used in solid-phase synthesis, such as room temperature, under cooling, or under warming conditions. The deprotection step (b) of Method 2 can be carried out for a period of time, such as from about 5 minutes to about 200 minutes, or about 10 minutes to about 100 minutes, or about 40 to about 60 minutes to about 15 minutes, or about 30 minutes, or about 90 minutes. Following the step (b) of Method 2, the resin-based compound of the formula 4 produced in step (b) can be washed with reagents commonly known in the art, such as DMF, IPA, $CH_2Cl_2$, and the like.

In step (c) of Method 2, the second deprotecting agent can be a reagent or mixture of reagents capable of removing a protecting group selected from the group consisting of 9-fluorenylmethyl-carbonyl (Fmoc), benzyl carbamate (Cbz), t-butyloxy carbonyl (Boc), acetamide, trifluoroacetamide, p-toluenesulfonamide, triphemylmethyl, monomethoxytrityl (MMt), and 4-methyltrityl (Mtt). In some embodiments, the second deprotecting agent can be a reagent or mixture of reagents capable of removing a 4-methyltrityl (Mtt). In some embodiments, the second deprotecting agent can be an acidic deprotecting agent, basic deprotecting agent, or other deprotecting agent depending on the identity of $PG^1$, $PG^2$, and/or $PG^3$. In some embodiments, the second deprotecting agent can be an acidic deprotecting agent. Suitable acidic deprotecting agents include, but are not limited to, TFA, HCl, or $H_3PO_4$. In some embodiments, the second deprotecting agent in step (c) of Method 2 is selected from the group consisting of trifluoroacetic acid (TFA), acetic acid, trifluoroethanol, hexafluoroisopropanol, and combinations thereof. In some embodiments, the second deprotecting is TFA, such as when $PG^2$ is Mtt. In some embodiments, the second deprotecting in step (c) of Method 2 is a mixture of acetic acid and trifluoroethanol, such as when $PG^2$ is Mtt. Suitable deprotecting agents and conditions for step (c) of Method 2 can be found in for example, Wuts, P. G. M., Greene, T. W., Greene, T. W., & John Wiley & Sons. (2006). *Greene's protective groups in organic synthesis*. Hoboken, N.J: Wiley-Interscience. Step (c) of Method 2 can be carried out in a solvent, such as an organic solvent. The organic solvent can be any solvent commonly known in the art for resin-based synthesis. Suitable organic solvents include, but are not limited to, $CH_2Cl_2$, THF, diethyl ether, MeOH, EtOH, acetone, acetonitrile, and the like. In some embodiments, the solvent is $CH_2Cl_2$. Following the deprotection step (c) of Method 2, the resin-based compound of the formula 5 produced in step (c) of Method 2 can be washed with reagents commonly known in the art, such as DMF, IPA, $CH_2Cl_2$, and the like.

In step (d) of Method 2, $PG^4$ can be a protecting group, in particular an amine protecting group, 9-fluorenylmethyl-carbonyl (Fmoc), benzyl carbamate (Cbz), t-butyloxy carbonyl (Boc), acetamide, trifluoroacetamide, p-toluenesulfonamide, triphemylmethyl, monomethoxytrityl (MMt), and 4-methyltrityl (Mtt). In some embodiments, $PG^4$ can be 9-Fluorenylmethyl-carbonyl (Fmoc) or t-butylcarbonyl (Boc). See step (a) of Method 2 above regarding the choice of $PG^4$. In step (d) of Method 2, the solvent can be a polar aprotic solvent. In some embodiments, the polar aprotic solvent can be any polar aprotic solvent commonly known in the art. Suitable polar aprotic solvents include, but are not limited to, dimethylformamide (DMF), N-methyl-2-pyrrolidone (NMP), dichloromethane (DCM), a dichloromethane/dimethylformamide mixture, acetonitrile (ACN), an acetonitrile/dimethylformamide mixture, and dimethylsulfoxide (DMSO). In some embodiments, the polar aprotic solvent is DMF. Suitable bases for use in step (d) of Method 2 include, but are not limited to, N,N-diisopropylethylamine ($^iPr_2NEt$), triethylamine (TEA), 4-methylmorpholine (NMM), imidazole, pyridine, and collidine. In some embodiments, the base in step (d) is N,N-diisopropylethylamine ($^iPr_2NEt$).

The coupling agent can be any coupling agent commonly known in the art for resin-based synthesis. Suitable coupling agents for use in step (d) of Method 2 include, but are not limited to, benzotriazol-1-yloxy-tris(dimethylamino)-phosphonium hexafluorophosphate (BOP), benzotriazol-1-yl-oxytripyrrolidinophosphonium hexafluorophosphate (PyBOP), 7-aza-benzotriazol-1-yloxy-tripyrrolidino-phosphonium hexafluorophosphate (PyAOP), ethyl cyano (hydroxyimino)acetato-$O_2$)-tri-(1-pyrrolidinyl)-phosphonium hexafluorophosphate (PyOxim), bromo-tripyrrolidino-phosphonium hexafluorophosphate (PyBrOP), 3-(diethoxy-phosphoryloxy)-1,2,3-benzo[d]triazin-4(3H)-one (DEPBT), 1-[bis(dimethylamino)methylene]-1H-1,2,3-triazolo[4,5-b]pyridinium 3-oxid hexafluorophosphate (HATU), 2-(1H-benzotriazole-1-yl)-1,1,3,3-tetramethyluronium tetrafluoroborate (TBTU), 2-(1H-benzotriazol-1-yl)-1,1,3,3-tetramethyluronium hexafluorophosphate (HBTU), 2-(6-chloro-1H-benzotriazol-1-yl)-N,N,N',N'-tetramethylaminium hexafluorophosphate (HCTU), 2-chloro-4,6-dimethoxy-1,3,5-triazine (CDMT), N-[5-chloro-3-oxido-1H-benzotriazol-1-yl)-4-morpholinylmethylene]-N-methylmethanaminium hexafluorophosphate (HDMC), 1-cyano-2-ethoxy-2-oxoethylidenaminooxy)dimethylamino-morpholino-carbenium hexafluorophosphate (COMU), dimethylamino(triazolo[4,5-b]pyridin-3-yloxy)methylidene]-dimethylazanium tetrafluoroborate (TATU), N,N,N',N'-tetramethyl-S-(1-oxido-2-pyridyl)thiouronium tetrafluoroborate (TOTT), tetramethylfluoroformamidinium hexafluorophosphate (TFFH), N-ethoxycarbonyl-2-ethoxy-1,2-dihydroquinoline (EEDQ), 1-propanephosphonic anhydride (T3P), 4-(4,6-dimethoxy-1,3,5-triazin-2-yl)-4-methyl-morpholinium chloride (DMTMM), dicyclohexylcarbodiimide (DCC), diisopropylcarbodiimide (DIC), (N-(3-dimethylaminopropyl)-N'-ethylcarbodiimide (EDAC), or 1,1'-carbonyldimidizole (CDI). In some embodiments, the coupling agent of step (d) of Method 2 can be HATU, TBTU, HBTU, CDMT, HDMC, COMU, TATU, TOTT, T3P, or DMTMM. In some embodiments, the coupling agent in step (d) of Method 2 is (PyBOP).

It will be appreciated that step (d) of Method 2 can be conducted in the presence of an additive. Suitable additive include, but are not limited to, 1-hydroxybenzotriazole (HOBt), 1-hydroxybenzotriazole-6-sulfonamidomethyl resin HCl (HOBt-6-sulfonamidomethyl resin HCl), hydroxy-3,4-dihydro-4-oxo-1,2,3-benzotriazine (HOOBt), N-hydroxysuccinimide (NHS), 1-hydroxy-7-aza-1H-benzotriazole (HOAt), ethyl 2-cyano-2-(hydroximino)acetate, or 4-(N,N-dimethylamino)pyridine (DMAP). It will be appreciated that step (d) of Method 2 can be conducted at any temperature commonly used in solid-phase synthesis, such as room temperature, under cooling, or under warming conditions. The coupling step (d) of Method 2 can be carried out for a period of time, such as from about 5 minutes to about 200 minutes, or about 10 minutes to about 100 minutes, or about 40 to about 60 minutes to about 15 minutes, or about 30 minutes, or about 90 minutes. Following the coupling step (d) of Method 2, the resin-based compound of the formula 7 produced in step (d) of Method 2 can be washed with reagents commonly known in the art, such as DMF, IPA, $CH_2Cl_2$, and the like.

In step (e) of Method 2, $PG^4$ on the resin-based compound of the formula 7 can be an amine protecting group, such as 9-fluorenylmethyl-carbonyl (Fmoc), benzyl carbamate (Cbz), t-butyloxy carbonyl (Boc), acetamide, trifluoroacetamide, p-toluenesulfonamide, triphemylmethyl, monomethoxytrityl (MMt), and 4-methyltrityl (Mtt). The third deprotecting agent in step (e) of Method 2 can be a reagent or mixture of reagents capable of removing a protecting group selected from the group consisting of 9-fluorenylmethyl-carbonyl (Fmoc), benzyl carbamate (Cbz), t-butyloxy carbonyl (Boc), acetamide, trifluoroacetamide, p-toluenesulfonamide, triphemylmethyl, monomethoxytrityl (MMt), and 4-methyltrityl (Mtt). In some embodiments, $PG^4$ can be 9-Fluorenylmethyl-carbonyl (Fmoc). In some embodiments, the third deprotecting agent can be the third deprotecting agent of step (e) of Method 2 comprises a reagent or mixture of reagents capable of removing a 9-fluorenylmethyl-carbonyl. In some embodiments, the third deprotecting agent can be an acidic or basic protecting agent. In some embodiments, the third deprotecting agent can be a basic deprotecting agent, such as piperidine. morpholine, 1,8-diazabicyclo[5.4.0]undec-7-ene (DBU), diethylamine (DEA), dicyclohexamine, 4-methylpiperidine (4MP), Tris(2-aminoethyl)amine, pyridine, or a collidine. In some embodiments, the third deprotecting agent can be an acidic deprotecting agent, such as TFA, HCl, or $H_3PO_4$. Suitable deprotecting agents and conditions for step (e) of Method 2 can be found in for example, Wuts, P. G. M., Greene, T. W., Greene, T. W., & John Wiley & Sons. (2006). *Greene's protective groups in organic synthesis*. Hoboken, N.J: Wiley-Interscience.

In some embodiments, step (e) of Method 2 can be carried out in a solvent, such as a polar-aprotic solvent. The polar-aprotic solvent of step (e) of Method 2 can be any polar-aprotic solvent known in the art. Suitable polar-aprotic solvents include, but are not limited to, dimethylformamide (DMF), N-methyl-2-pyrrolidone (NMP), dichloromethane (DCM), a dichloromethane/dimethylformamide mixture, acetonitrile (ACN), an acetonitrile/dimethylformamide mixture, and dimethylsulfoxide (DMSO), and the like. It will be appreciated that step (e) of Method 2 can be conducted at any temperature commonly used in solid-phase synthesis, such as room temperature, under cooling, or under warming conditions. The deprotection step (e) of Method 2 can be carried out for a period of time, such as from about 5 minutes to about 200 minutes, or about 10 minutes to about 100 minutes, or about 40 to about 60 minutes to about 45 minutes, or about 60 minutes, or about 90 minutes. Following the deprotection step (e) of Method 2, the resin-based compound of the formula 9 produced in step (e) of Method 2 can be washed with reagents commonly known in the art, such as DMF, IPA, $CH_2Cl_2$, and the like.

In step (f) of Method 2, $PG^5$ can be a carboxyl protecting group. In some embodiments, $PG^5$ can be t-butyl. See step (b) of Method 2 above regarding the choice of $PG^5$. In step (f) of Method 2, the solvent can be a polar aprotic solvent. In some embodiments, the polar aprotic solvent can be any polar aprotic solvent commonly known in the art. Suitable polar aprotic solvents include, but are not limited to, dimethylformamide (DMF), N-methyl-2-pyrrolidone (NMP), dichloromethane (DCM), a dichloromethane/dimethylformamide mixture, acetonitrile (ACN), an acetonitrile/dimethylformamide mixture, and dimethylsulfoxide (DMSO). In some embodiments, the polar aprotic solvent is DMF. Suitable bases for use in step (f) include, but are not limited to, N,N-diisopropylethylamine ($^i$Pr$_2$NEt), triethylamine (TEA), 4-methylmorpholine (NMM), imidazole, pyridine, and collidine. In some embodiments, the base in step (f) of Method 2 is N,N-Diisopropylethylamine ($^i$Pr$_2$NEt). The coupling agent of step (f) of Method 2 can be any coupling agent commonly known in the art for resin-based synthesis. Suitable coupling agents for use in step (f) of Method 2 include, but are not limited to, benzotriazol-1-yloxy-tris(dimethylamino)-phosphonium hexafluorophosphate (BOP), benzotriazol-1-yl-oxytripyrrolidinophosphonium hexafluorophosphate (PyBOP), 7-aza-benzotriazol-1-yloxy-tripyrrolidinophosphonium hexafluorophosphate (PyAOP), ethyl cyano(hydroxyimino)acetato-$O_2$)-tri-(1-pyrrolidinyl)-phosphonium hexafluorophosphate (PyOxim), bromotripyrrolidino-phosphonium hexafluorophosphate (PyBrOP), 3-(diethoxy-phosphoryloxy)-1,2,3-benzo[d]triazin-4(3H)-one (DEPBT), 1-[bis(dimethylamino)methylene]-1H-1,2,3-triazolo[4,5-b]pyridinium 3-oxid hexafluorophosphate (HATU), 2-(1H-benzotriazole-1-yl)-1,1,3,3-tetramethyluronium tetrafluoroborate (TBTU), 2-(1H-benzotriazol-1-yl)-1,1,3,3-tetramethyluronium hexafluorophosphate (HBTU), 2-(6-chloro-1H-benzotriazol-1-yl)-N,N,N',N'-tetramethylaminium hexafluorophosphate (HCTU), 2-chloro-4,6-dimethoxy-1,3,5-triazine (CDMT), N-[5-chloro-3-oxido-1H-benzotriazol-1-yl)-4-morpholinylmethylene]-N-methylmethanaminium hexafluorophosphate (HDMC), 1-cyano-2-ethoxy-2-oxoethylidenaminooxy)dimethylamino-morpholino-carbenium hexafluorophosphate (COMU), dimethylamino(triazolo[4,5-b]pyridin-3-yloxy)methylidene]-dimethylazanium tetrafluoroborate (TATU), N,N,N',N'-tetramethyl-S-(1-oxido-2-pyridyl)thiouronium tetrafluoroborate (TOTT), tetramethylfluoroformamidinium hexafluorophosphate (TFFH), N-ethoxycarbonyl-2-ethoxy-1,2-dihydroquinoline (EEDQ), 1-propanephosphonic anhydride (T3P), 4-(4,6-dimethoxy-1,3,5-triazin-2-yl)-4-methyl-morpholinium chloride (DMTMM), dicyclohexylcarbodiimide (DCC), diisopropylcarbodiimide (DIC), (N-(3-dimethylaminopropyl)-N'-ethylcarbodiimide (EDAC), and 1,1'-carbonyldimidizole (CDI). In some embodiments, the coupling agent of step (f) of Method 2 can be HATU, TBTU, HBTU, CDMT, HDMC, COMU, TATU, TOTT, T3P, or DMTMM. In some embodiments, the coupling agent in step (f) of Method 2 is (PyBOP).

It will be appreciated that step (f) of Method 2 can be conducted in the presence of an additive. Suitable additive include, but are not limited to, 1-hydroxybenzotriazole (HOBt), 1-hydroxybenzotriazole-6-sulfonamidomethyl resin HCl (HOBt-6-sulfonamidomethyl resin HCl), hydroxy-3,4-dihydro-4-oxo-1,2,3-benzotriazine (HOOBt), N-hydroxysuccinimide (NHS), 1-hydroxy-7-aza-1H-benzotriazole (HOAt), ethyl 2-cyano-2-(hydroximino)acetate, or 4-(N,N-dimethylamino)pyridine (DMAP). It will be appreciated that step (f) of Method 2 can be conducted at any temperature commonly used in solid-phase synthesis, such as room temperature, under cooling, or under warming conditions. The coupling step (f) of Method 2 can be carried out for a period of time, such as from about 5 minutes to about 200 minutes, or about 10 minutes to about 100 minutes, or about 40 to about 60 minutes to about 15 minutes, or about 30 minutes, or about 90 minutes. Following the coupling step (f) of Method 2, the resin-based compound of the formula 10 produced in step (f) of Method 2 can be washed with reagents commonly known in the art, such as DMF, IPA, $CH_2Cl_2$, and the like.

In step (g) of Method 2, $PG^2$, $PG^3$, and/or $PG^5$ on the resin-based compound of the formula 10 can each be a protecting group, such as a carboxyl protecting group. In some embodiments, the third deprotecting agent of step (g) of Method 2 can be a reagent or mixture of reagents capable of removing a protecting group selected from the group consisting of t-butyl, benzyl, 2-chlorotrityl (2-Cl-Trt), 2,4-dimethoxybenzyl (Dmb), allyl, 1,1-dimethylallyl (Dma), and p-nitrobenzyl (pNB). In some embodiments, each of $PG^2$, $PG^3$, and $PG^5$ is a t-butyl group. The third deprotecting agent in step (g) of Method 2 can be an acidic or basic protecting agent, depending on the identity of $PG^2$, $PG^3$, and/or $PG^5$. In some embodiments, the third deprotecting agent can be an acidic deprotecting agent, such as TFA, HCl, or $H_3PO_4$. In some embodiments, the third deprotecting agent can be selected from the group consisting of trifluoroacetic acid (TFA), hydrofluoric acid (HF), triflic acid (TfOH), a trifluoroacetic acid (TFA)/water/triisopropylsilane mixture, a trifluoroacetic acid (TFA)/dichloromethane (DCM) mixture, triethylsaline (TES), indole, a phenol/anisole mixture, and thioanisole. Suitable deprotecting agents and conditions for step (g) can be found in for example, Wuts, P. G. M., Greene, T. W., Greene, T. W., & John Wiley & Sons. (2006). *Greene's protective groups in organic synthesis*. Hoboken, N.J: Wiley-Interscience. In some embodiments, the third deprotecting agent of step (g) of Method 2 is a trifluoroacetic acid (TFA)/water/triisopropylsilane mixture. In some embodiments, the cleavage reagent of step (g) of Method 2 is a trifluoroacetic acid (TFA)/water/triisopropylsilane mixture.

It will be appreciated that the organic solvent of step (g) of Method 2 can be any organic solvent known in the art. Suitable organic solvents include, but are not limited to, $CH_2Cl_2$, THF, diethyl ether, MeOH, EtOH, acetone, acetonitrile, and the like. It will be appreciated that step (g) of Method 2 can be conducted at any temperature commonly used in solid-phase synthesis, such as room temperature, under cooling, or under warming conditions. The deprotection step (g) of Method 2 can be carried out for a period of time, such as from about 5 minutes to about 200 minutes, or about 10 minutes to about 100 minutes, or about 40 to about 60 minutes to about 45 minutes, or about 60 minutes, or about 90 minutes.

Method 2, Specific Embodiment

PSMA 617 (I) can be prepared using solid phase peptide synthesis technology as shown in the following scheme.

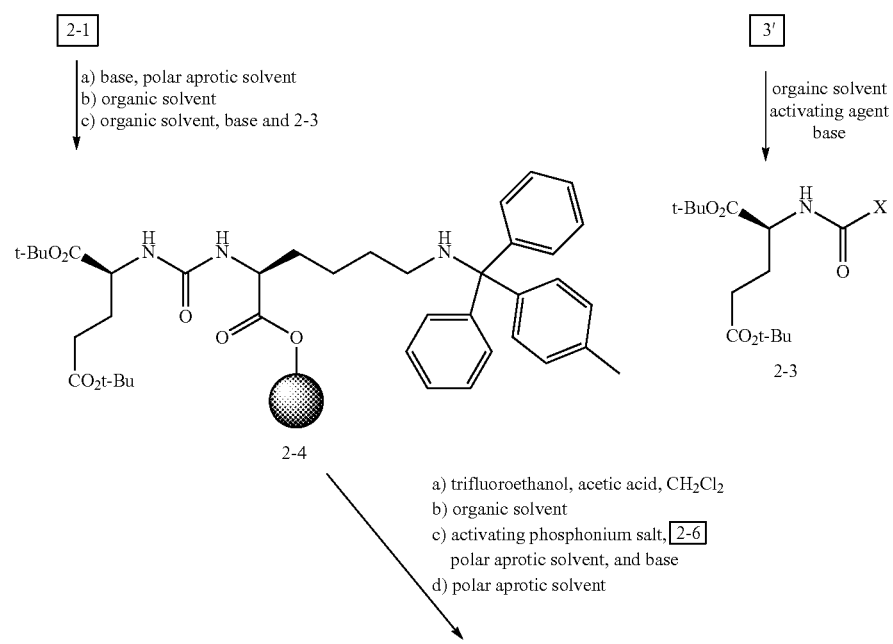

-continued
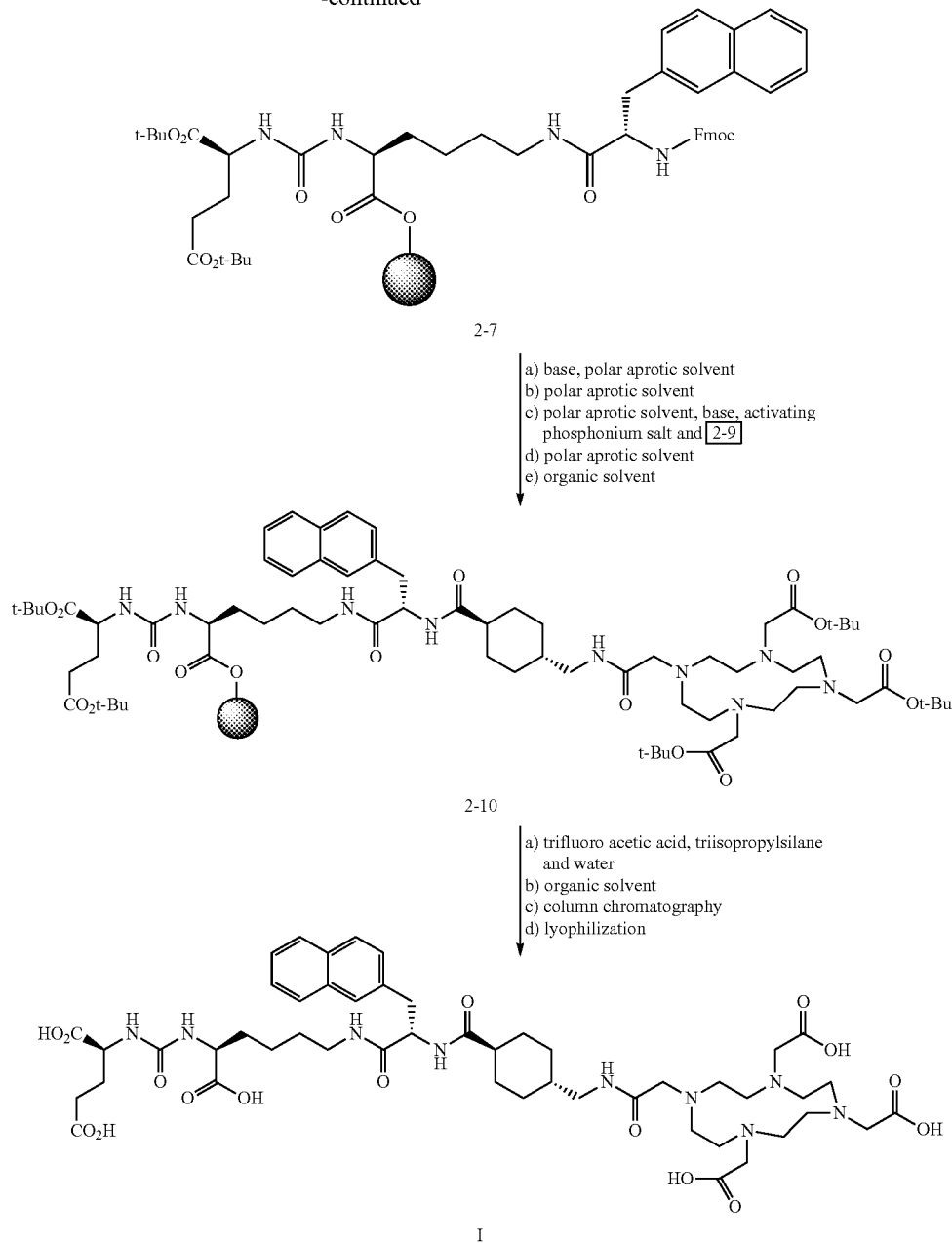
The following reagents and intermediates can be used.
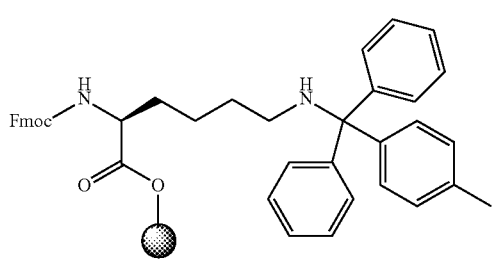
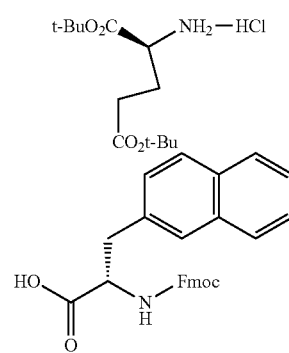

-continued 2-9

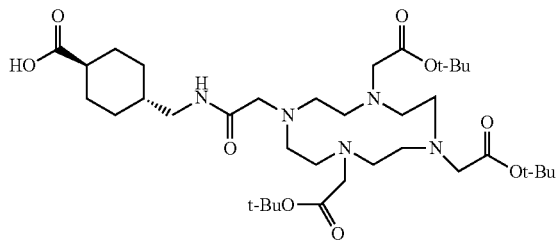

Three chemical transformations are performed. The Fmoc protecting group is removed from Fmoc-Lys(Mtt)-Wang Resin (2-1) by mixing the resin with a base in a polar aprotic solvent, and the resin is then washed with solvent. In an organic solvent, L-glutamic acid di-tert-butyl ester hydrochloride (3') is converted into an activated urea or carbamate (2-3) using, for example, a base and carbonyldiimidazole, p-nitrophenyl chloroformate, phenyl chloroformate, and the like. The deprotected compound 2-2 is mixed with the solution of 2-3. When the transformation to 2-4 is complete, the resin is washed with an organic solvent.

The methyl trityl protecting group is removed from 2-4 by mixing the resin with a mixture 2,2,2-trifluoroethanol, acetic acid, and dichloromethane. Upon removal of the trityl group, the resin is washed with a polar aprotic solvent. The deprotected compound 2-5 is mixed with (2S)-2-(9-fluorenylmethyloxycarbonylamino)-3-naphthalen-2-yl-propionic acid (2-6), a base, and an activating agent, such as but not limited to a phosphonium salt activating agent in a polar aprotic solvent. After conversion into 2-7, the resin is washed with a polar aprotic solvent.

The Fmoc protecting group is removed from 2-7 by mixing the resin with a base in polar aprotic solvent, and washing the resin with solvent. The deprotected compound 2-8 is mixed with 2-9, a base, and an activating agent, such as but not limited to a phosphonium salt activating agent in a polar aprotic solvent. After conversion into 2-10, the resin is washed with a polar aprotic solvent and organic solvent.

The tert-butyl groups are removed and the resin is cleaved and by mixing with a mixture of trifluoroacetic acid, triisopropylsilane, and water. The liquors are separated from the cleaved resin, added to an organic solvent, and filtered. The crude PSMA 617 is purified by column chromatography, and the material is de-salted using a C18 column and an acetonitrile/water gradient eluent. The acetonitrile is evaporated or distilled from the aqueous solution under vacuum, and PSMA 617 (I) is isolated from the solution by lyophilization.

EXAMPLES

The examples and preparations provided below further illustrate and exemplify particular aspects of embodiments of the disclosure. It is to be understood that the scope of the present disclosure is not limited in any way by the scope of the following examples.

Abbreviations

The examples described herein use materials, including but not limited to, those described by the following abbreviations known to those skilled in the art:

| | |
|---|---|
| PG | Protecting group |
| LG | Leaving Group |
| IPA | Isopropyl alcohol |
| DBU | 1,8-Diazabicyclo[5.4.0]undec-7-ene |
| DEA | diethylamine |
| 4MP | 4-methylpiperidine |
| DMF | dimethylformamide |
| NMP | N-methyl-2-pyrrolidone |
| DCM | dichloromethane |
| ACN | acetonitrile |
| DMSO | dimethylsulfoxide |
| $^i$Pr$_2$NEt | N,N-Diisopropylethylamine |
| TEA | triethylamine |
| NMM | 4-methylmorpholine |
| TFA | trifluoroacetic acid |
| PyBOP | benzotriazol-1-yl-oxytripyrrolidinophosphonium hexafluorophosphate |
| HATU | 1-[Bis(dimethylamino)methylene]-1H-1,2,3-triazolo[4,5-b]pyridinium 3-oxid hexafluorophosphate |
| TBTU | 2-(1H-Benzotriazole-1-yl)-1,1,3,3-tetramethyluronium tetrafluoroborate |
| HBTU | 2-(1H-benzotriazol-1-yl)-1,1,3,3-tetramethyluronium hexafluorophosphate |
| HDMC | N-[(5-Chloro-3-oxido-1H-benzotriazol-1-yl)-4-morpholinylmethylene]-N-methylmethanaminium hexafluorophosphate |
| COMU | 1-Cyano-2-ethoxy-2-oxoethylidenaminooxy)-dimethylamino-morpholino-carbenium hexafluorophosphate |
| TATU | dimethylamino(triazolo[4,5-b]pyridin-3-yloxy)methylidene]-dimethylazanium; tetrafluoroborate |
| EEDQ | N-Ethoxycarbonyl-2-ethoxy-1,2-dihydroquinoline |
| T3P | 1-Propanephosphonic anhydride |
| DMTMM | 4-(4,6-dimethoxy-1,3,5-triazin-2-yl)-4-methyl-morpholinium chloride |
| TES | triethylsaline |
| Fmoc | 9-Fluorenylmethyl-carbonyl |
| Boc | t-butylcarbonyl |
| MMt | monomethoxytrityl |
| Mtt | 4-methyltrityl |
| g | grams |
| eq or equiv | equivalents |
| mmol | millimoles |
| mol | moles |
| mL | milliliters |
| L | liters |
| mm or mins | minute or minutes |
| hrs, hr or h | hour or hours |
| M | molar |
| SPPS | Solid phase peptide synthesis |
| TfOH | Triflic acid |
| HF | Hydrofluoric acid |

Example 1a: Preparation of AB2

Compound AB2 was prepared according to the following synthetic scheme:

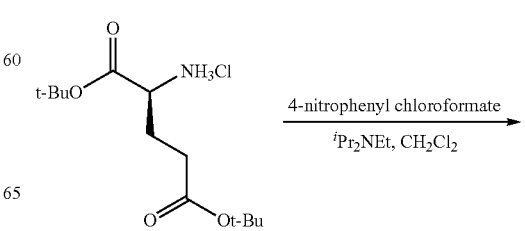

-continued

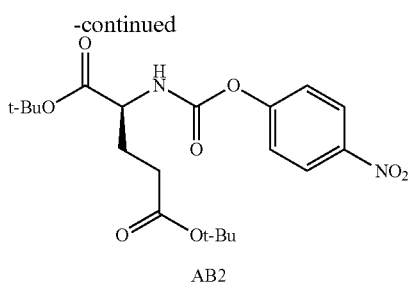

AB2

403 mg of 4-nitrophenyl chloroformate (2.0 mmol, 0.95 equiv) was added to a stirred solution of 621 mg of L-Glutamic acid di-tert-butyl ester hydrochloride (2.1 mmol, 1.0 equiv) in 21 mL of dichloromethane (CH$_2$Cl$_2$) in a round bottom flask under argon. The solution was cooled to 0° C., before a solution of 0.730 mL of diisopropylethylamine ($^i$Pr$_2$NEt) (4.2 mmol, 2.0 equiv) in 5 mL of CH$_2$Cl$_2$ was added dropwise with a pressure-equalizing addition funnel. After the complete addition of $^i$Pr$_2$NEt, the reaction mixture stirred for 30 min, warmed to room temperature, and stirred for an additional 30 min. The reaction mixture was then evaporated to yield the crude product as an oily residue. The residue was used without further purification and held under high vacuum until desired.

Example 1b: Alternative Preparation of AB2

A reaction vessel was charged with 0.891 g of 4-nitrophenyl chloroformate (4.42 mmol) and 15 mL of dichloromethane (CH$_2$Cl$_2$), and was purged with argon. The reaction vessel was fitted with a temperature probe, and the solution was cooled to ≤−10° C. using an IPA/ice bath. In a separate reaction flask was dissolved 1.44 g of L-glutamic acid di-tert-butyl ester hydrochloride (4.87 mmol) in 15 mL of dichloromethane (CH$_2$Cl$_2$), followed by the addition of 1.54 mL of diisopropylethylamine ($^i$Pr$_2$NEt) (8.84 mmol). The L-glutamic acid di-tert-butyl ester hydrochloride solution dropwise to the cooled 4-nitrophenyl chloroformate solution, while maintaining a temperature of −11° C. to −5° C. The ice bath was removed after the addition was completed, and the reaction mixture was stirred at room temperature for 4 hours, at which time the reaction was shown to be complete using UPLC/MS. The reaction mixture was used without further purification.

Example 2: Preparation of PSMA-617

The compound of formula I was prepared by SPPS starting from Fmoc-Lys(N-4-methoxytrityl)-2-chlorotrityl-Resin. The compound of the formula I was prepared according to the following synthetic scheme:

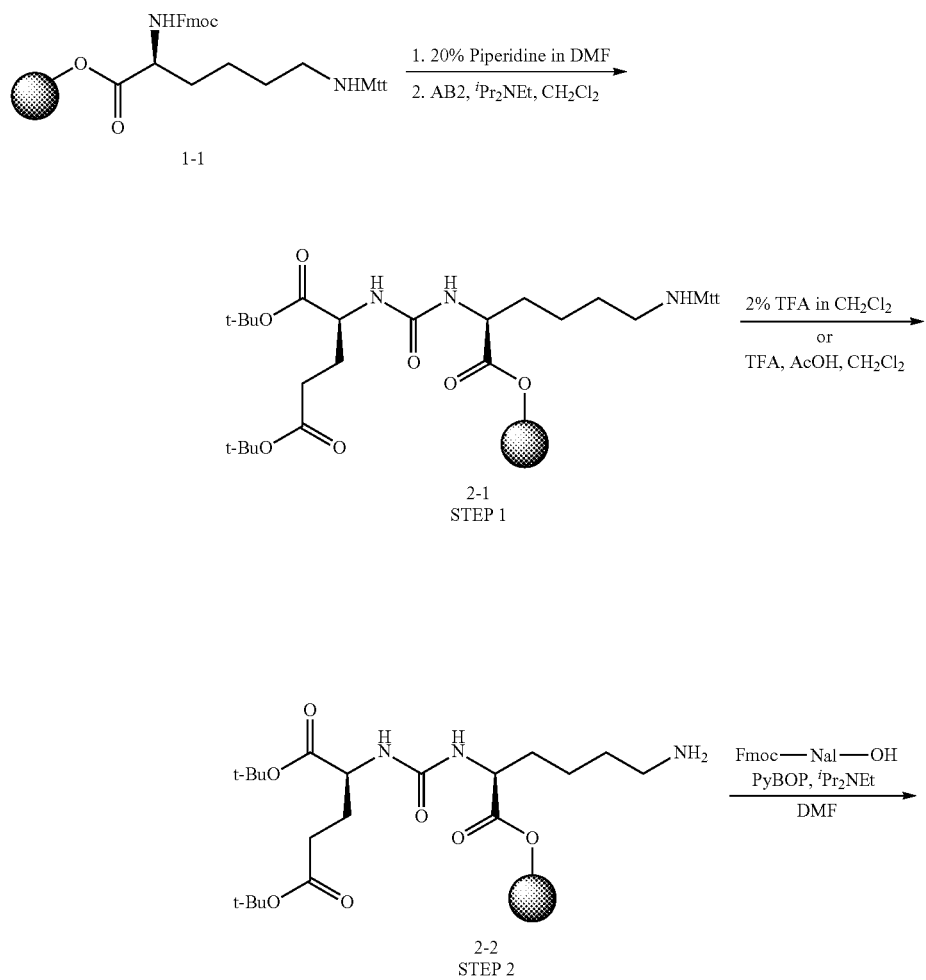

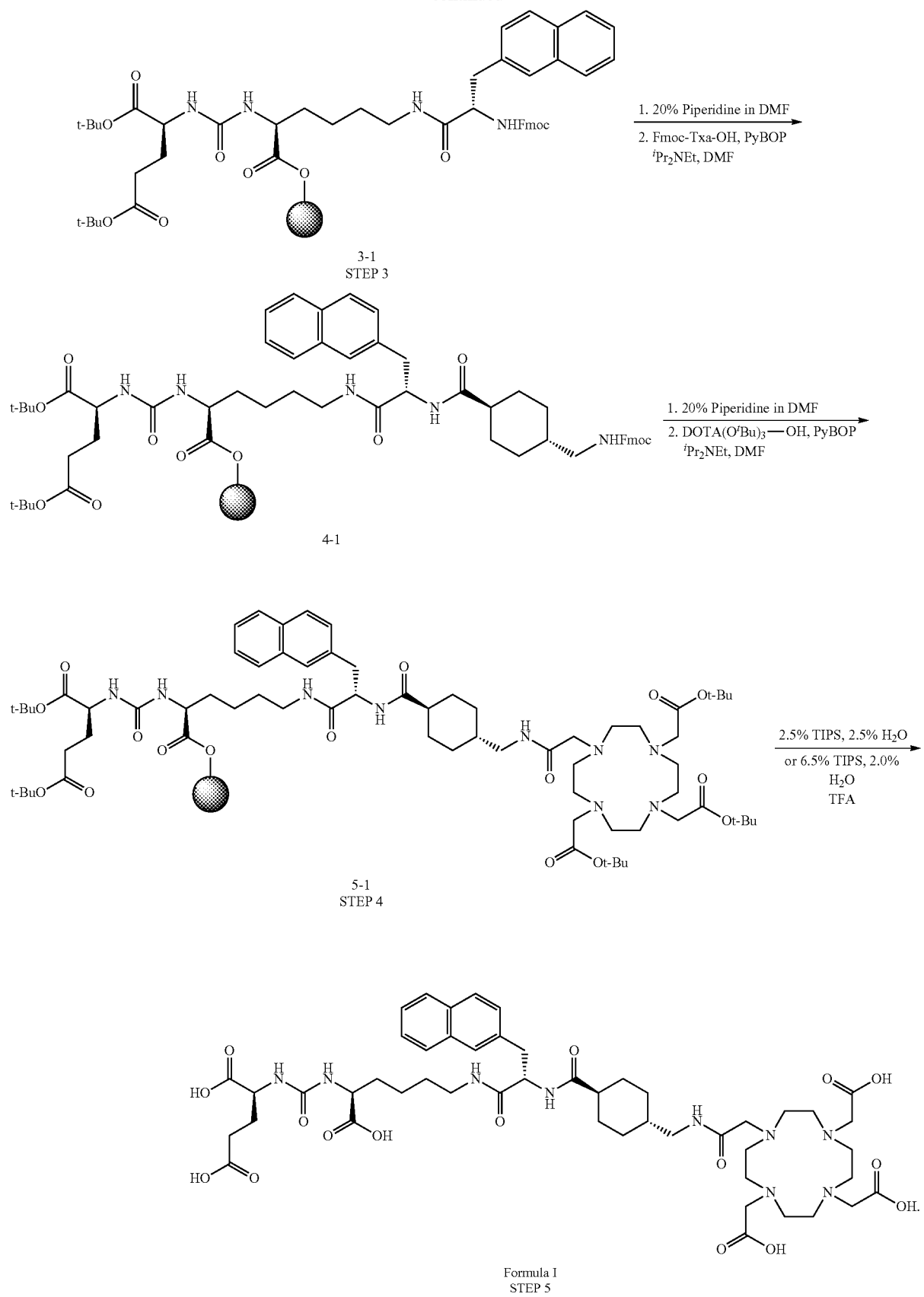

The following Tables 1 and 2 are summaries of the synthetic scheme described above as carried out according to the methods described herein:

TABLE 1

Reaction steps for synthetic scheme of PSMA-617.
Table 1: Solid phase reaction steps:

| | mmol. | equiv. | MW (g/mol) | amount |
|---|---|---|---|---|
| Fmoc-Lys(N-4-methoxytrityl)-2-chlorotrityl-Resin (loading 0.34 mmol/g.) | 0.5 | — | — | 1.47 g |
| Fmoc Deprotection - 20% Piperidine in DMF (3X) Urea Formation: | | | | |
| AB2 | 1 | 2 | 424 | 1/2 crude |
| $^i$Pr$_2$NEt | 2 | 4 | 129 | 0.258 mL |
| Mtt Deprotection - 2% TFA in CH$_2$Cl$_2$ (6X) Fmoc-3-(2-naphthyl)-L-alanine (Fmoc-2-Nal-OH) Coupling: | | | | |
| Fmoc-Nal-OH | 1 | 2 | 438 | 438 mg |
| $^i$Pr$_2$NEt | 2 | 4 | 129 | 0.258 mL |
| PyBOP | 1 | 2 | 520 | 520 mg |
| Fmoc Deprotection - 20% Piperidine in DMF (3X) Fmoc-tranexamic acid (Fmoc-Txa-OH) Coupling: | | | | |
| Fmoc-Txa-OH | 1 | 2 | 379 | 379 mg |
| $^i$Pr$_2$NEt | 2 | 4 | 129 | 0.258 mL |
| PyBOP | 1 | 2 | 520 | 520 mg |
| Fmoc Deprotection - 20% Piperidine in DMF (3X) Tri-tert-butyl 1,4,7,10-tetraazacyclododecane-1,4,7,10-tetraacetate {DOTA(O$^t$Bu)$_3$—OH} Coupling: | | | | |
| DOTA(O$^t$Bu)$_3$—OH | 1 | 1.25 | 573 | 716 mg |
| $^i$Pr$_2$NEt | 2 | 4 | 129 | 0.258 mL |
| PyBOP | 1 | 2 | 520 | 520 mg |
| Cleavage - 2.5% TIPS, 2.5% H$_2$O, TFA | | | | |

TABLE 2

Alternative solid phase reaction steps:

| | mmol. | equiv. | MW (g/mol) | amount |
|---|---|---|---|---|
| Fmoc-Lys(N-4-methoxytrityl)-2-chlorotrityl-Resin (loading 0.34 mmol/g.) | 1.08 | 1 | — | 2.00 g |
| Pretreatment Step Alternative Fmoc Deprotection - 20% Piperidine in DMF (3X) Alternative Urea Formation: | | | | |
| $^i$Pr$_2$NEt | 1.08 | 1 | 129 | 0.188 mL |
| Alternative Mtt Deprotection - CH$_2$Cl$_2$/TFE/AcOH Fmoc-3-(2-naphthyl)-L-alanine (Fmoc-2-Nal-OH) Coupling using Alternative Amino Coupling: | | | | |
| Fmoc-Nal-OH | 2.16 | 2 | 438 | 945 mg |
| $^i$Pr$_2$NEt | 4.32 | 4 | 129 | 0.752 mL |
| PyBOP | 2.16 | 2 | 520 | 1.12 g |
| Alternative Fmoc Deprotection - 20% Piperidine in DMF (3X) Fmoc-tranexamic acid (Fmoc-Txa-OH) Coupling using Alternative Amino Coupling: | | | | |
| Fmoc-Txa-OH | 2.16 | 2 | 379 | 819 mg |
| $^i$Pr$_2$NEt | 4.32 | 4 | 129 | 0.752 mL |
| PyBOP | 2.16 | 2 | 520 | 1.12 g |
| Alternative Fmoc Deprotection - 20% Piperidine in DMF (3X) Tri-tert-butyl 1,4,7,10-tetraazacyclododecane-1,4,7,10-tetraacetate {DOTA(O$^t$Bu)$_3$—OH} Coupling using Alternative Amino Coupling: | | | | |
| DOTA(O$^t$Bu)$_3$—OH | 2.16 | 2 | 573 | 1.24 g |
| $^i$Pr$_2$NEt | 4.32 | 4 | 129 | 0.752 mL |
| PyBOP | 2.16 | 2 | 520 | 1.12 g |
| Alternative resin Cleavage - 6.5% TIPS, 2% H$_2$O in TFA Purification Procedure 2 | | | | |

Pretreatment Step:

Prior to use in the synthesis method, a peptide synthesis vessel was charged with Fmoc-Lys(Mtt)-Wang resin (resin loading=0.54 mmol/g) 2.00 g (1.08 mmol). The resin was washed with 20 mL of dimethylformamide (DMF) for 5 minutes, and then drain the liquors from the vessel. The washing step was repeated one additional time.

Step 1: Urea Formation

In a peptide synthesis vessel was added the lysin resin. A solution of 20% piperidine in DMF (~20 mL) for Fmoc deprotection was added. Argon was bubbled through the solution for 15 min and then drained. 20% piperidine in DMF (~20 mL) was added and bubbling continued for 5 min before draining (repeated 2×). The resin was washed with DMF (~20 mL×3) followed by IPA (~20 mL×3) and finally with CH$_2$Cl$_2$ (~20 mL×3). Crude residue of AB2 was dissolved in 60 mL of CH$_2$Cl$_2$, and half the volume was added to the deprotected Lysine resin followed by $^i$Pr$_2$NEt. Argon was bubbled through the solution for 45 min and then drained. The remaining crude AB2 solution followed by $^i$Pr$_2$NEt was added to the resin, and argon was bubbled through the solution for an additional 30 min. The reaction vessel was then drained and the resin was washed with CH$_2$C$_{12}$ (~20 mL×3) followed by IPA (~20 mL×3) and again with CH$_2$C$_{12}$ (~20 mL×3).

Alternative Urea Formation:

In a peptide synthesis vessel was added the lysin resin. The AB2 reaction mixture from Example 1b was added to the resin along with 0.188 mL $^i$Pr$_2$NEt (1.08 mmoles). The reaction mixture was agitated overnight (approximately 18 hours). The resin was washed with CH$_2$C$_{12}$ (~20 mL×3).

Step 2: Mtt Deprotection

2% TFA in CH$_2$C$_{12}$ (~20 mL) was added and argon was bubbled through the solution for 5 min. Small amount of CH$_2$Cl$_2$ was added to the reaction vessel to maintain the same amount volume if bubbling vigorously. The yellow solution was then drained and repeated five times. The resin was washed with fresh CH$_2$C$_{12}$ until the filtrate remained clear. A 2% solution of TFA in CH$_2$C$_{12}$ was added once more. If the solution remained clear, the reaction mixture was drained, and the next coupling step was performed. If the solution turned yellow the resin was washed with fresh CH$_2$Cl$_2$ until clear and the process was repeated until a clear reaction solution was achieved. The resin was washed with DMF (~20 mL×3).

Alternative Mtt Deprotection

A solution of 112 mL CH$_2$Cl$_2$, 32 mL 2,2,2-trifluoroethanol (TFE), and 16 mL acetic acid (AcOH) was prepared. 20 mL of the AcOH-TFE solution was added to the resin in a peptide synthesis vessel. The mixture was agitated for about 1 hour, and the liquors were drained from the peptide synthesis vessel. The procedure was repeated one additional time. 20 mL of the AcOH-TFE solution was added to the resin in a peptide synthesis vessel, and the mixture was agitated overnight. The liquors were drained the from the peptide synthesis vessel. 20 mL of the AcOH-TFE solution was added to the resin in a peptide synthesis vessel, and the mixture was agitated for about 1 hour. The liquors were drained from the peptide synthesis vessel. The procedure was repeated one additional time. The resin was washed with 3×$CH_2Cl_2$, 3×2-propanol (IPA), and 3×DMF.

Step 3. Amino Coupling

An amino acid solution in DMF (~20 mL), $^iPr_2NEt$, and PyBOP were added to a peptide synthesis vessel. Argon was bubbled through the solution for 1 h and then drained. The resin was washed with DMF (~20 mL×3) followed by IPA (~20 mL×3) and with DMF (~20 mL×3) again.

Alternative Amino Coupling

An amino acid solution in DMF (~20 mL), PyBOP in DMF (~20 mL), and $^iPr_2NEt$ were added to a peptide synthesis vessel containing the resin. The mixture was agitated for about 4 hours and then the liquors were drained from the peptide synthesis vessel. The resin was washed with DMF (~20 mL×3) followed by IPA (~20 mL×3).

Step 4: Fmoc Deprotection

The deprotection step was performed before each amino acid coupling steps (besides the Mtt deprotection which used 2% TFA in $CH_2Cl_2$). A solution of 20% piperidine in DMF (~20 mL) for Fmoc deprotection was added. Argon was bubbled through the solution for 15 min and then drained. 20% piperidine in DMF (~20 mL) was added and bubbling continued for 5 min before draining (2×). The resin was washed with DMF (~20 mL×3) followed by IPA (~20 mL×3) and with DMF again (~20 mL×3).

Alternative FMOC Deprotection

The alternative deprotection step was performed before each amino acid coupling steps (besides the Mtt deprotection). To the resin was added a solution of 20% piperidine in DMF (~20 mL). The reaction was agitated for about 10 minutes. The liquors were drained from the reaction vessel, and the process repeated two additional times. The resin was washed with DMF (~20 mL×3) followed by IPA (~20 mL×3). In some instances, the resin was further washed with DMF (~20 mL×3) or alternatively with $CH_2Cl_2$ (~20 mL×3).

Step 5: Resin Cleavage

The resin was washed with $CH_2Cl_2$ (~20 mL×3) and drained. 25 mL of cleavage reagent (95% TFA, 2.5% $H_2O$, 2.5% Triisopropylsilane) was added to the peptide synthesis vessel and Argon was bubbled for 1 h, drained, and repeated twice with fresh cleavage reagent (10 mL for 15 min). The filtrate was stirred overnight under argon at room temperature. The reaction mixture was concentrated under reduced pressure until 10 ml remained. The product was triturated in 40 mL of diethyl ether and centrifuged. The solution was decanted from the resulting pellet. The previous step was repeated twice by resuspending the pellet in 50 mL of diethyl ether and centrifuging. The pellet was dried over a stream of argon and then high vacuum.

Alternative Resin Cleavage

A mixture of 42 mL trifluoroacetic acid (TFA), 0.90 mL water, and 3.0 mL triisopropylsilane (TIPS) was prepared, and added to the resin in a peptide synthesis vessel. The mixture was agitated for 6 hours (for the last hour warmed to 30° C. with a water bath). The resin was filtered and the solids washed with 2 mL of TFA. The product containing filtrate and wash were combined. Wash with 420 mL of methyl-t-butyl ether (MTBE) that was cooled in an ice water bath. The solid product was collected by filtration. The solids were washed with 5 mL of MTBE. The solids were dried under vacuum to provide 1.19 g crude Compound of the Formula I.

Purification Procedure 1

The resulting powder was dissolved in a small amount of DMSO and loaded onto a $C_{18}$ column. The desired product was purified by reverse phase chromatography (0-55% acetonitrile in 50 mM ammonium carbonate buffer at pH 7.0). Acetonitrile was evaporated under reduced pressure, and the remaining aqueous buffer solution was frozen and removed by lyophilization. 256 mg (49.2%) of desired product was collected as a white powder.

Purification Procedure 2

The compound of the Formula I was purified using a Biotage 60 g C18 ULTRA column with mobile phase A=0.1% TFA in water and mobile phase B=acetonitrile (ACN) (flow rate=45 mL/min, 1CV=90 mL, collection wavelength at 275 nm). The crude PSMA-617 in 20 mL of 0.1% TFA in water with 3 mL of ACN is loaded onto the column. The purification was run with 1CV 15% B, 7 CV 15% B to 25% B, hold at 25% B. The product peak began to elute at approximately 5 CV, and fractions were collected. The fractions were examined using UPLC-MS, and the acceptable product fractions (≥98% at 275 nm) were combined, and the product solution was concentrated using a rotary evaporator to remove the ACN (final volume=59 mL). The compound of the Formula I was de-salted using a Biotage 30 g C18 ULTRA column is set up with mobile phase A=0.1% AcOH in water and mobile phase B=ACN (flow rate=25 ml/min, 1 CV=45 mL, collection wavelength at 275 nm). To the aqueous PSMA-617 (59 mL) were charged 0.28 g ammonium acetate, 0.36 mL AcOH, and 3 mL ACN. The PSMA-617 solution was loaded onto the column, and the column was washed with 5 CV 5% B. The product was eluted from the column using 3 CV 39% B. The product peak eluted at 6 CV and 1 fraction was collected. The product solution was concentrated using a rotary evaporator to remove ACN. The solids were isolated by lyophilization to provide 0.675 g of the Compound of the Formula I.

Example 3: Characterization of PSMA-617 by Nuclear Magnetic Resonance and High Resolution MS ES+ (TOF)

$^1$H NMR ($D_6$-DMSO): 8.03 (t, 1H), 7.88 (t, 1H), 7.84 (d, 1H), 7.69-7.80 (m, 2H), 7.69 (s, 1H), 7.43-7.47 (m, 2H), 7.39 (dd, 1H), 6.29-6.33 (m, 2H), 4.50-4.52 (m, 1H), 4.08-4.11 (m, 1H), 3.99-4.02 (m, 1H), 3.46 (br s, 6H), 3.13 (br s, 2H), 3.10 (d, 1H), 2.89-3.04 (m, 17H), 2.68 (s, 4H), 2.22-2.27 (m, 2H), 2.07 (s, 1H), 1.91 (s, 1H), 1.57-1.74 (m, 5H), 1.46-1.50 (m, 2H), 1.31-1.35 (m, 3H), 1.22-1.26 (m, 3H), 1.06-1.12 (m, 1H), 0.80-0.82 (m, 2H).

Note: Six carboxylic acid protons are spread over the entire spectrum; additional resonances from residual acetic acid (1.91 ppm) and acetonitrile (2.07 ppm) are present.

$^{13}$C NMR ($D_6$-DMSO): 175.09, 174.52, 174.14, 173.73, 170.99, 170.55, 170.11, 169.64, 157.26, 135.78, 132.86, 131.70, 127.81, 127.37, 127.32, 127.24, 127.22, 125.83, 125.24, 57.80, 55.34, 54.86, 53.85, 52.33, 51.78, 51.24, 50.52, 49.96, 49.84, 44.54, 43.77, 38.14, 37.86, 36.81, 31.65, 30.05, 29.61, 29.50, 28.63, 28.56, 28.38, 27.69, 22.41.

Note: Additional resonances from residual acetic acid (171.88 ppm, 20.98 ppm) and acetonitrile (1.068 ppm) are present.

High Resolution MS ES+ (TOF): M+H$^+$=1042.5067 m/z (theoretical 1042.5096 m/z).

What is claimed is:

1. A process for preparing a compound of the formula I

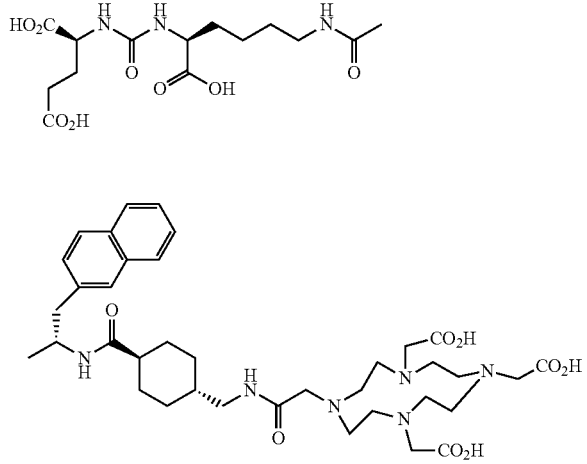

comprising a) contacting a resin-based compound of the formula A

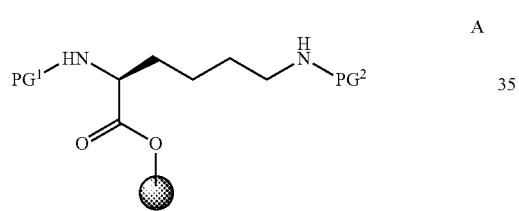

with a first deprotecting agent in a polar aprotic solvent to provide a resin-based compound of the formula A'

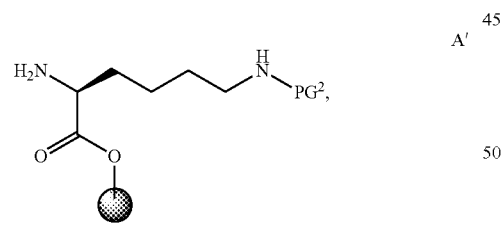

and b) contacting the resin-based compound of the formula A' with a compound of the formula B

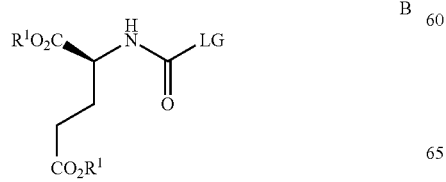

in the presence of an organic solvent and a base to provide a resin-based compound of the formula C

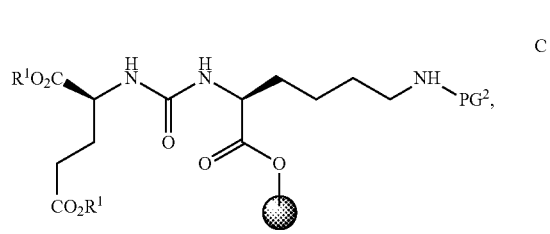

and c) contacting the resin-based compound of the formula C with a second deprotecting agent in the presence of an organic solvent to provide a resin-based compound of the formula C'

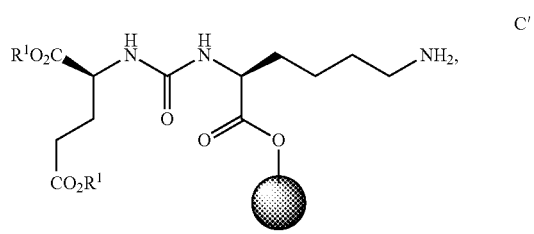

and d) contacting the resin-based compound of the formula C' with PG$^1$-3-(2-napthyl)-L-alanine in the presence of a polar aprotic solvent, a coupling agent, and a base to provide a resin-based compound of the formula D

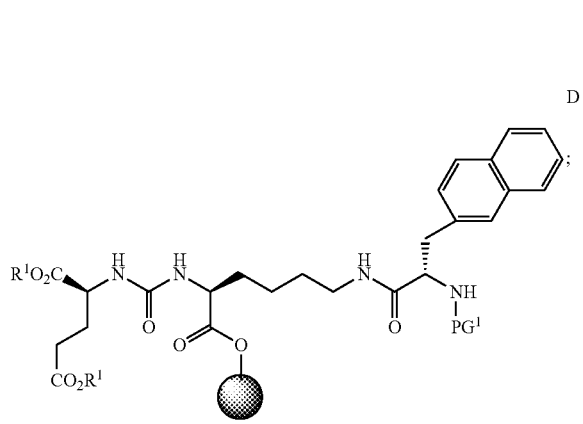

and e) contacting the resin-based compound of the formula D with the first deprotecting agent in a polar aprotic solvent to provide a resin-based compound of the formula D'

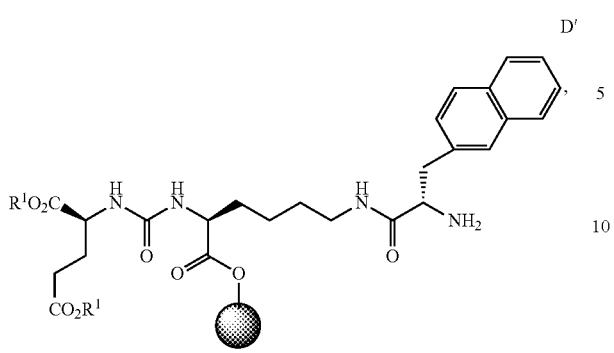

and f) contacting the resin-based compound of the formula D'
with PG¹-tranexamic acid in the presence of a polar
aprotic solvent, a coupling agent, and a base to provide
a resin-based compound of the formula E and g) contacting the resin-based compound of the formula E
with the first deprotecting agent in a polar aprotic
solvent to provide a resin-based compound of the
formula E' and h) contacting the resin-based compound of the formula E'
with a compound of the formula E²' in the presence of a polar aprotic solvent, a coupling
agent, and a base to provide a resin-based compound of
the formula F and i) contacting the resin-based compound of the formula F
with a third deprotecting agent and/or a cleavage
reagent in an organic solvent, wherein $PG^1$ and $PG^2$ are amine protecting groups, LG is
a leaving group, and $R^1$ is a $C_1$-$C_4$ alkyl or a cyclo-
hexyl.

2. The process of claim 1, wherein the first deprotecting
agent of step (a) is selected from the group consisting of
piperidine, morpholine, 1,8-Diazabicyclo[5.4.0]undec-7-
ene (DBU), diethylamine (DEA), dicyclohexamine, 4-meth-
ylpiperidine (4MP), Tris(2-aminoethyl)amine, pyridine and
collidine.

3. The process of claim 2, wherein the first deprotecting
agent of step (a) is piperidine.

4. The process of claim 3, wherein the polar aprotic
solvent of step (a) is selected from the group consisting of dimethylformamide (DMF), N-methyl-2-pyrrolidone (NMP), dichloromethane (DCM), a dichloromethane/dimethylformamide mixture, acetonitrile (ACN), an acetonitrile/dimethylformamide mixture, and dimethylsulfoxide (DMSO).

5. The process of claim 4, wherein the polar aprotic solvent of step (a) is dimethylformamide (DMF).

6. The process of claim 1, wherein the base of step (b) is selected from the group consisting of N,N-Diisopropylethylamine ($^i$Pr$_2$NEt), triethylamine (TEA), 4-methylmorpholine (NMM), imidazole, pyridine, and collidine.

7. The process of claim 6, wherein the base of step (b) is N,N-Diisopropylethylamine ($^i$Pr$_2$NEt).

8. The process of claim 7, wherein the organic solvent of step (b) is selected from the group consisting of CH$_2$Cl$_2$, THF, diethyl ether, MeOH, EtOH, acetone, acetonitrile.

9. The process of claim 8, wherein the organic solvent of step (b) is CH$_2$Cl$_2$.

10. The process of claim 1, wherein the second deprotecting agent of step (c) is selected from the group consisting of trifluoroacetic acid (TFA), acetic acid, trifluoroethanol, dichloromethane, hexafluoroisopropanol, dichloromethane, and combinations thereof.

11. The process of claim 10, wherein the second deprotecting agent of step (c) is trifluoroacetic acid (TFA) or a mixture of acetic acid and trifluoroethanol.

12. The process of claim 11, wherein the organic solvent of step (c) is selected from the group consisting of CH$_2$Cl$_2$, THF, diethyl ether, MeOH, EtOH, acetone, acetonitrile.

13. The process of claim 12, wherein the organic solvent of step (c) is CH$_2$Cl$_2$.

14. The process of claim 1, wherein the polar aprotic solvent of step (d) is selected from the group consisting of dimethylformamide (DMF), N-methyl-2-pyrrolidone (NMP), dichloromethane (DCM), a dichloromethane/dimethylformamide mixture, acetonitrile (ACN), an acetonitrile/dimethylformamide mixture, and dimethylsulfoxide (DMSO).

15. The process of claim 14, wherein the polar aprotic solvent of step (d) is dimethylformamide (DMF).

16. The process of claim 15, wherein the base of step (d) is selected from the group consisting of N,N-Diisopropylethylamine ($^i$Pr$_2$NEt), triethylamine (TEA), 4-methylmorpholine (NMM), imidazole, pyridine, and collidine.

17. The process of claim 16, wherein the base of step (d) is N,N-Diisopropylethylamine ($^i$Pr$_2$NEt).

18. The process of claim 17, wherein the coupling agent of step (d) is selected from the group consisting of benzotriazol-1-yl-oxytripyrrolidinophosphonium hexafluorophosphate (PyBOP), 1-[Bis(dimethylamino)methylene]-1H-1,2,3-triazolo[4,5-b]pyridinium 3-oxid hexafluorophosphate (HATU), 2-(1H-Benzotriazole-1-yl)-1,1,3,3-tetramethyluronium tetrafluoroborate (TBTU), 2-(1H-benzotriazol-1-yl)-1,1,3,3-tetramethyluronium hexafluorophosphate (HBTU), 2-chloro-4,6-dimethoxy-1,3,5-triazine (CDMT), N-[(5-Chloro-3-oxido-1H-benzotriazol-1-yl)-4-morpholinylmethylene]-N-methylmethanaminium hexafluorophosphate (HDMC), 1-Cyano-2-ethoxy-2-oxoethylidenaminooxy)dimethylamino-morpholino-carbenium hexafluorophosphate (COMU), dimethylamino(triazolo[4,5-b]pyridin-3-yloxy)methylidene]-dimethylazanium; tetrafluoroborate (TATU), N,N,N',N'-tetramethyl-S-(1-oxido-2-pyridyl)thiouronium tetrafluoroborate (TOTT), N-Ethoxycarbonyl-2-ethoxy-1,2-dihydroquinoline (EEDQ), 1-Propanephosphonic anhydride (T3P), and 4-(4,6-dimethoxy-1,3,5-triazin-2-yl)-4-methylmorpholinium chloride (DMTMM).

19. The process of claim 18, wherein the coupling agent of step (d) is benzotriazol-1-yl-oxytripyrrolidinophosphonium hexafluorophosphate (PyBOP).

20. The process of claim 1, wherein the first deprotecting agent of step (e) is selected from the group consisting of piperidine, morpholine, 1,8-Diazabicyclo[5.4.0]undec-7-ene (DBU), diethylamine (DEA), dicyclohexamine, 4-methylpiperidine (4MP), Tris(2-aminoethyl)amine, pyridine and collidine.

21. The process of claim 20, wherein the first deprotecting agent of step (e) is piperidine.

22. The process of claim 21, wherein the polar aprotic solvent of step (e) is selected from the group consisting of dimethylformamide (DMF), N-methyl-2-pyrrolidone (NMP), dichloromethane (DCM), a dichloromethane/dimethylformamide mixture, acetonitrile (ACN), an acetonitrile/dimethylformamide mixture, and dimethylsulfoxide (DMSO).

23. The process of claim 22, wherein the polar aprotic solvent of step (e) is dimethylformamide (DMF).

24. The process of claim 1, wherein the polar aprotic solvent of step (f) is selected from the group consisting of dimethylformamide (DMF), N-methyl-2-pyrrolidone (NMP), dichloromethane (DCM), a dichloromethane/dimethylformamide mixture, acetonitrile (ACN), an acetonitrile/dimethylformamide mixture, and dimethylsulfoxide (DMSO).

25. The process of claim 24, wherein the polar aprotic solvent of step (f) is dimethylformamide (DMF).

26. The process of claim 25, wherein the base of step (f) is selected from the group consisting of N,N-Diisopropylethylamine ($^i$Pr$_2$NEt), triethylamine (TEA), 4-methylmorpholine (NMM), imidazole, pyridine, and collidine.

27. The process of claim 26, wherein the base of step (f) is N,N-Diisopropylethylamine ($^i$Pr$_2$NEt).

28. The process of claim 27, wherein the coupling agent of step (f) is selected from the group consisting of benzotriazol-1-yl-oxytripyrrolidinophosphonium hexafluorophosphate (PyBOP), 1-[Bis(dimethylamino)methylene]-1H-1,2,3-triazolo[4,5-b]pyridinium 3-oxid hexafluorophosphate (HATU), 2-(1H-Benzotriazole-1-yl)-1,1,3,3-tetramethyluronium tetrafluoroborate (TBTU), 2-(1H-benzotriazol-1-yl)-1,1,3,3-tetramethyluronium hexafluorophosphate (HBTU), 2-chloro-4,6-dimethoxy-1,3,5-triazine (CDMT), N-[(5-Chloro-3-oxido-1H-benzotriazol-1-yl)-4-morpholinylmethylene]-N-methylmethanaminium hexafluorophosphate (HDMC), 1-Cyano-2-ethoxy-2-oxoethylidenaminooxy)dimethylamino-morpholino-carbenium hexafluorophosphate (COMU), dimethylamino(triazolo[4,5-b]pyridin-3-yloxy)methylidene]-dimethylazanium; tetrafluoroborate (TATU), N,N,N',N'-tetramethyl-S-(1-oxido-2-pyridyl)thiouronium tetrafluoroborate (TOTT), N-Ethoxycarbonyl-2-ethoxy-1,2-dihydroquinoline (EEDQ), 1-Propanephosphonic anhydride (T3P), and 4-(4,6-dimethoxy-1,3,5-triazin-2-yl)-4-methylmorpholinium chloride (DMTMM).

29. The process of claim 28, wherein the coupling agent of step (f) is benzotriazol-1-yl-oxytripyrrolidinophosphonium hexafluorophosphate (PyBOP).

30. The process of claim 1, wherein the first deprotecting agent of step (g) is selected from the group consisting of piperidine, morpholine, 1,8-Diazabicyclo[5.4.0]undec-7-ene (DBU), diethylamine (DEA), dicyclohexamine, 4-methylpiperidine (4MP), Tris(2-aminoethyl)amine, pyridine and collidine.

31. The process of claim 30, wherein the first deprotecting agent of step (g) is piperidine.

32. The process of claim 31, wherein the polar aprotic solvent of step (g) is selected from the group consisting of dimethylformamide (DMF), N-methyl-2-pyrrolidone (NMP), dichloromethane (DCM), a dichloromethane/dimethylformamide mixture, acetonitrile (ACN), an acetonitrile/dimethylformamide mixture, and dimethylsulfoxide (DMSO).

33. The process of claim 32, wherein the polar aprotic solvent of step (g) is dimethylformamide (DMF).

34. The process of claim 1, wherein the polar aprotic solvent of step (h) is selected from the group consisting of dimethylformamide (DMF), N-methyl-2-pyrrolidone (NMP), dichloromethane (DCM), a dichloromethane/dimethylformamide mixture, acetonitrile (ACN), an acetonitrile/dimethylformamide mixture, and dimethylsulfoxide (DMSO).

35. The process of claim 34, wherein the polar aprotic solvent of step (h) is dimethylformamide (DMF).

36. The process of claim 35, wherein the base of step (h) is selected from the group consisting of N,N-Diisopropylethylamine ($^{i}Pr_2NEt$), triethylamine (TEA), 4-methylmorpholine (NMM), imidazole, pyridine, and collidine.

37. The process of claim 36, wherein the base of step (h) is N,N-Diisopropylethylamine ($^{i}Pr_2NEt$).

38. The process of claim 37, wherein the coupling agent of step (h) is selected from the group consisting of benzotriazol-1-yl-oxytripyrrolidinophosphonium hexafluorophosphate (PyBOP), 1-[Bis(dimethylamino)methylene]-1H-1,2,3-triazolo[4,5-b]pyridinium 3-oxid hexafluorophosphate (HATU), 2-(1H-Benzotriazole-1-yl)-1,1,3,3-tetramethyluronium tetrafluoroborate (TBTU), 2-(1H-benzotriazol-1-yl)-1,1,3,3-tetramethyluronium hexafluorophosphate (HBTU), 2-chloro-4,6-dimethoxy-1,3,5-triazine (CDMT), N-[(5-Chloro-3-oxido-1H-benzotriazol-1-yl)-4-morpholinylmethylene]-N-methylmethanaminium hexafluorophosphate (HDMC), 1-Cyano-2-ethoxy-2-oxoethylidenaminooxy)dimethylamino-morpholino-carbenium hexafluorophosphate (COMU), dimethylamino(triazolo[4,5-b]pyridin-3-yloxy)methylidene]-dimethylazanium; tetrafluoroborate (TATU), N,N,N',N'-tetramethyl-S-(1-oxido-2-pyridyl)thiouronium tetrafluoroborate (TOTT), N-Ethoxycarbonyl-2-ethoxy-1,2-dihydroquinoline (EEDQ), 1-Propanephosphonic anhydride (T3P), and 4-(4,6-dimethoxy-1,3,5-triazin-2-yl)-4-methylmorpholinium chloride (DMTMM).

39. The process of claim 38, wherein the coupling agent of step (h) is benzotriazol-1-yl-oxytripyrrolidinophosphonium hexafluorophosphate (PyBOP).

40. The process of claim 1, wherein the third deprotecting agent of step (i) is selected from the group consisting of trifluoroacetic acid (TFA), hydrofluoric acid (HF), triflic acid (TfOH), a trifluoroacetic acid (TFA)/water/triisopropylsilane mixture, a trifluoroacetic acid (TFA)/dichloromethane (DCM) mixture, triethylsaline (TES), indole, a phenol/anisole mixture, and thioanisole.

41. The process of claim 40, wherein the third deprotecting agent of step (i) is a trifluoroacetic acid (TFA)/water/triisopropylsilane mixture.

42. The process of claim 41, wherein the cleavage reagent of step (i) is trifluoroacetic acid (TFA) or a trifluoroacetic acid (TFA)/water/triisopropylsilane mixture.

43. The process of claim 42, wherein the organic solvent of step (i) is selected from the group consisting of $CH_2Cl_2$, THF, diethyl ether, MeOH, EtOH, acetone, acetonitrile.

44. The process of claim 43, wherein the cleavage reagent of step (i) is a trifluoroacetic acid (TFA)/water/triisopropylsilane mixture.

45. The process of claim 44, wherein the organic solvent of step (i) is $CH_2Cl_2$.

46. The process of claim 1, wherein $PG^1$ is 9-Fluorenylmethyl-carbonyl (Fmoc) or t-butylcarbonyl (Boc).

47. The process of claim 46, wherein $PG^1$ is 9-Fluorenylmethyl-carbonyl (Fmoc).

48. The process of claim 1, wherein $PG^2$ is monomethoxytrityl (MMt) or 4-methyltrityl (Mtt).

49. The process of claim 47, wherein $PG^2$ is 4-methyltrityl (Mtt).

50. The process of claim 1, wherein LG is

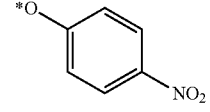

wherein, * represents a point of attachment to the rest of the compound.

51. The process of claim 1, wherein $R^1$ is t-butyl.